(12) United States Patent
Masuda et al.

(10) Patent No.: US 6,900,885 B2
(45) Date of Patent: May 31, 2005

(54) WHITE LIGHT SOURCE

(75) Inventors: Hiroji Masuda, Mito (JP); Hirotaka Ono, Mito (JP); Makoto Shimizu, Mito (JP)

(73) Assignee: Nippon Telegraph & Telephone Corporation, Tokyo (JP)

( * ) Notice: Subject to any disclaimer, the term of this patent is extended or adjusted under 35 U.S.C. 154(b) by 361 days.

(21) Appl. No.: 10/093,100

(22) Filed: Mar. 8, 2002

(65) Prior Publication Data
US 2002/0131695 A1 Sep. 19, 2002

(30) Foreign Application Priority Data

| Mar. 9, 2001 | (JP) | ................................. 2001-067109 |
| Sep. 20, 2001 | (JP) | ................................. 2001-287404 |
| Sep. 27, 2001 | (JP) | ................................. 2001-297981 |

(51) Int. Cl.$^7$ ............................ G02B 6/26; H04B 10/12
(52) U.S. Cl. .............. 356/147; 359/337.1; 359/337.12; 359/334; 359/341.1
(58) Field of Search .................... 385/37, 47, 15, 385/147, 122–123; 359/341.1, 341.3, 341.32, 334, 337.1

(56) References Cited

U.S. PATENT DOCUMENTS

| 5,838,487 | A | * | 11/1998 | Nilsson et al. ......... 359/337.12 |
| 5,867,305 | A | * | 2/1999 | Waarts et al. .......... 359/337.12 |
| 5,880,877 | A | * | 3/1999 | Fermann et al. ....... 359/341.31 |
| 5,900,970 | A | * | 5/1999 | Kakui .................... 359/337.1 |
| 5,912,750 | A | * | 6/1999 | Takeda et al. ................ 398/92 |
| 6,104,527 | A | | 8/2000 | Yang |
| 6,172,995 | B1 | | 1/2001 | Yang |
| 6,222,659 | B1 | | 4/2001 | Marcerou |
| 6,288,834 | B1 | * | 9/2001 | Sugaya et al. ............ 359/341.1 |
| 6,310,717 | B1 | * | 10/2001 | Naganuma et al. ...... 359/341.1 |
| 6,459,846 | B1 | * | 10/2002 | Choi et al. .................. 385/142 |

(Continued)

FOREIGN PATENT DOCUMENTS

| DE | 199 47 111 A1 | 5/2000 |
| EP | 0 849 898 A1 | 6/1998 |

(Continued)

OTHER PUBLICATIONS

Yamada et al., "Broadband and gain–flattened amplifier composed of a 1.55 $\mu$m–band and a 1.58 $\mu$m–band Er$^{3+}$–doped fibre amplifier in a parallel configuration." Electronic Letters, Apr. 10, 1997, vol. 33, No. 8, pp. 710–711.

(Continued)

Primary Examiner—Gregory J. Toatley, Jr.
Assistant Examiner—Sang H. Nguyen
(74) Attorney, Agent, or Firm—Venable LLP; Catherine M. Voorhees

(57) ABSTRACT

The present invention relates to a white light source. This white light source comprises a plurality of amplified spontaneous emission light generating sections each comprising at least an active fiber. At least two of the amplified spontaneous emission light generating sections are connected together in series. The plurality of amplified spontaneous emission light generating sections generate amplified spontaneous emission lights having at least partially overlapping wavelength ranges. Furthermore, a white light source of the present invention includes amplified spontaneous emission light generating sections each comprising at least an active fiber. At least one of the amplified spontaneous emission light generating sections comprises a mirror. If the white light source includes a plurality of amplified spontaneous emission light generating sections, at least two of the plurality of amplified spontaneous emission light generating sections are connected together in series to generate amplified spontaneous emission lights having at least partially overlapping wavelength ranges.

42 Claims, 48 Drawing Sheets

U.S. PATENT DOCUMENTS

| | | | |
|---|---|---|---|
| 6,556,342 B1 * | 4/2003 | Ellison et al. | 359/334 |
| 6,563,629 B2 * | 5/2003 | Ghera et al. | 359/337.1 |
| 6,583,925 B1 * | 6/2003 | Delavaux et al. | 359/341.32 |
| 6,658,189 B2 * | 12/2003 | Ajima et al. | 385/123 |
| 6,678,087 B1 * | 1/2004 | Masuda et al. | 359/334 |

FOREIGN PATENT DOCUMENTS

| | | |
|---|---|---|
| EP | 1 079 482 A2 | 2/2001 |
| JP | 09-232661 | 9/1997 |
| JP | 2000-101172 | 4/2000 |
| JP | 2000-164956 A | 6/2000 |
| JP | 2001-094182 | 4/2001 |
| WO | WO 98/42088 A1 | 9/1998 |

OTHER PUBLICATIONS

Dominique M. Dagenais et al., "Wavelength Stability Characteristics of a High–Power, Amplified Superfluorescent Source," Journal of Lightwave Technology, vol. 17, No. 8, Aug. 1999, pp. 1415–1421.

Karim Haroud et al., "A Broad–Band Superfluorescent Fiber Laser Using Single–Mode Doped Silica Fiber Combinations," IEEE Journal of Quantum Electronics, vol. 36, No. 2, Feb. 2000, pp. 151–154.

M. Yamada et al., "Broadband and Gain–Flattened Amplifier Composed of a 1.55 $\mu$m–Band and a 1.58 $\mu$m–Band $Er^{3+}$–Doped Fibre Amplifier In A Parallel Configuration," Electronics Letters, vol. 33, No. 8, Apr. 10, 1997, pp. 710–711.

Espindola, R.P., et al., "80nm Spectrally Flattened, High Power Erbium Amplified Spontaneous Emission Fibre Source", Electronics Letters, vol. 36, No. 15, pp. 1263–1265.

Holloway, W.T., et al., "Design of High–Power Broadband ASE Sources for Spectrum–Sliced WDM Systems", Proceedings of the SPIE –The International Society for Optical Engineering, vol. 2841, pp. 28–34.

"2000 Conference on Lasers and Electro–Optics Europe", Conference Digest, Sep. 10–15, 2000, p. 244.

Gray, S., et al., "I Watt Er/Yb Singlemode Superfluoresent Optical Fibre Source", Electronics Letters, vol. 33, No. 16, pp. 1382–1383.

* cited by examiner

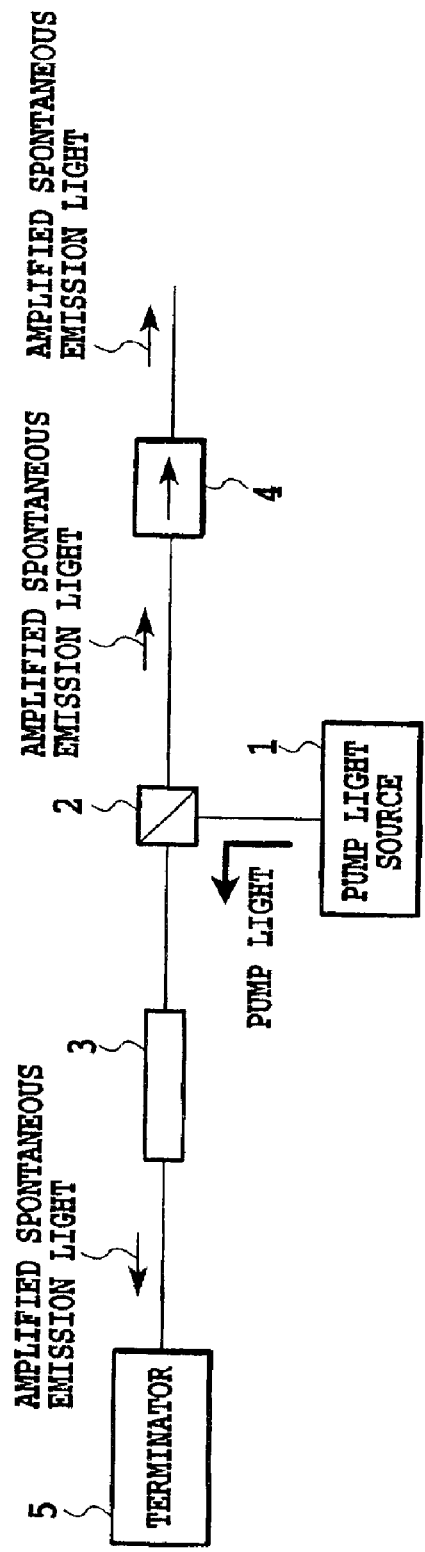

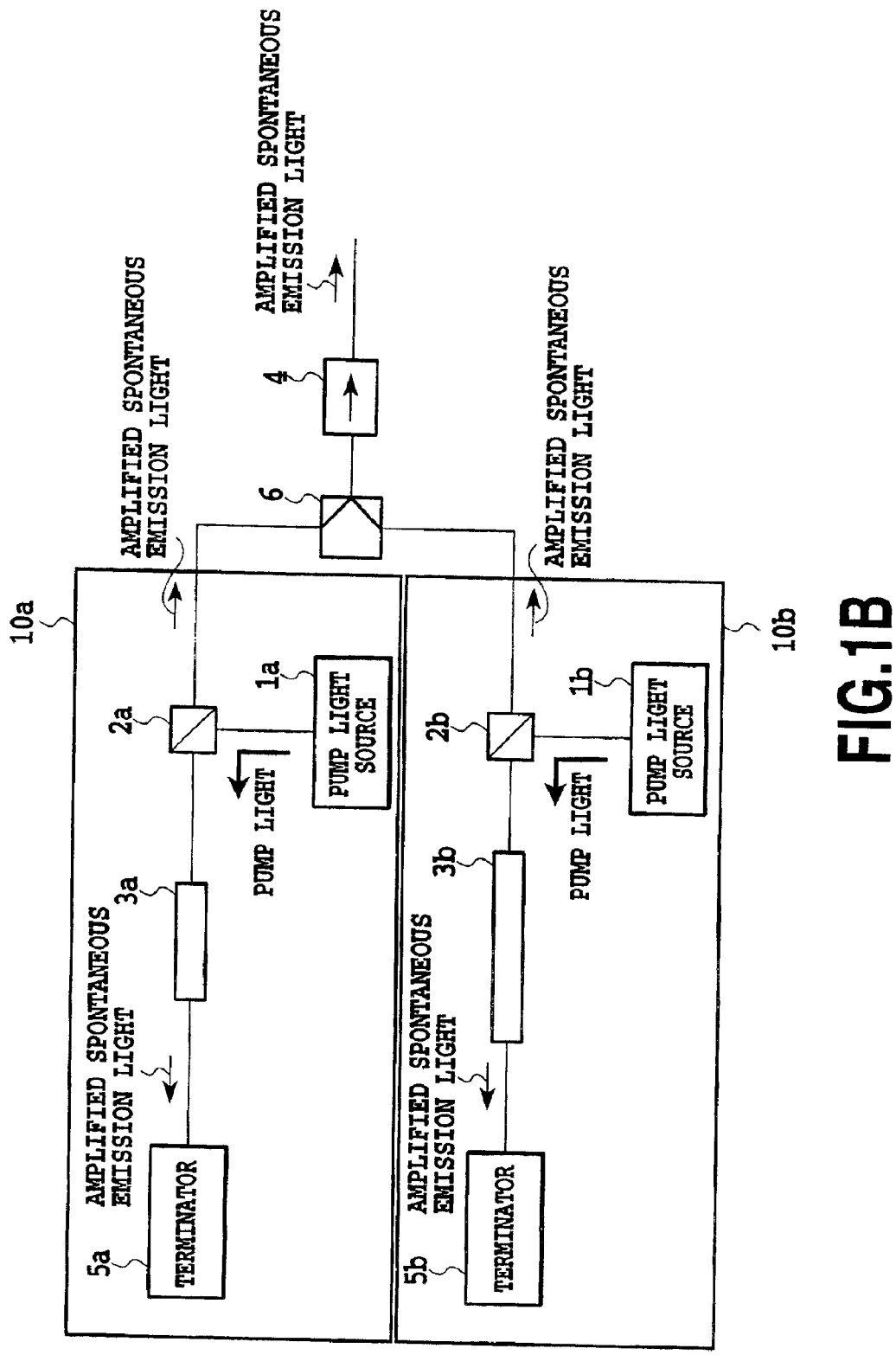

WHITE LIGHT SOURCE

CROSS-REFERENCE TO OTHER APPLICATIONS

This application is based on Japanese Patent Application Nos. 2001-67109 filed Mar. 9, 2001 and 2001-287404 filed Sep. 20, 2001 and 2001-297981 filed Sep. 27, 2001, the contents of which are incorporated hereinto by reference.

BACKGROUND OF THE INVENTION

1. Field of the Invention

The present invention relates to a white light source such as an amplified spontaneous emission (ASE) light source. More specifically, the present invention relates to a white light source for a system for evaluating and measuring common optical parts, a white light source for a system to carry out evaluations or measurements for optical parts of an optical-fiber communication system using optical fibers, and a spectrum slice signal light source and a CDM (Code Division Multiplexing) signal light source.

2. Description of the Related Art

In recent years, efforts have been made to broaden the bands of optical-fiber communications systems by utilizing a technique such as a wavelength division multiplex (WDM) technique. In the research and development fields related to such optical-fiber communication systems, there have been more and more needs for white light sources including ASE light sources as well as spectrum slice light sources, CDM light sources and the like, all of which are used to evaluate and measure optical parts. In particular, there have been demands for a decrease in the cost of such light sources, a broadening in their bands, and the like.

Specific examples of white light sources including ASE light sources are the configurations shown in FIGS. 1A and 1B. FIG. 1A shows a light source using a single amplified wavelength band, and FIG. 1B shows a broadband light source using two amplified wavelength bands. Referring to FIG. 1A, this light source comprises an active fiber 3 outputting an amplified light output therefrom (hereinafter it denotes an amplified light), a terminator 5 connected to one end of the active fiber 3 and a pump light source 1 and an isolator 4 connected to the other end of the active fiber 3 via a multiplexer 2. The multiplexer 2 couples a pump light emitted from the pump light source 1 to the active fiber 3. Further, the terminator 5 is provided so as to prevent the active fiber 3 from performing unstable operations such as laser oscillation. The isolator 4 is also provided so as to prevent the active fiber 3 from performing unstable operations such as laser oscillation. Further, if reflection of an amplified light from the pump light source is negligible, the isolator 4 and the terminator 5 may be omitted. Conventionally, an erbium (Er)-doped fiber is used as the active fiber 3 outputting a white light, and an amplified light output from the Er-doped fiber is used as a white light.

The operation of this light source will be described in brief taking the Er-doped fiber 3 as an active fiber for instance. The Er-doped fiber is pumped with a pump light from the pump light source 1. In the Er-doped fiber, a pump light generates a local light, which is then amplified while transmitting through the Er-doped fiber in the direction of a fiber axis. The amplified light is emitted to both the multiplexer and terminator sides of the Er-doped fiber (these directions will be referred to as the "forward" and "backward" directions of the figure), and is thus generated in both the forward and backward directions of the Er-doped fiber. Thus, the light source in FIG. 1A uses the single active fiber to obtain an amplified light with a single amplified wavelength band (for example, a C or L band). Further, of the light generated at both sides of the fiber, only the forward output amplified light is used as an output of the light source.

Next, the light source shown in FIG. 1B has a configuration comprising two light sources, each of which is for a single amplified wavelength band as shown in FIG. 1A, and which are connected together in parallel. That is, the light source shown in FIG. 1B comprises a first amplified light generating section 10a having a terminator 5a connected to one end of an active fiber 3a and a pump light source 1a connected to the other end of active fiber 3a via a multiplexer 2a, to output an amplified light output from the active fiber 3a, and a second amplified light generating section 10b having a terminator 5b connected to one end of an active fiber 3b and a pump light source 1b connected to the other end of active fiber 3a via a multiplexer 2b, to output an amplified light output from the active fiber 3b. Furthermore, the amplified light generating sections 10a and 10b are connected together in parallel via a multiplexer 6 to which the isolator 4 is connected at the output side of the multiplexer. An amplified light multiplexed by the multiplexer 6 is output via the isolator 4. The light source shown in FIG. 1B uses the two active fibers 3a and 3b to obtain white light having two amplified wavelength bands (for example, the C and L bands) (see M. Yamada et al., Broadband and gain-flattened amplifier composed of a 1.55 µm-band and a 1.58 µm-band Er3+-doped fibre amplifier in a parallel configuration, Electronic Letters, Vol. 33, No. 8, pp. 710 to 711 (Apr. 10, 1997)). Also in the thus constructed light source, conventionally, erbium (Er)-doped fibers are used as the active fibers 3a and 3b, to output white light, and an amplified light output from each Er-doped fiber is used as white light. Further, this light source also generates amplified light in both the forward and backward directions of each amplified light generating section, but of the light generated at both sides thereof, only the forward output amplified light is used as an output of the light source.

As described above, since the conventional method uses only a rare earth-doped fiber such as an Er-doped fiber as an active fiber, the spectrum of the light source is limited to the gain bandwidth of the rare earth-doped fiber, thereby making it difficult to obtain a broadband light source.

Further, although an amplified light from the active fiber is emitted from both ends of the fiber, the conventional method uses only the light from one end and thus does not efficiently generate a broadband light. Further, if the light source is constructed so that two fibers are connected together in parallel, a certain amount of light components generated outside the wavelength separation characteristic of the multiplexer are discarded, resulting in inefficient light generation. For example, in the above case with an Er-doped fiber, for an Er-doped fiber for the C band, light components having longer wavelengths than this band are discarded, and for an Er-doped fiber for the L band, light components having shorter wavelengths than this band are discarded.

SUMMARY OF THE INVENTION

The present invention is provided in view of the above problems, and it is an object thereof to provide a broadband white light source. It is another object of the present invention to provide a white light source that efficiently generates light. It is yet another object of the present invention to provide a white light source which has a broadband and which efficiently generates light.

A first aspect of the present invention relates to a white light source comprising a plurality of amplified spontaneous emission light generating sections each comprising at least an active fiber, wherein at least two of the amplified spontaneous emission light generating sections are connected together in series to generate amplified spontaneous emission lights having at least partially overlapping wavelength ranges.

An embodiment of the white light source of the first aspect is a white light source comprising a first amplified spontaneous emission light generating section comprising at least an active fiber and a second amplified spontaneous emission light generating section comprising at least an active fiber, wherein the first and second amplified spontaneous emission light generating sections are connected together in series to generate a first amplified spontaneous emission light and a second amplified spontaneous emission light having at least partially overlapping wavelength ranges. In the first aspect, the white light source may further have one or more amplified spontaneous emission light generating sections connected in series or parallel with the first and second amplified spontaneous emission light generating sections.

More specifically, the white light source of the present invention comprises a first amplified spontaneous emission light generating section comprising at least an active fiber and a pump light source, and a second amplified spontaneous emission light generating section comprising at least an active fiber and a pump light source. In the white light source, the first and second amplified spontaneous emission light generating sections each have a first end and a second end. The second end of the first amplified spontaneous emission light generating section is connected in series with the first end of the second amplified spontaneous emission light generating section. The wavelength ranges of a first amplified spontaneous emission light and a second amplified spontaneous emission light generated by the first and second amplified spontaneous emission light generating sections, respectively, at least partially overlap each other. The first amplified spontaneous emission light generated by the first amplified spontaneous emission light generating section is input to the second amplified spontaneous emission light generating section. The incident emission light is then combined with the second amplified spontaneous emission light generated by the second amplified spontaneous emission light generating section, while being amplified by a second active fiber included in the second amplified spontaneous emission light generating section, thereby enabling an amplified output light to be output from the second amplified spontaneous emission light generating section, the output light having both wavelength ranges of the first and second amplified spontaneous emission lights.

In another embodiment of the present invention, the white light source may further have a third amplified spontaneous emission light generating section generating a third amplified spontaneous emission light, which comprises at least an active fiber and a pump light source, and which is connected to the second end of the second amplified spontaneous emission light generating section. In the white light source thus constructed, the amplified output light output from the second amplified spontaneous emission light generating section and the third amplified spontaneous emission light are combined to output an amplified output light with sufficient gain in the wavelength range of the first, second and third amplified spontaneous emission light sources.

A second aspect of the present invention relates to a white light source characterized by comprising a mirror or a Faraday rotator mirror.

Specifically, the second aspect of the present invention is a white light source comprising one or more amplified spontaneous emission light generating sections each comprising at least an active fiber, wherein at least one of the amplified spontaneous emission light generating sections comprises a mirror, and wherein if the white light source comprises a plurality of amplified spontaneous emission light generating sections, at least two of the plurality of amplified spontaneous emission light generating sections are connected together in series to generate amplified spontaneous emission lights having at least partially overlapping wavelength ranges.

A first embodiment of the second aspect of the present invention is a white light source comprising a first amplified spontaneous emission light generating section comprising at least an active fiber and a second amplified spontaneous emission light generating section comprising at least an active fiber, wherein the first and second amplified spontaneous emission light generating sections are connected together in series, wherein the first and/or second amplified spontaneous emission light generating section further comprises a mirror, and wherein the first and second amplified spontaneous emission light generating sections generate a first amplified spontaneous emission light and a second amplified spontaneous emission light, respectively, having at least partially overlapping wavelength ranges.

Another embodiment of the second aspect is the white light source of the first embodiment, which may further have one or more amplified spontaneous emission light generating sections connected in series or parallel with the first and second amplified spontaneous emission light generating sections, wherein the one or more amplified spontaneous emission light generating sections may each optionally comprise a mirror.

In the second aspect of the present invention, at least one of the mirrors used is a Faraday rotator mirror.

In the white light source of the present invention, the active fibers may be the same or different and are selected from rare earth-doped fibers, Raman fibers, semiconductors, rare earth-doped waveguides, and solid waveguides having color centers.

In particular, in the present invention, at least one of the active fibers is preferably a rare earth-doped fiber. The rare earth-doped fiber is preferably erbium-doped fiber, thulium-doped fiber, or thulium-doped core and terbium-doped clad fiber. Most preferably, the rare earth-doped fiber is thulium-doped fiber.

In the present invention, at least one of the active fibers is a Raman fiber. The Raman fiber is preferably selected from a silica Raman fiber and a tellurite Raman fiber. Most preferably, the Raman fiber is a silica Raman fiber.

In the present invention, the white light source is characterized by comprising a Raman fiber as an active fiber and a pump light source which pumps the Raman fiber at a pump light wavelength of 1,450 to 1,580 nm. Alternatively, if the white light source comprises at least one Raman fiber as an active fiber, the pump light source that pumps the Raman fiber can have a pump light wavelength of 1,370 to 1,500 nm.

Furthermore, the white light source is characterized in that if the white light source comprises at least one erbium-doped fiber as an active fiber and a pump light source that pumps the erbium-doped fiber, the pump light source has a pump light wavelength of 1,500 nm or less.

Moreover, the white light source is characterized in that if the white light source comprises at least one thulium-doped core and terbium-doped clad fiber as an active fiber and a pump light source that pumps the thulium-doped core and terbium-doped clad fiber, the pump light source has a pump light wavelength of 1,500 nm or less.

The above and other embodiments of the present invention and the features thereof will be more apparent from the following description thereof taken in conjunction with the accompanying drawings and claims.

BRIEF DESCRIPTION OF THE DRAWINGS

FIGS. 1A and 1B are schematic diagrams illustrating the configuration of white light sources, wherein FIG. 1A shows an example of a configuration having a single active fiber, and FIG. 1B shows a configuration having two active fibers connected together in parallel;

FIGS. 10A and 10B are diagrams showing a specific example (Example 1) of the white light source according to the first aspect of the present invention, wherein FIG. 10A illustrates the configuration of the white light source of this example and FIG. 10B is a schematic chart of the output spectrum of a white light output from the white light source of this example;

FIGS. 11A, 11B, 11C and 11D are diagrams showing another specific example (Example 2) of the white light source according to the first aspect of the present invention, wherein FIG. 11A illustrates the configuration of the white light source of this example, FIG. 11B is a schematic chart of the output spectrum of a white light output from the white light source of this example (FIG. 1A), FIG. 11C illustrates the configuration of the white light source of this example and FIG. 11D is a schematic chart of the output spectrum of a white light output from the white light source of this example (FIG. 1C);

FIGS. 12A and 12B are diagrams showing yet another specific example (Example 3) of the white light source according to the first aspect of the present invention, wherein FIG. 12A illustrates the configuration of the white light source of this example and FIG. 12B is a schematic chart of the output spectrum of a white light output from the white light source of this example;

FIGS. 13A, 13B, 13C, 13D, 13E and 13F are diagrams showing still another specific example (Example 4) of the white light source according to the first aspect of the present invention, wherein FIG. 13A illustrates the configuration of the white light source of this example, FIG. 13B is a schematic chart of the output spectrum of a white light output from the white light source of this example, FIG. 13C is a schematic chart of the spectrum of output light from a component 1310 of the white light source of this example, FIG. 13D is a schematic chart indicating that when the output light from the component 1310 shown in FIG. 13C and the output light from a component 1320 of this white light source are combined, the output spectrum in FIG. 13B is obtained, FIG. 13E is a schematic chart of the output spectrum of a white light provided by the white light source shown in FIG. 1B, and FIG. 13F is a schematic chart of the output spectrum of light output from the white light source illustrated in FIG. 13A if the type of an active fiber is changed;

FIGS. 14A and 14B are diagrams showing yet another specific example (Example 5) of the white light source according to the first aspect of the present invention, wherein FIG. 14A illustrates the configuration of the white light source of this example and FIG. 14B is a schematic chart of the output spectrum of a white light output from the white light source of this example;

FIGS. 19A, 19B, 19C, 19D and 19E are diagrams showing still another specific example (Example 9) of the white light source according to the second aspect of the present invention, wherein FIG. 19A illustrates the configuration of the white light source of this example and FIGS. 19B to 19E are schematic charts of the output spectra of light output from the white light source of this specific example if the active fiber is changed;

FIGS. 24A and 24B are charts showing the equalization characteristic of the optical power of the white light source constructed as shown in FIG. 23, wherein FIG. 24A shows the power of output light from the active fiber and FIG. 24B illustrates the transmission loss spectrum of a spectrum equalizer;

FIGS. 26A and 26B are charts showing the equalization characteristic of the optical power of the white light source constructed as shown in FIG. 25, wherein FIG. 26A shows the power of output light from the active fiber and FIG. 26B illustrates the transmission loss spectrum of a fiber coupler;

DETAILED DESCRIPTION OF PREFERRED EMBODIMENTS

Definition

Figure 2A:
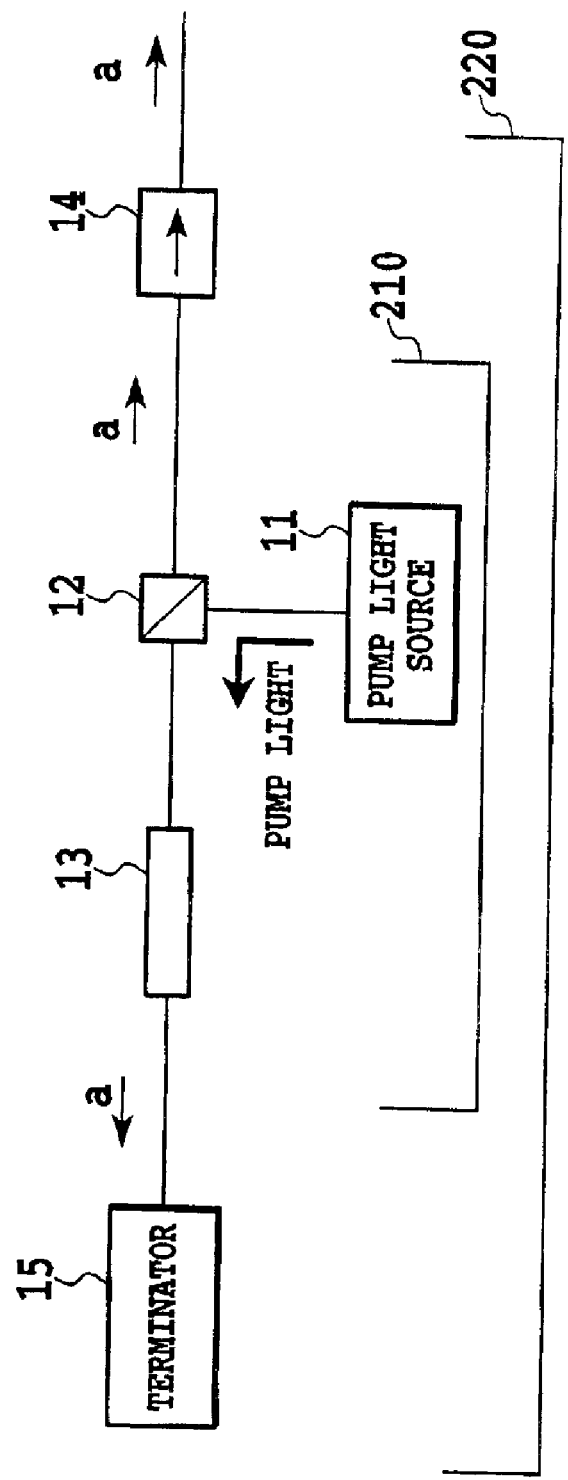
FIG. 2A is a schematic diagram of components of a white light source according to the present invention.

The term "white light", as used herein, means an amplified spontaneous emission (ASE) light which has been amplified by an active fiber and which has a broadband wavelength or an amplified spontaneous scattering light which has been amplified by an active fiber and which has a broadband wavelength. Further, the term "white light source", as used herein, means a light source that can generate this white light, and includes an ASE light source.

The term "active fiber", as used herein, means an active medium such as an optical fiber which generates an amplified spontaneous emission light or an amplified spontaneous scattering light.

The terms "spontaneous emission light" and "spontaneous scattering light", as used herein, refer to a light generated in an active fiber by a pump light from a pump light source when the pump light is input to the active fiber.

The term "amplified spontaneous emission light", as used herein, refers to an amplified spontaneous emission light output from an active fiber when the active fiber is a rare earth-doped fiber. The term "amplified spontaneous scattering light", as used herein, refers to an amplified spontaneous scattering light output from an active fiber when the active fiber is a Raman fiber. The "amplified scattering light" is also referred to as the "amplified spontaneous emission light". Accordingly, for simplification, the "amplified spontaneous emission light" and the "amplified scattering light" are collectively referred to as the "amplified spontaneous emission light" herein.

The expression 'two components are "connected together in series"', as used herein, means that at least part of signal light transmits between these two components without being branched. However, this does not mean that no common optical parts (such as a multiplexer for introducing a pump light) are interposed between these two components.

It should be noted that the accompanying drawings are schematic. In particular, the figures showing output spectra do not show these spectra in detail.

The present invention will be described below.

The present invention relates to a white light source that has a broadband wavelength and/or that efficiently generates light.

In particular, the present invention provides a white light source comprising a first amplified spontaneous emission light generating section comprising at least a first active fiber and a first pump light source, and a second amplified spontaneous emission light generating section comprising at least a second active fiber and a second pump light source.

The first and second amplified spontaneous emission generating sections are connected together in series, a first amplified spontaneous emission light generated by the first amplified spontaneous emission light generating section and a second amplified spontaneous emission light generated by the second amplified spontaneous emission light generating section have partially overlapping wavelength ranges.

According to the present invention, one of the first and second active fibers may amplify the amplified spontaneous emission light emitted from the amplified spontaneous emission generating section comprising the other active fiber.

The first and second amplified spontaneous emission lights may have partially overlapping wavelengths, and one of the first and second active fibers may amplify the amplified spontaneous emission light emitted from the amplified spontaneous emission generating section comprising the other active fiber.

The present invention will be described below in detail with reference to the drawings, wherein the same components are denoted by the same numbers.

A first aspect of the present invention is a white light source having at least two active fibers connected together in series.

First, a configuration such as the one shown in FIG. 2A will be considered. This light source is similar to the above-described light source of FIG. 1A using a single amplified wavelength band. It comprises an active fiber 13 which outputs an amplified spontaneous emission light, and which has a terminator 15 connected to one end of the fiber 13 and a pump light source 11 and an isolator 14 connected to the other end of the fiber 13 via a multiplexer 12. A portion composed of the active fiber, multiplexer, and pump light source (for example, the portion 210 shown enclosed by a bracket in FIG. 2A) is referred to as an "amplified spontaneous emission generating section" herein. Further, a configuration (for example, 220 in FIG. 2A) in which both a terminator and an isolator (the isolator may be an optional component) are connected to the amplified spontaneous emission generating section is referred to as a "white light generating section" herein.

Figure 2B:
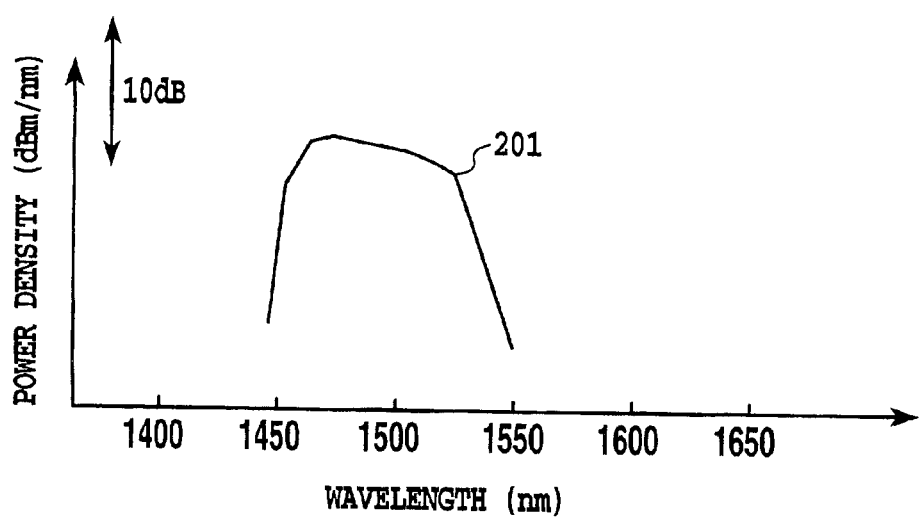
FIGS. 2B and 2C are schematic charts of the output spectra of a white light that can be output from this white light source.
Figure 2C:
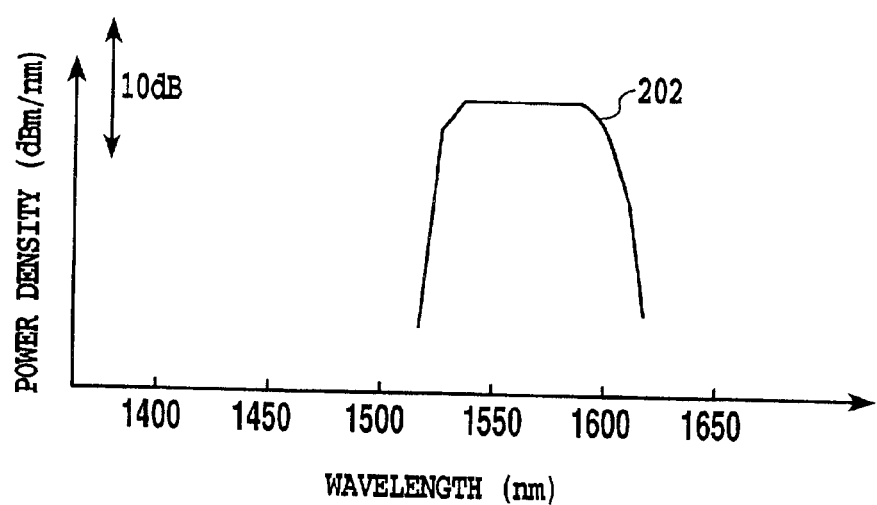

FIGS. 2B and 2C illustrate the output spectra of white light output from the light source described above with reference to FIG. 2A. FIG. 2B shows an output spectrum 201 obtained if the active fiber 13 composed of a thulium (Tm)-doped fiber (TDF), a kind of rare earth-doped fiber, is pumped using a 1,400 nm pump light. FIG. 2C shows an output spectrum 202 obtained if the active fiber 13 composed of an erbium (Er)-doped fiber (EDF), a kind of rare earth-doped fiber, is pumped using a 980 nm pump light. As shown in FIGS. 2B and 2C, if one of these rare earth-doped fiber is used as an active fiber, the wavelength ranges of these rare earth-doped fibers partially overlap each other (the overlapping range is between about 1,520 and 1,550 nm). Accordingly, a combination of these optical fibers provide a white light source having a predetermined power density over a broadband wavelength range.

Figure 3A:
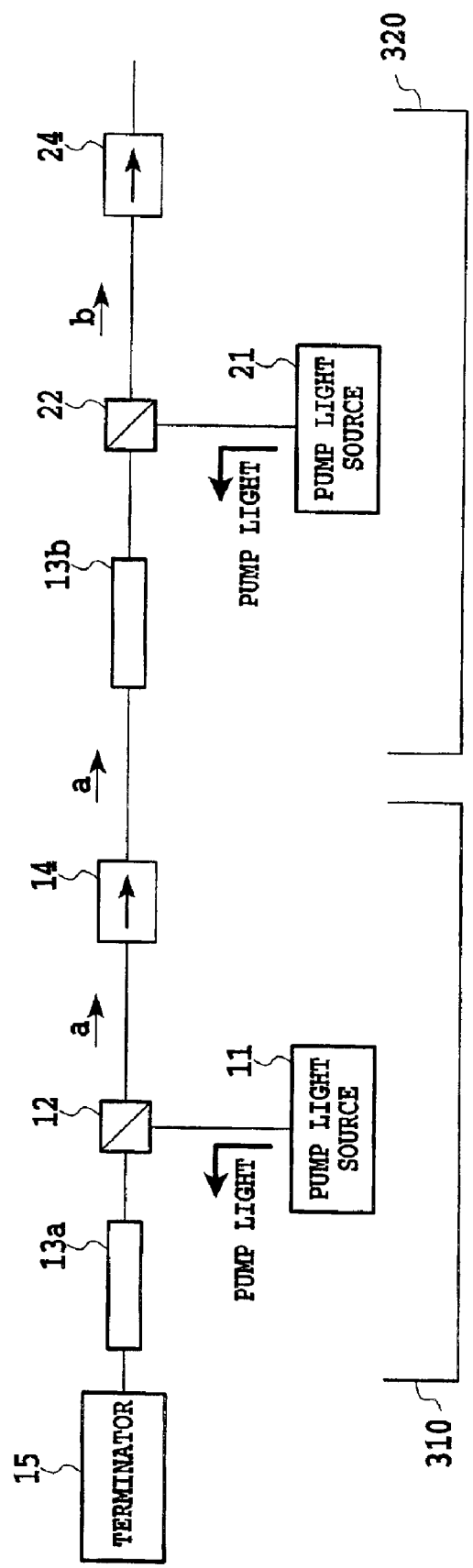
FIG. 3A is a schematic diagram showing the configuration of a white light source according to the present invention (a first aspect of the present invention)

This embodiment (first embodiment) of the present invention is shown in FIG. 3A, a schematic diagram of a white light source according to the first embodiment.

Figure 3B:
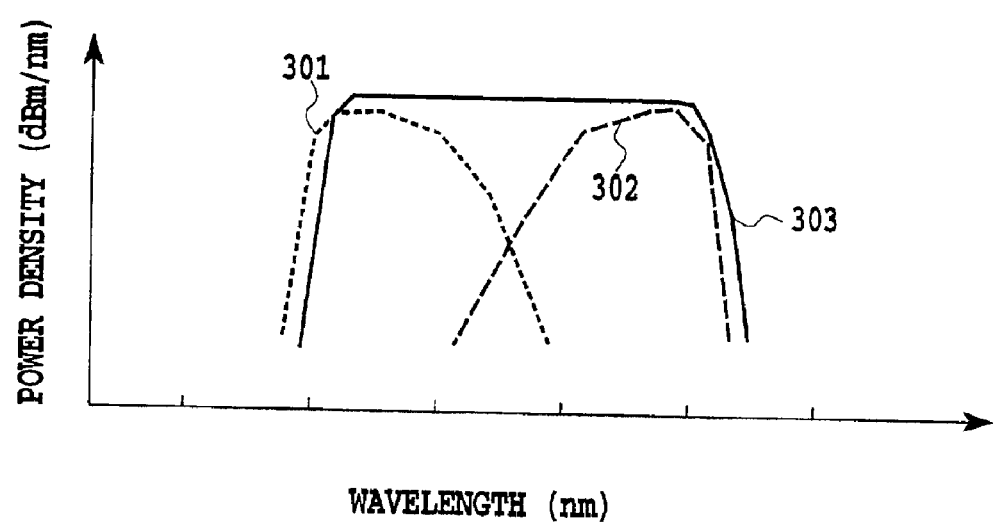
FIG. 3B is a schematic chart of the output spectrum of a white light that can be output from this white light source.

FIG. 3B is a schematic chart of an output spectrum from the white light source shown in FIG. 3A.

FIG. 3A shows an example in which two active fibers 13a and 13b are connected together in series and in which their unique wavelength ranges are entirely multiplexed. In FIG. 3A, reference numerals 13a and 13b denote active fibers, and reference numerals 11 and 21 denote pump light sources, 12 and 22 denote multiplexers and 14 and 24 denote isolators. Further, in FIG. 3A, reference numeral 310 denotes a first amplified spontaneous emission generating section, and reference numeral 320 denotes a second amplified spontaneous emission generating section. In the first embodiment, the first amplified spontaneous emission generating section 310 comprises the first active fiber 13a, the multiplexer 12 provided at one end of the fiber 13a, and a pump light source 11 connected to the fiber 13a via the multiplexer 12. Furthermore, in the first embodiment, the end of the first amplified spontaneous emission generating section 310 at which the multiplexer 12 is provided is connected to the isolator 14, which is connected to one end of the second active fiber 13b. Moreover, the other end of the active fiber 13b is connected to the pump light source 21 and isolator 24 via the multiplexer 22. Further, the terminator 15 is provided in the first amplified spontaneous emission generating section 310 at an end opposite the isolator 14.

In the white light source of the first aspect, the first active fiber 13a is pumped with pump light from the pump light source 11. This pumping locally generates a spontaneous emission light in the first active fiber 13a, and the generated light is amplified while transmitting through the first active fiber 13a in the direction of the fiber axis. The amplified light (amplified spontaneous emission light) is directed in both directions of the active fiber 13a, that is, to the isolator and the terminator sides, so that output amplified spontaneous emission light is generated at the multiplexer- and terminator-side, respectively, of the active fiber 13a. Then, the amplified spontaneous emission light output to the multiplexer 12 by the first active fiber 13a (the first amplified spontaneous emission light a) having an output spectrum 301 (FIG. 3B) is input to the second active fiber 13b via the isolator 14. The first amplified spontaneous emission light a is amplified in the second active fiber 13b and added to an amplified spontaneous emission light from the active fiber 13b having an output spectrum 302 (FIG. 3B) which is generated by pump light from the pump light source 21. Accordingly, a second amplified spontaneous emission light b emitted from the second active fiber 13b has a broader band (output spectrum 303, FIG. 3B) than the first amplified spontaneous emission light a and the amplified spontaneous emission light from the second active fiber 13b if excited only by the light from pump source 21.

In the present invention, the two active fibers are connected in series (i.e. a multiplexer is not required for connecting between the first and second amplified spontaneous emission generating sections), so that generated light components need not be discarded in the multiplexer, which is required for parallel connections, thereby enabling the amplified spontaneous emission light to be efficiently used. Thus, according to the first embodiment of the present invention, the problem of the parallel connections is solved. Furthermore, according to the first embodiment, white light with a broader band wavelength range is obtained using the two active fibers. That is, the amplified spontaneous emission light a is amplified in the active fiber 13b and added to the amplified spontaneous emission light from the active fiber 13b itself. As a result, the amplified spontaneous emission light b emitted from the white light generating section advantageously has a broader band than the amplified spontaneous emission light a and the amplified spontaneous emission light from the active fiber 13b itself. Specifically, as shown in FIG. 3A, the output spectra obtained from the first and second active fibers 13a and 13b have partially sufficiently overlapping wavelength ranges, so that the white light source of the present invention provides an output spectrum 303 having a broadband wavelength range and sufficient power. In the first aspect, appropriate selection of the two active fibers provides a broadband output spectrum with a power density equal to or higher than a specified value.

The first embodiment of the present invention is an example using the same type of active fibers. For example, two rare earth-doped fibers or two Raman fibers may be used as the active fibers 13a and 13b. The active fibers may generate amplified spontaneous emission light having at least partially overlapping wavelength ranges to provide a power density equal to or higher than a desired specified value, and any combination of active fibers may be used as long as the fibers meet the above conditions. Specifically, with rare earth-doped fibers, these fibers may be of the same type or different types (however, if the fibers are of the same type, they must generate amplified spontaneous emission light having at least partially different wavelength ranges). (1) An example of a combination of rare earth-doped fibers of the same type is two EDFs, and (2) an example of a combination of rare earth-doped fibers of different types are an EDF and a TDF. Other examples include appropriate combinations of rare earth-doped fibers such as thulium-doped core and terbium-doped clad fibers. Further examples include Raman fibers, silica or tellurite Raman fibers. Specifically, if, for example, the active fibers 13a and 13b are Er-doped fibers, the lengths thereof may set at different values (for example, 10 m and 50 m).

In the first embodiment, the active fibers can be properly selected depending on the desired white light source. With rare earth-doped fibers, the doping concentration of rare earth elements, the length of the fibers, and the like may be appropriately selected depending on the desired white light source. Specifically, for example, with EDFs, the doping concentration is preferably 1,000 wt.ppm, and the fiber length is preferably 20 m. With silica Raman fibers, a kind of Raman fibers, the fiber length is preferably 5 km.

In the first embodiment, Raman fibers are preferable components for the white light source of the present invention because selection of a proper pump light wavelength generally enables these fibers to generate an amplified spontaneous emission light with an arbitrary wavelength range. The first and second active fibers are interchangeable.

In the example of the first embodiment, an example combining two active fibers is illustrated. However, in the present invention, additional active fibers can be combined if an increase in cost and a decrease in efficiency associated with series connections are negligible.

The pump light source, terminator, multiplexer, and isolator in the first embodiment may be appropriately selected from conventional corresponding equipment depending on the active fibers used. For example, the pump light source can have a wavelength range from 1,200 nm to 1,600 nm depending on the active fibers used. Specifically, with Raman fibers as active fibers and a pump light source that pumps the Raman fibers, the pump light source preferably has a pump light wavelength between about 1,450 nm and about 1,580 nm. Alternatively, the pump light source that pumps the Raman fibers preferably has a pump wavelength between, for example, about 1,370 nm and about 1,500 nm.

As another example, with a white light source comprising erbium-doped fibers as active fibers and a pump light source that pumps the erbium-doped fibers, the pump light source preferably has a pump light wavelength of 1,500 nm or less.

As still another example, with a white light source comprising thulium-doped core and terbium-doped clad fibers as active fibers and a pump light source that pumps the thulium-doped core and terbium-doped clad fibers, the pump light source preferably has a pump light wavelength of 1,500 nm or less.

Now, a second embodiment of the present invention will be described. The second embodiment is a white light source similar to the configuration shown in FIG. 3A but uses a combination of active fibers of different types. This combination is particularly effective if active fibers of the same type are used and a large number of active fibers must thus be combined in order to cover the desired wavelength range, thus requiring a complicated apparatus configuration and high cost. An example of a combination of active fibers of different types (a combination of a rare earth-doped fiber and a Raman fiber) will be described below.

The Raman fiber used in the second embodiment is an optical fiber that outputs an amplified spontaneous emission light using Raman amplification. Selection of a proper pump light wavelength generally enables the Raman fiber to generate an amplified spontaneous emission light with an arbitrary wavelength range. In particular, the Raman fiber can generate an amplified spontaneous emission light with a wavelength range which is not obtained if conventional rare earth-doped fibers are used as active fibers. For example, an amplified spontaneous emission light generated in a silica Raman fiber using a 1,420 nm pump light source has a wavelength range from 1,495 to 1,530 nm, which is not provided by, for example, TDFs or EDFs. Accordingly, a combination of a rare earth-doped fiber and a Raman fiber provides a white light source with a wavelength range that is not obtained previously. Further, since selection of a proper pump light wavelength generally enables the Raman fiber to generate an amplified spontaneous emission light with an arbitrary wavelength range, it has the advantage of enabling its wavelength range to be adjusted depending on the wavelength range of an amplified spontaneous emission light from an active fiber combined with the Raman fiber.

Figure 4A:
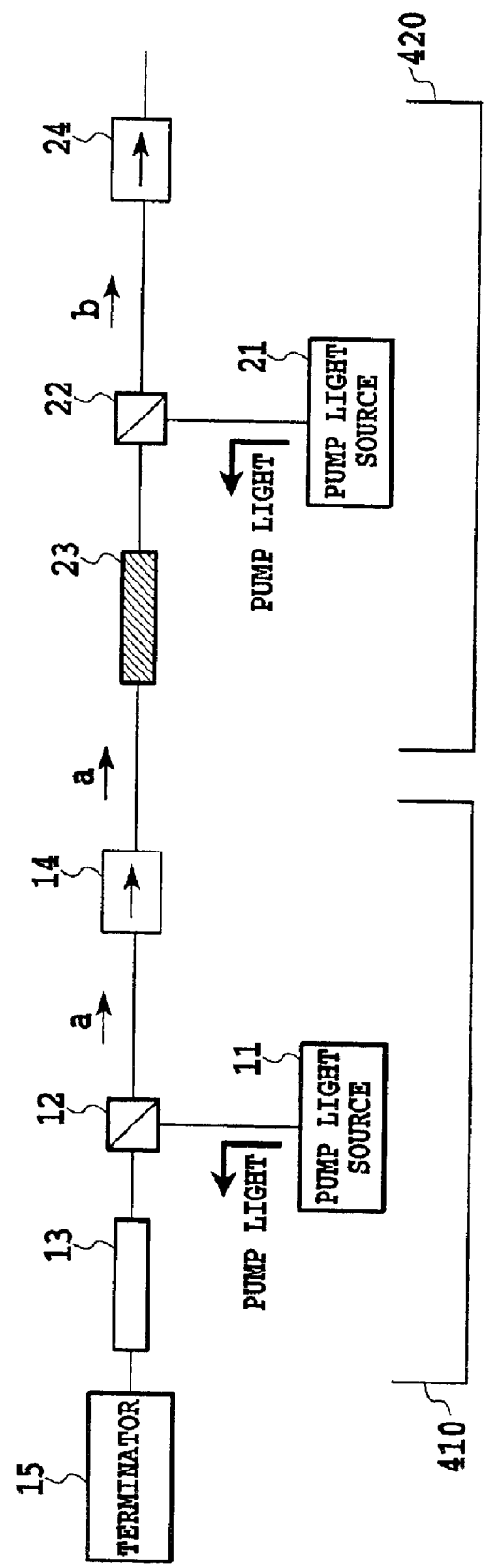
FIG. 4A is a schematic diagram showing the configuration of another white light source according to the present invention (the first aspect of the present invention)

The white light source of the second embodiment is constructed, for example, as shown in FIG. 4A.

In the second embodiment, one end of an active fiber 23 is connected to a first amplified spontaneous emission generating section 410 via the isolator 14, while the other end thereof is connected to a pump light source 21 and an isolator 24 via a multiplexer 22. Further, the terminator 15 is provided in the amplified spontaneous emission generating section 410 at an opposite end to the multiplexer 12. In FIG. 4A, a rare earth-doped fiber is used as the first active fiber 13, and a Raman fiber is used as the second active fiber 23. An example of an available Raman fiber is a silica Raman fiber or a tellurite Raman fiber. The rare earth-doped fiber described in the first embodiment may be used as the first active fiber.

Further, the conditions for components such as the active fibers, pump light source, multiplexer, terminator, and isolator are as described in the first embodiment.

In the white light source of the second embodiment, first, a pump light from the pump light source 11 pumps the first active fiber 13. This pumping locally generates a spontaneous emission light in the first active fiber 13, and the generated light is amplified while transmitting through the first active fiber 13 in the direction of the fiber axis. The amplified spontaneous emission light is emitted in both directions of the active fiber 13, that is, to the isolator and the terminator sides and generated in both forward and backward directions of the active fiber 13. Then, the amplified spontaneous emission light output to the multiplexer 12 by the first active fiber 13 (the first amplified spontaneous emission light a) is input to the Raman fiber 23 via the isolator 14. The first amplified spontaneous emission light a is amplified in the Raman fiber 23 and added to an amplified spontaneous emission light from the Raman fiber 23 which is generated by pump light from the pump light source 21. Accordingly, a second amplified spontaneous emission light b emitted from the Raman fiber 23 has a broader band than the first amplified spontaneous emission light a and the amplified spontaneous emission light from the Raman fiber itself.

Figure 4B:
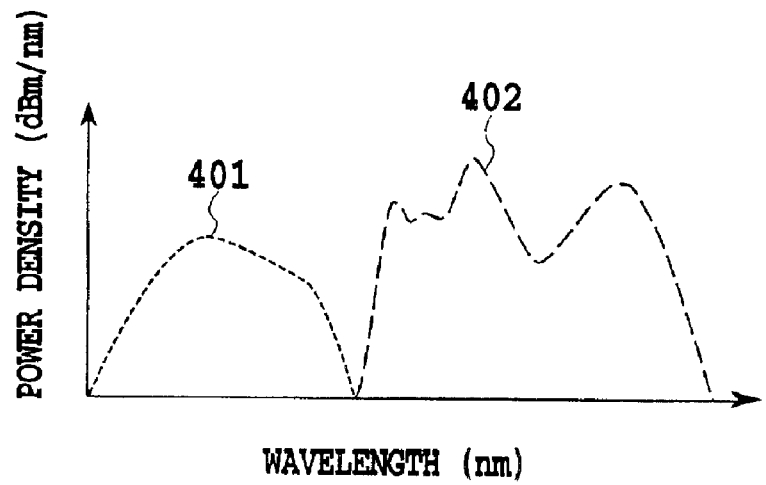
FIGS. 4B and 4C are schematic charts of the output spectra of a white light that can be output from components of this white light source.
Figure 4C:
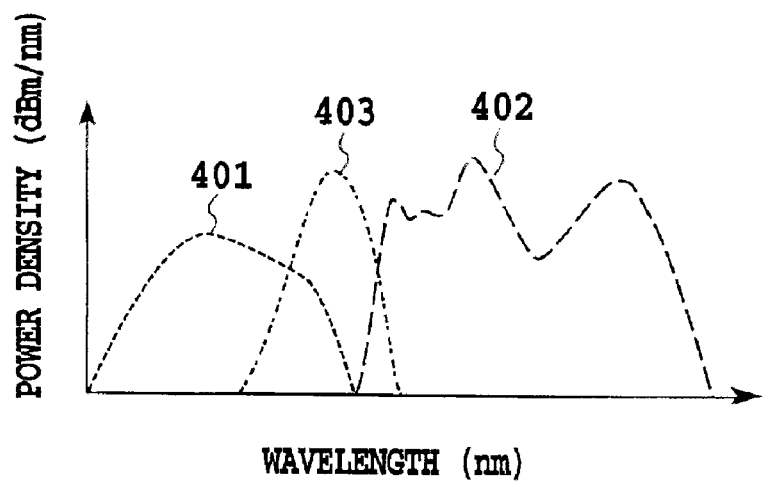
Figure 4D:
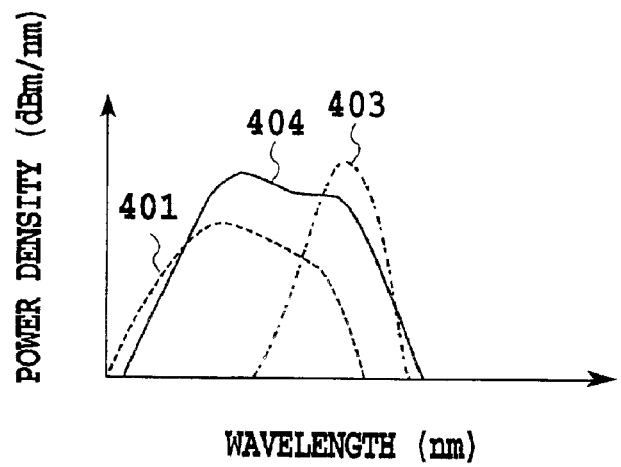
FIGS. 4D and 4E are schematic charts of the output spectra of a white light obtained by combining output light output from the components.
Figure 4E:
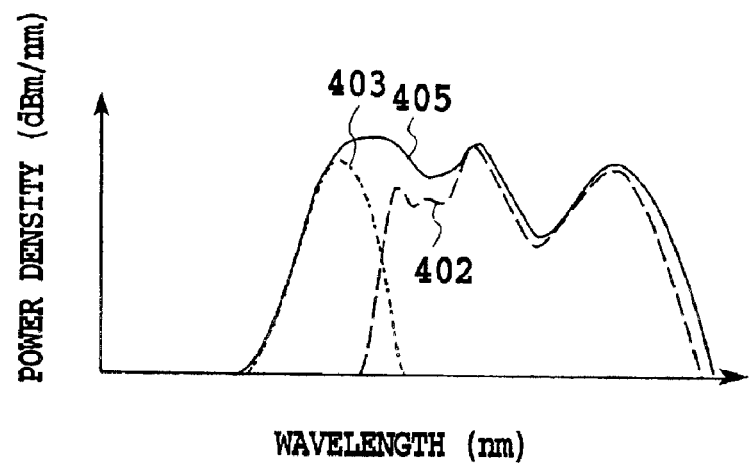

Now, output spectra in the second embodiment will be described with reference to FIGS. 4B–4E, taking for instance the case in which a Tm- or Er-doped fiber is used as the rare earth-doped fiber 13 and a silica Raman fiber is used as the Raman fiber 23. FIG. 4B is a schematic chart showing the output spectra of amplified spontaneous emission light from rare earth-doped (Tm- and Er-doped) fibers. FIG. 4C is a schematic chart showing the output spectra of amplified spontaneous emission light from a rare earth-doped fiber and a Raman fiber. FIG. 4D is a schematic chart showing the output spectra of amplified spontaneous emission light from a Tm-doped fiber and a Raman fiber. FIG. 4E is a schematic chart showing the output spectra of amplified spontaneous emission light from an Em-doped fiber and a Raman fiber.

First, the Tm- and Er-doped fibers can generate amplified spontaneous emission light such as 401 and 402, shown in FIG. 4B. On the other hand, selection of a proper wavelength range as described above enables the Raman fiber to generate an amplified spontaneous emission light such as 403, shown in FIG. 4C. Accordingly, combining, for example, a Tm-doped fiber and a Raman fiber enables a white light with a broad wavelength range 404 to be generated as shown in FIG. 4D. Likewise, combining an Er-doped fiber and a Raman fiber enables a white light with a broadband wavelength range such as 405, shown in FIG. 4E to be generated.

Thus, the second embodiment provides the output spectrum 404 or 405 with a broadband wavelength range, which is a combination of the output spectrum 401 or 402 obtained from the first active fiber (rare earth-doped fiber) 13 and the output spectrum 403 obtained from the Raman fiber 23, as shown in FIGS. 4C and 4E.

In the above example, the two active fibers are combined, but more active fibers can be combined if an increase in cost and a decrease in efficiency associated with series connections are negligible. Further, the types of the first and second active fibers are interchangeable. That is, in the embodiment described above, a Raman fiber can be used as the first active fiber, and a rare earth-doped fiber can be used as the second active fiber.

Next, a third embodiment of the present invention will be described with reference to FIGS. 5A to 5D.

Figure 5A:
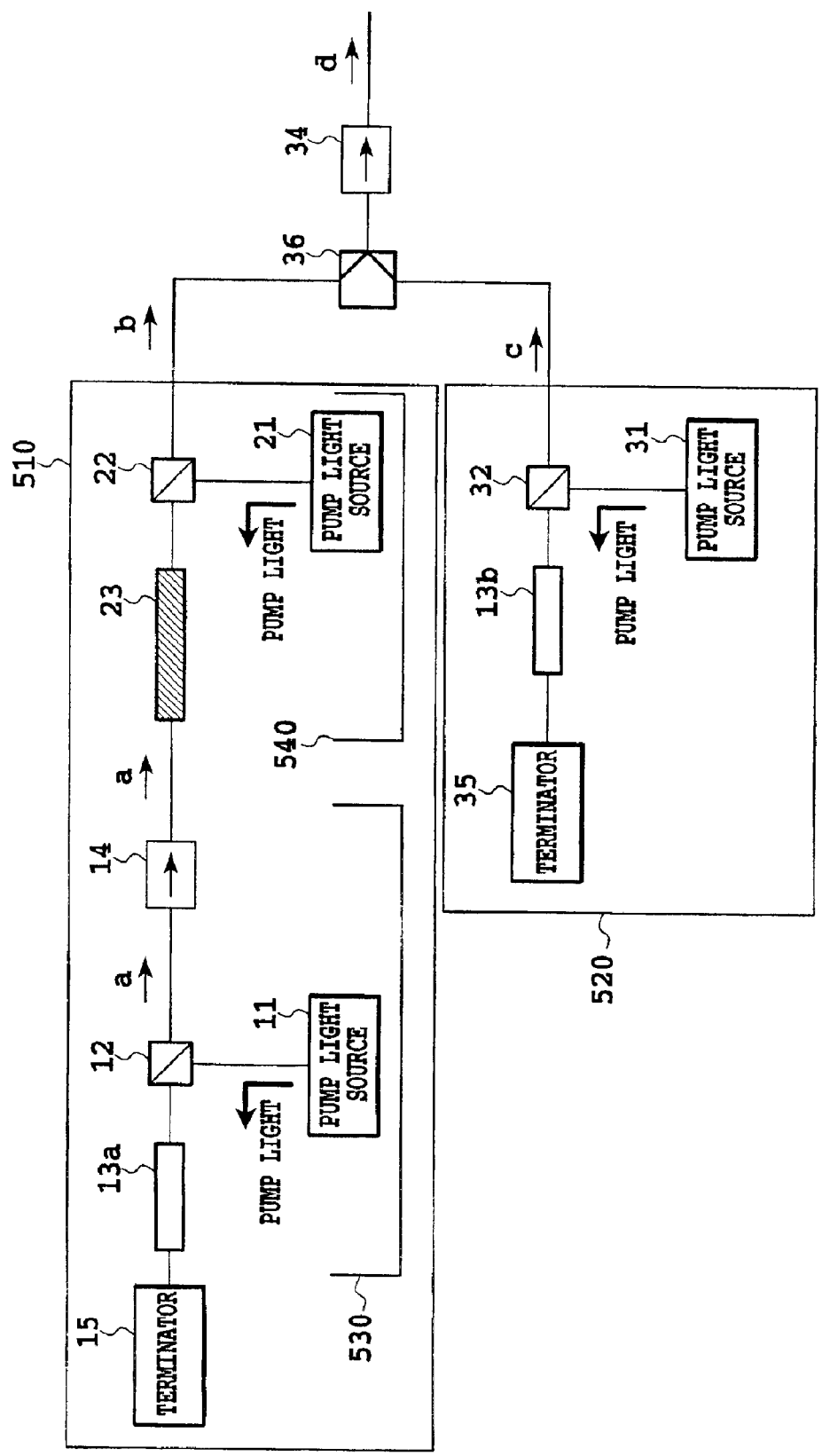
FIG. 5A is a schematic diagram showing the configuration of yet another white light source according to the present invention (the first aspect of the present invention)
Figure 5B:
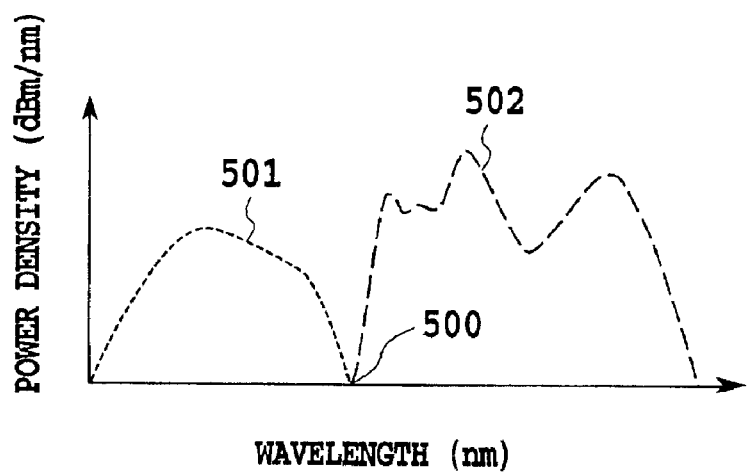
FIG. 5B is a schematic chart of the output spectra of a white light that can be output from components 530 and 520 of this white light source.
Figure 5C:
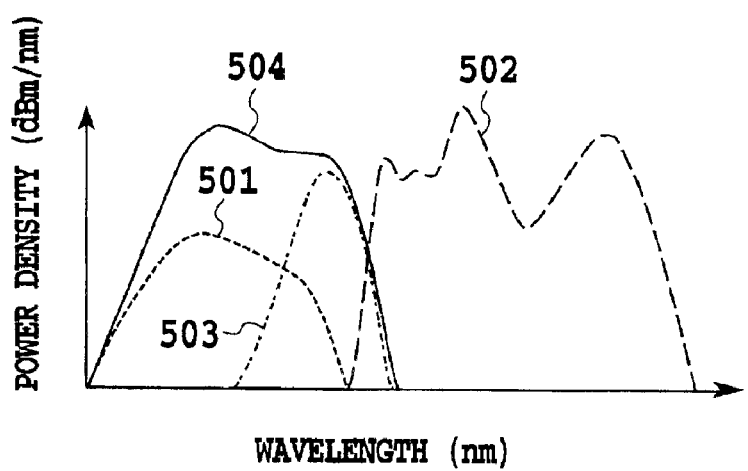
FIG. 5C is a schematic chart of the output spectra of a white light that can be output from a component 510 of this white light source and the component 520.
Figure 5D:
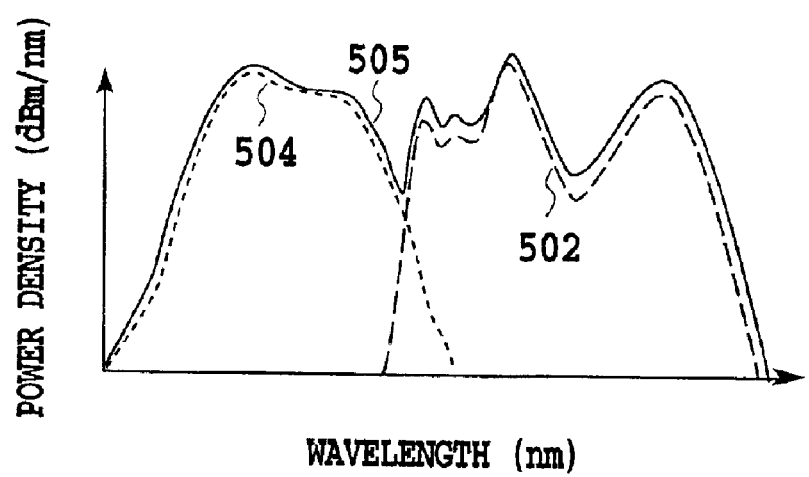
FIG. 5D is a schematic chart of the output spectrum of a white light that can be output from this white light source.

FIG. 5A is a schematic diagram showing the configuration of a white light source according to the third embodiment, and FIG. 5B to FIG. 5D are schematic charts showing a spectrum obtained from this white light source. In the third embodiment, the white light source is composed of a first white light generating section 510 and a second white light generating section 520 which are connected in parallel by a multiplexer 36. Further, the multiplexer 36 has an isolator 34 provided at its output side.

The first white light generating section 510 in the third embodiment is similar to the configuration shown in FIG. 4A. That is, the first white light generating section 510 is composed of a first amplified spontaneous emission generating section 530, the isolator 14, a second amplified spontaneous emission generating section 540, and the terminator 15. The first amplified spontaneous emission generating section 530 comprises the first active fiber 13a, the multiplexer 12 provided at one end of the fiber 13a, and the pump light source 11 connected to the first active fiber 13a via the multiplexer 12. Furthermore, in the first white light generating section, one end of the second active fiber 23 is connected to the multiplexer 12 of the first amplified spontaneous emission generating section 530 via the isolator 14. The other end of the active fiber 23 is connected to the pump light source 21 via the multiplexer 22. Further, the terminator 15 is provided at an opposite end to the multiplexer 12 of the first amplified spontaneous emission generating section 530. In the third embodiment, the second white light generating section 520 is connected in parallel with the first white light generating section 510 via the multiplexer 36, and an isolator 34 is further connected to the output of the multiplexer 36. The second white light generating section 520 comprises a third active fiber 13b, a multiplexer 32 provided at one end of the fiber 13b, a pump light source 31 connected to the third active fiber 13b via the multiplexer 32, and a terminator 35 provided at the other end of the third active fiber 13b.

In the third embodiment, the first active fiber 13a is, for example, doped with rare earth, the second active fiber 23 may be, for example, a Raman fiber, and the third active fiber 13b may be, for example, a rare earth-doped fiber. Any combination of active fibers may be used as long as they can have a desired output spectrum. The types of and the conditions for these active fibers are as described in the first and second embodiments.

The operation of the third embodiment will be described in connection with the case in which rare earth-doped fibers are used as the first and third active fibers and a Raman fiber is used as the second active fiber. In the first amplified spontaneous emission generating section 530, first, a pump light from the pump light source 11 pumps the first active fiber 13a. This pumping locally generates a spontaneous emission light in the first active fiber 13a, and the generated light is amplified while transmitting through the first active fiber 13a in the direction of the fiber axis. The amplified light (amplified spontaneous emission light) is emitted in both directions of the active fiber 13a, that is, to the isolator and the terminator sides. Then, the amplified spontaneous emission light output to the multiplexer 12 by the first active fiber 13a (the first amplified spontaneous emission light a) is input to the second amplified spontaneous emission generating section 540 via the isolator 14. In the second amplified spontaneous emission generating section 540, the amplified spontaneous emission light a is introduced into the Raman fiber 23 and then amplified therein except for a part of a short wavelength range. The amplified light is added to an amplified spontaneous emission light from the Raman fiber 23 which is generated by a pump light from the pump light source 21. Then, an output light b is output. On the other hand, in the second white light generating section 520, an amplified spontaneous emission light c is emitted from the multiplexer 32 in the same way as described in the first amplified spontaneous emission generating section 530. The amplified spontaneous emission lights a and c are coupled by the multiplexer 36 and then output via the isolator 34 as an output light d.

Now, output spectra in the third embodiment will be described with reference to FIGS. 5B to 5D, taking for instance the case in which a Tm-doped fiber is used as the rare earth-doped fiber 13a, an Er-doped fiber is used as the rare earth-doped fiber 13b, and a silica Raman fiber is used as the Raman fiber 23. FIG. 5B is a schematic chart showing the output spectra of amplified spontaneous emission light from rare earth-doped fibers (a Tm- and Er-doped fibers). FIG. 5C is a schematic chart showing the output spectra of amplified spontaneous emission light from the rare earth-doped fibers (the Tm- and Er-doped fibers) and a Raman fiber, as well as the output spectrum of an output light b. FIG. 5D is a schematic chart showing the output spectrum of the output light b, an output spectrum from the Er-doped fiber 13b, and the output spectrum of an output light d.

First, as shown in FIG. 5B, the Tm- and Er-doped fibers can generate amplified spontaneous emission light such as 501 and 502, shown in FIG. 5B. Here, with a conventional parallel-connected white light source such as the one shown in FIG. 1B, a valley portion 500 may be present as shown in FIG. 5B, resulting in an area from which an output with a sufficient power density is not obtained. On the other hand, selection of a proper wavelength range for pump light as described above enables the Raman fiber to generate an amplified spontaneous emission light such as 503 in FIG. 5C. Accordingly, when the second amplified spontaneous emission generating section 540 comprising the Raman fiber 23 is provided at the output of the first amplified spontaneous emission generating section 530 to form the white light generating section 510 (for example, by combining a Tm-doped fiber and a Raman fiber) as in the second embodiment of the present invention, the output light b can be generated, which has the output spectrum 504 with a broadband wavelength range as shown in FIG. 5C. In this case, the output light b can have a wavelength range partially sufficiently overlapping the wavelength range of the output spectrum 502 output from the second white light generating section 520. Furthermore, a white light d with a broadband wavelength range is obtained by multiplexing the output light b from the white light generating section 510 and the output light c from the white light generating section 520.

Thus, in the third embodiment, as shown in FIG. 5D, the output spectrum 501 obtained from the first active fiber (rare earth-doped fiber) 13a and the output spectrum 503 obtained from the Raman fiber 23 are multiplexed to obtain the output light b with the broadband output spectrum 504, and then the output light c from the white light generating section 520 and the output light b are multiplexed to obtain the output light d (spectrum 505 as shown in FIG. 5D) having more broadband output spectrum and a sufficient power density.

In the above embodiment, rare earth-doped fibers are used as the first and third active fibers, and a Raman fiber is used as the second active fiber. However, in the present invention, any combination of fibers may be used as these active fibers. That is, for example, rare earth-doped fibers are used as the second and third active fibers, and a Raman fiber is used as the first active fiber.

In the first aspect of the present invention, the two active fibers may also be a combination of any of a rare earth-doped fiber, an optical fiber for Raman amplification, a semiconductor, a rare earth-doped waveguide, or a solid waveguide having a color center.

The pump light source, terminator, multiplexer, and isolator in the first aspect of the present invention may appropriately be selected from conventional corresponding equipment depending on the active fibers used.

For example, the pump light source can have a wavelength range from 1,200 nm to 1,600 nm depending on the active fibers used. Specifically, with Raman fibers as active fibers and a pump light source that pumps the Raman fibers, the pump light source preferably has a pump light wavelength between about 1,450 nm and about 1,580 nm. Alternatively, the pump light source that pumps the Raman fibers preferably has a pump wavelength between, for example, about 1,370 nm and about 1,500 nm.

As another example, with a white light source comprising erbium-doped fibers as active fibers and a pump light source that pumps the erbium-doped fibers, the pump light source preferably has a pump light wavelength of 1,500 nm or less.

As still another example, with a white light source comprising a thulium-doped core and terbium-doped clad fibers as active fibers and a pump light source that pumps the thulium-doped core and terbium-doped clad fibers, the pump light source preferably has a pump light wavelength of 1,500 nm or less.

Now, a second aspect of the present invention will be described.

The second aspect of the present invention relates to a white light source characterized in that an amplified spontaneous emission generating section has a mirror or a Faraday rotator mirror provided at the other end thereof.

A first embodiment of the second aspect of the present invention will be described with reference to FIG. 6.

Figure 6:
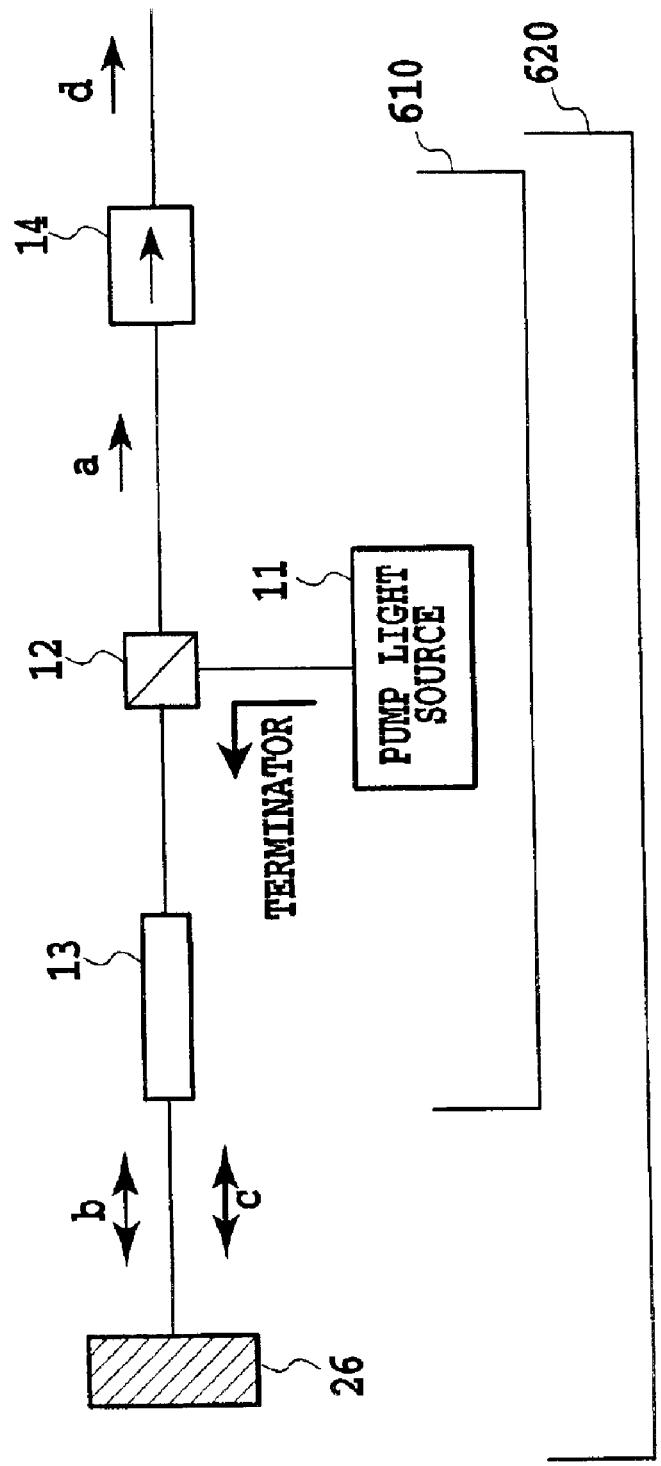
FIG. 6 is a schematic diagram showing the configuration of still another white light source according to the present invention (a second aspect of the present invention)

FIG. 6 is a schematic diagram illustrating a white light source in which an amplified spontaneous emission generating section has a mirror or a Faraday rotator mirror located at the other end thereof. In this white light source, the amplified spontaneous emission generating section has the mirror provided at one end thereof and an isolator provided at the other end.

An amplified spontaneous emission generating section 610 in this embodiment comprises the active fiber 13 to which the pump light source 11 is connected via the multiplexer 12. A configuration (for example, 620 in FIG. 6) in which a mirror or Faraday rotator mirror and an isolator are further connected to the amplified spontaneous emission generating section is referred to as a "white light generating section" herein, as in the case with the first aspect.

In the white light generating section 620 in this embodiment, a rare earth-doped fiber such as an Er- or Tm-doped fiber or a Raman fiber for Raman amplification can be suitably used as the active fiber 13. The active fiber 13 is pumped with pump light from the pump light source 11 to generate an amplified spontaneous emission light. Of this amplified spontaneous emission light, light a emitted from the active fiber 13 to the multiplexer 12 side is output through the multiplexer 12 and isolator 14. Further, an amplified spontaneous emission light b emitted from the active fiber 13 at an opposite end to the multiplexer 12 side is reflected by a mirror 26, then is input to the active fiber 13 again, and is amplified. The amplified light is emitted from the active fiber 13 to the multiplexer 12. That is, the amplified light joins with the amplified spontaneous emission light a emitted from the active fiber 13. Consequently, all the amplified spontaneous emission light is output as white light d without being discarded.

Further, pump light c that has passed through the active fiber 13 without being absorbed thereby is reflected by the mirror 26 and then is input to and again pumps the active fiber 13.

In the second aspect of the present invention, the mirror 26 preferably has a high reflectance with respect to both amplified spontaneous emission light and pump light. Further, the mirror includes a mirror face with a film of deposited gold or the like on the fiber end and a combination of a fiber, a collimating lens, and a plate-shaped reflector (the plate-shaped reflector is similar to what is called a regular mirror plate).

Thus, this embodiment is efficient because all the amplified spontaneous emission light is output as white light without being discarded. Also, all of the pump light can be used without being discarded, thereby improving the pumping efficiency of the white light source. Consequently, white light of increased power can be output. Further, a less expensive low-output pump light source can be used.

The active fibers can be properly selected depending on the desired white light source. With rare earth-doped fibers, the doping concentration of rare earth elements, the length of the fibers, and the like may be appropriately selected depending on the desired white light source. Specifically, for example, with EDFs, the doping concentration is preferably 1,000 wt.ppm, and the fiber length is preferably 10 m. With silica Raman fiber, which is a kind of Raman fibers, the fiber length is preferably 2.5 km.

Components such as, for example, the pump light source, terminator, multiplexer, and isolator in the first embodiment may be appropriately selected from conventional corresponding equipment depending on the active fibers used. For example, the pump light source can have a wavelength range from 1,200 nm to 1,600 nm depending on the active fibers used. Specific examples of pump wavelength are as described in the first aspect.

In the first embodiment of the second aspect of the present invention, a single active fiber is used, but more white light generating sections can be combined if an increase in cost and a decrease in efficiency associated with series connections are negligible. For example, it is possible to connect the two white light generating sections in parallel via the multiplexer or in series via a circulator.

Specifically, in the first embodiment of the first aspect shown in FIG. 3A, the terminator 15 is replaced with a mirror 26a, and a second mirror 26b may be provided between the isolator 14 and the second active fiber 13b. In this case, the mirror 26b has the function of totally or partially transmitting a given part of the wavelength range of the amplified spontaneous emission light from the active fiber 13b which contains a wavelength part z, while totally or partially reflecting the remaining part of the wavelength range. A white light source constructed in this manner efficiently generates a broadband white light having the wavelength ranges of the first and second amplified spontaneous emission light emitted from the first and second active fibers. Further, even if the power spectra of the first and second amplified spontaneous emission light are not flat, the white light having this amplified spontaneous emission light can be flattened.

Furthermore, in this example, the mirror 26b can be replaced with a chirp type fiber grating (FG) or a spectrum equalizer. The use of such equipment enables a broadband output white light to be flattened.

Figure 7:
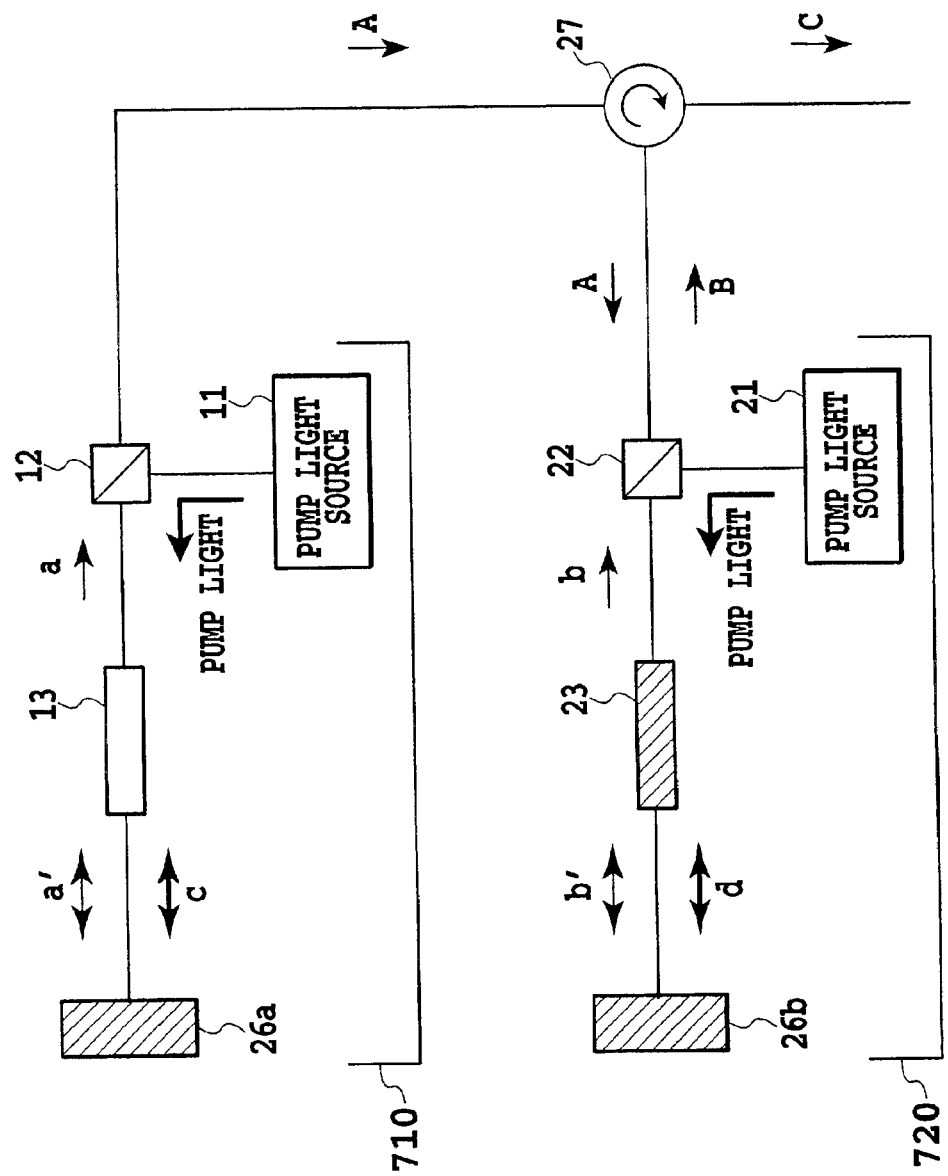
FIG. 7 is a schematic diagram showing the configuration of yet another white light source according to the present invention (the second aspect of the present invention)

Now, a second embodiment of the second aspect of the present invention will be described with reference to FIG. 7.

In this second embodiment, the white light generating sections in the first embodiment are connected in series via a circulator. FIG. 7 is a schematic diagram showing this configuration. FIG. 7 shows the active fiber 13 in a first white light generating section 710 and the active fiber 23 of a different type in a second white light generating section 720. In the present invention, any active fibers such as rare earth-doped fibers or Raman fibers may be used as the active fibers in these white light generating sections. A combination of rare earth-doped fibers, a combination of Raman fibers, or a combination of a rare earth-doped fiber and a Raman fiber, or any other combinations can be used as the combinations of the active fibers in the first and second white light generating sections.

The operation of the white light source of the second embodiment will be described. The active fiber 13 is pumped with pump light from the pump light source 11 to generate an amplified spontaneous emission light. Of this amplified spontaneous emission light, light a emitted from the active fiber 13 to the multiplexer 12 side is output through the multiplexer 12. Further, amplified spontaneous emission light a' emitted from the active fiber 13 in an opposite side to the multiplexer 12 side is reflected by the mirror 26a, then is input to the active fiber 13 again, and is amplified. The amplified light is emitted from the active fiber 13 to the multiplexer 12 side. That is, the amplified light joins with the amplified spontaneous emission light a emitted from the active fiber 13. Consequently, all the amplified spontaneous emission light is output as white light A without being discarded. The output light A has an increased intensity compared to the amplified spontaneous emission light a.

Further, a pump light c that has passed through the active fiber 13 without being absorbed thereby is reflected by the mirror 26a and then is input to and again pumps the active fiber 13.

On the other hand, the second active fiber 23 emits an amplified spontaneous emission light b to the multiplexer 22 side. Further, an amplified spontaneous emission light emitted from the second active fiber 23 to the mirror side is reflected by the mirror 26b, then is input to the second active fiber again, and is amplified. The amplified light joins with an amplified spontaneous emission light b and is then emitted through an emission port of a circulator 27 as an output light B. The output light B has an increased intensity compared to the amplified spontaneous emission light b.

Further, a pump light d that has passed through the active fiber 23 without being absorbed thereby is reflected by the mirror 26b and then is input to and again pumps the active fiber 23.

Furthermore, the above described output light A can be input to the second active fiber via the circulator 27. The output light A input to the second active fiber 23 is amplified by the active fiber 23 as described for the second active fiber, then is added to the output light B from the second active fiber. As a result, an output light C can be output.

Thus, the second embodiment is efficient because all the amplified spontaneous emission light is output as white light without being discarded. Further, the pump light can also be used without being discarded, thereby improving the pumping efficiency of the white light source. Consequently, white light of increased power can be output. Furthermore, active fibers of different types can be combined in series, thereby providing white light with a broader band. Further, a less expensive low-output pump light source can be used.

In the second embodiment of the second aspect of the present invention, two active fibers are used, but more white light generating sections can be combined if an increase in cost and a decrease in efficiency associated with series connections are negligible. For example, it is possible to connect a third white light generating section in parallel with the first and second white light generating sections via a multiplexer or to connect the three white light generating sections together in series using the circulator. Alternatively, in the second embodiment of the second aspect, the circulator 27 may be replaced with a multiplexer, and the first and second white light generating sections 710 and 720 may be connected in parallel.

In the second embodiment of the second aspect, if the active fibers are doped with rare earth, then the doping concentration of rare earth elements, the length of the fibers, and the like may be appropriately selected depending on the desired white light source. Specifically, for example, conditions similar to those for the first embodiment can be selected.

Further, the pump light source, terminator, multiplexer, and circulator in the second embodiment may be appropriately selected from corresponding conventional equipment depending on the active fibers used. For example, the pump light source can have a wavelength range from 1,200 nm to 1,600 nm depending on the active fibers used. Specific examples of pump wavelength are as described in the first aspect.

Figure 8:
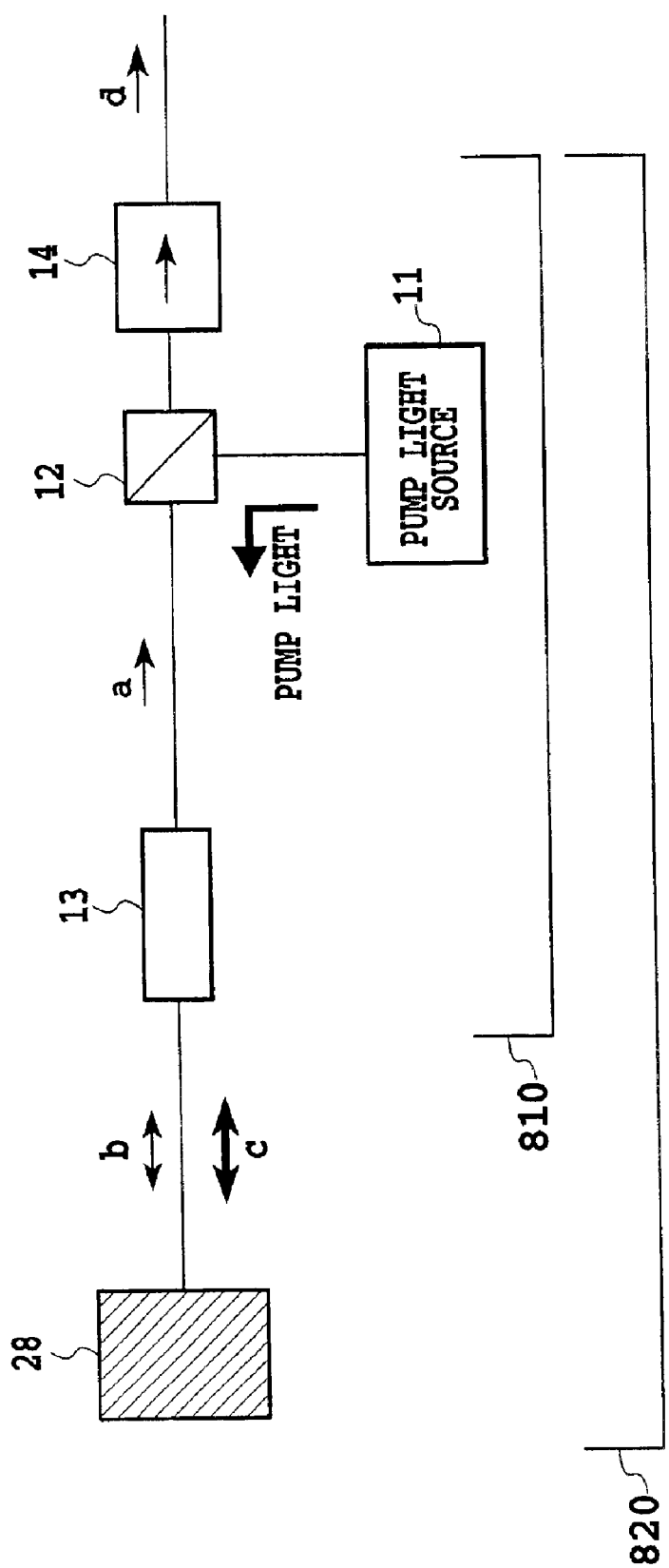
FIG. 8 is a schematic diagram showing the configuration of still another white light source according to the present invention (the second aspect of the present invention)

Now, a third embodiment of the second aspect of the present invention will be described. In the third embodiment, the mirror used in the first embodiment of the second aspect is constructed as a Faraday rotator mirror. This construction is shown in FIG. 8. In the third embodiment, the conditions (the active fibers, pump light source, isolator, and others) other than the use of the Faraday rotator mirror are similar to those for the first embodiment of the second aspect.

FIG. 8 is schematic diagram illustrating a white light source in which the mirror in the white light source of the first embodiment is replaced with a Faraday rotator mirror.

In an amplified spontaneous emission generating section 810 in this embodiment, the active fiber 13 has the pump light source 11 connected thereto via the multiplexer 12.

In a white light generating section 820 in this embodiment, a rare earth-doped fiber such as an Er- or Tm-doped fiber, or a Raman fiber for Raman amplification can be suitably used as the active fiber 13. The active fiber 13 is pumped with pump light from the pump light source 11 to generate an amplified spontaneous emission light, of this amplified spontaneous emission light, light a emitted from the active fiber 13 to the multiplexer 12 side is output through the multiplexer 12 and isolator 14. Further, an amplified spontaneous emission light b emitted from the active fiber 13 in an opposite side to the multiplexer 12 is reflected by a Faraday rotator mirror 28, then is input to the active fiber 13 again, and is amplified. The amplified light is emitted from the active fiber 13 to the multiplexer 12. That is, the amplified light joins with the amplified spontaneous emission light a emitted from the active fiber 13. Consequently, all the amplified spontaneous emission light is output as white light d without being discarded. Therefore, this white light has an increased intensity compared to the amplified spontaneous emission light a.

Further, pump light c that has passed through the active fiber 13 without being absorbed thereby is reflected by the Faraday rotator mirror 28, then is input to and again pumps the active fiber 13.

Figure 9:
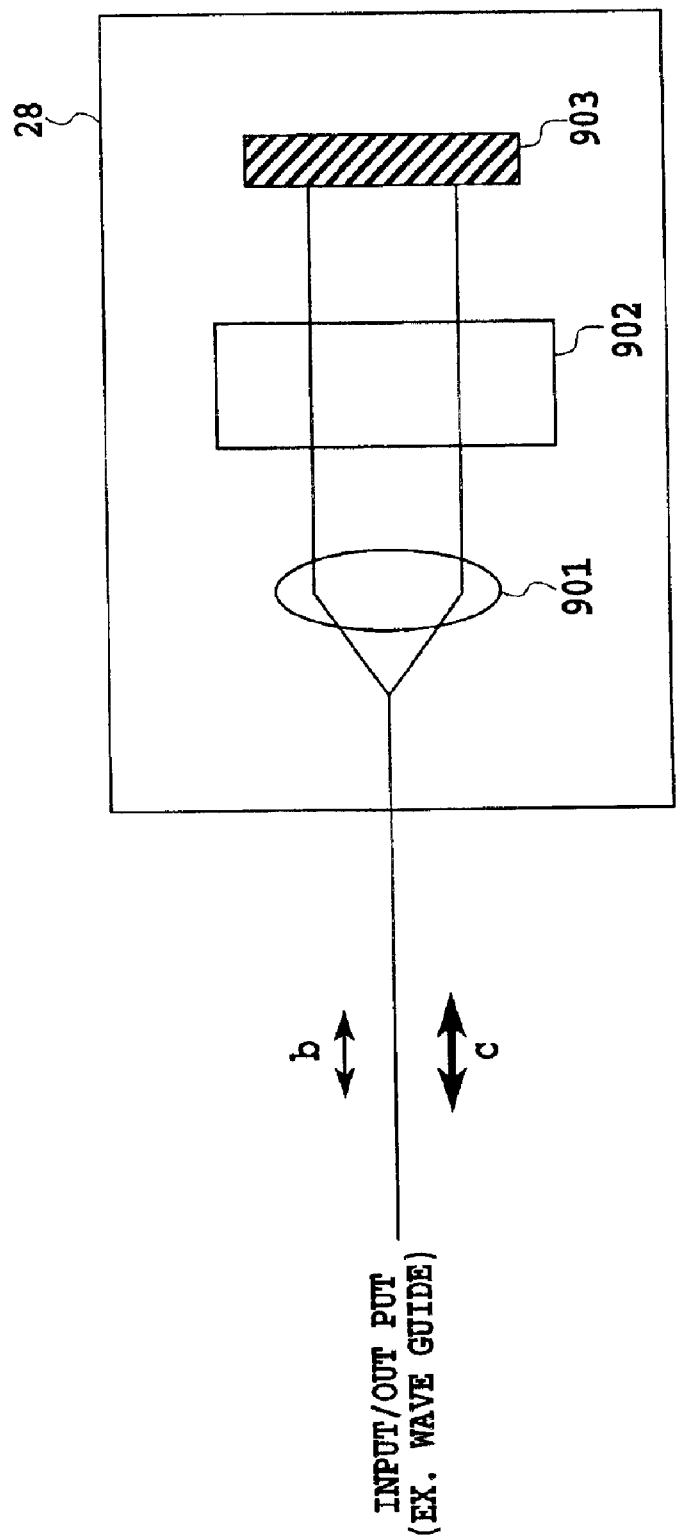
FIG. 9 is a schematic diagram illustrating the configuration of a Faraday rotator mirror.

Next, the Faraday rotator mirror will be described with reference to FIG. 9. This figure is a schematic view showing the faraday rotator mirror 28.

The Faraday rotator mirror 28 has a lens 901, a Faraday rotator 902, and a reflector 903 (what is called a mirror plate). While the mirror 26 described in the first and second embodiments of the second aspect of the present invention simply reflects an incident amplified spontaneous emission light, the Faraday rotator mirror 28 shown in FIG. 9 reflects an amplified spontaneous emission light as follows: an amplified spontaneous emission light emitted from a light waveguide is converted into a parallel light by a lens 901, and the parallel light is input to the Faraday rotator 902. A polarization vector of the amplified spontaneous emission light is converted by passing through the Faraday rotator 902. For example, when the incidence of a linearly polarized light is considered, the orientation of the polarization vector of this light is rotated through 45°. In this case, the Faraday rotator 902 is called a "45° Faraday rotator".

The amplified spontaneous emission light emitted from the Faraday rotator 902 is reflected by the reflector 903 and then is input to the Faraday rotator 902. Subsequently, the amplified spontaneous emission light is further rotated through 45°, and when it is output from the Faraday rotator mirror 28, a polarization vector of the amplified spontaneous emission light is rotated through 90° from the initial orientation of the linearly polarized light.

In the third embodiment, the use of the above described Faraday rotator mirror improves the stability of the power of an output light when the white light output is set high, thereby increasing the maximum power of the output light.

The second aspect of the present invention is characterized in that a mirror or a Faraday rotator mirror is provided, and this characteristic serves to provide white light having a band broader than that provided by the conventional white light source and a power density higher than a specified value (for example, −20 dBm/nm). Consequently, white light with a flattened output spectrum is stably obtained.

As described above, the white light source of the present invention has a broadband and sufficiently high power and enables an output spectrum to be flattened. Further, the white light source of the present invention has a simpler configuration than the conventional one, thereby allowing costs to be reduced.

In the second aspect of the present invention, the two active fibers may be a rare earth-doped fiber, an optical fiber for Raman amplification, a semiconductor, a rare earth-doped waveguide, or a solid waveguide having a color center. If a plurality of active fibers are used, a combination of any of these is possible.

Further, the pump light source, terminator, multiplexer, and isolator in the second aspect may appropriately be selected from corresponding conventional equipment depending on the active fibers used.

For example, the pump light source can have a wavelength range from 1,200 nm to 1,600 nm depending on the active fibers used. Specifically, with Raman fibers as active fibers and a pump light source that pumps the Raman fibers, the pump light source preferably has a pump light wavelength between about 1,450 nm and about 1,580 nm. Alternatively, the pump light source that pumps the Raman fibers preferably has a pump wavelength between, for example, about 1,370 nm and about 1,500 nm.

As another example, with a white light source comprising erbium-doped fibers as active fibers and a pump light source that pumps the erbium-doped fibers, the pump light source preferably has a pump light wavelength of 1,500 nm or less.

As still another example, with a white light source comprising a thulium-doped core and terbium-doped clad fibers as active fibers and a pump light source that pumps the thulium-doped core and terbium-doped clad fibers, the pump light source preferably has a pump light wavelength of 1,500 nm or less.

EXAMPLES

The present invention will be described below in further detail with reference to examples. However, these examples are only illustrative and are not intended to limit the present invention.

Example 1

Figure 10A:
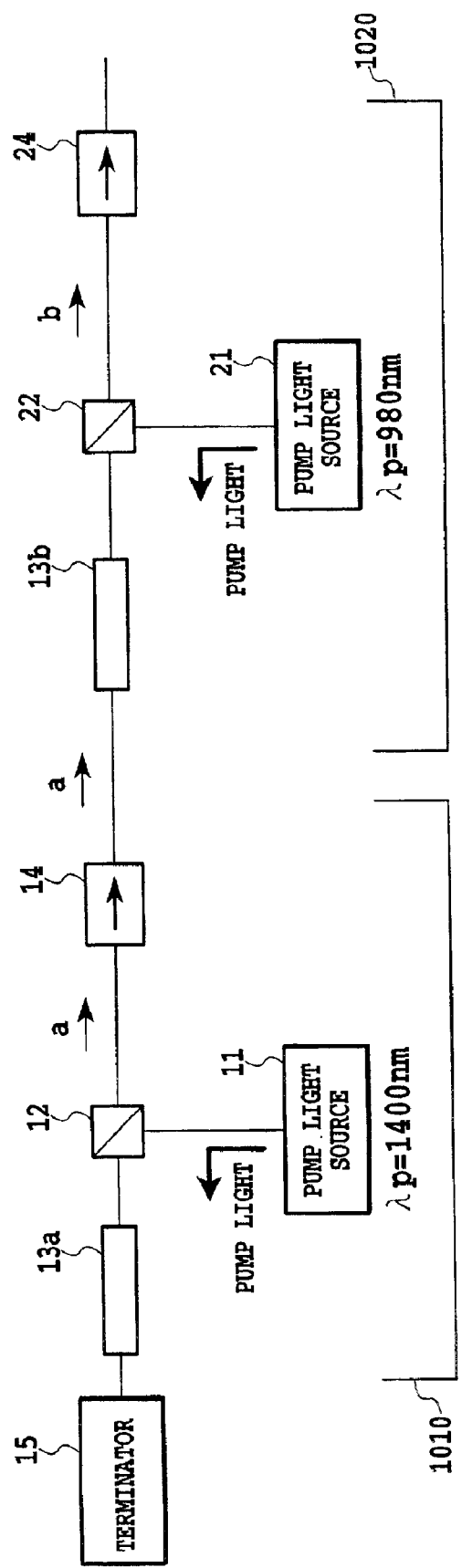

This is an example of the above described first embodiment of the first aspect. FIG. 10A is a schematic diagram showing an example of a white light source in Example 1.

In this example, a Tm-doped fiber (TDF: Tm doping concentration: 6,000 wt.ppm, fiber length: 5 m) is used as the first active fiber 13a, and an Er-doped fiber (EDF: Er doping concentration: 2,000 wt.ppm, fiber length: 10 m) is used as the second active fiber 13b. An amplified spontaneous emission light emitted from the TDF 13a to the multiplexer 12 is input to the second active fiber 13b via the isolator 14. The TDF 13a is pumped with a 1,400 nm pump light, and the amplified spontaneous emission light output from the TDF has a spectrum such as the one shown at 1001 in FIG. 10B. On the other hand, the EDF 13b is pumped with a 980 nm pump light, and an amplified spontaneous emission light output from the EDF 13b has an intensity peak near 1,540 nm (see 1002 in FIG. 10B).

Further, the amplified spontaneous emission light a is amplified in the EDF 13b and added to an amplified spontaneous emission light generated in the EDF. As a result, an output light (amplified spontaneous emission light) b emitted from the EDF 13b has a broader band than the amplified spontaneous emission light a and the amplified spontaneous emission light generated in the EDF alone. Accordingly, the present invention has the advantage of obtaining white light having an output spectrum with a broader band.

Figure 10B:
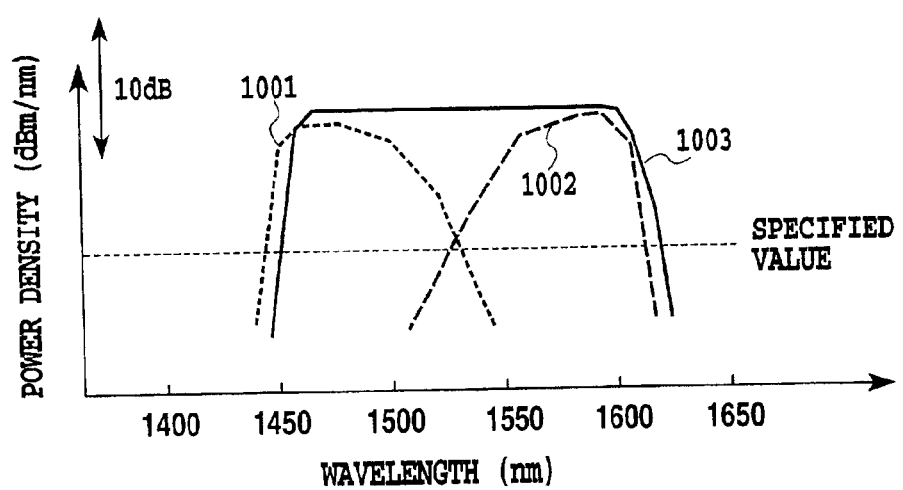

FIG. 10B shows a schematic diagram of the output spectrum of the white light source of this example. As shown in this figure, two types of amplified spontaneous emission light having partially overlapping wavelength ranges are combined to obtain an output light having the output spectrum shown at 1003 in FIG. 10B. Thus, the configuration of this example provides a white light having a broadband between about 1,450 nm and about 1,620 nm.

As is apparent from the operation of the above described white light source, an output white light with a broader band is achieved by a partial overlap of the wavelength ranges between the amplified spontaneous emission light a and the amplified spontaneous emission light generated in the rare earth-doped fiber 13b. Therefore, the active fibers are not limited to EDFs or TDFs as long as they meet the required condition (i.e. partial overlapping thereof). The two active fibers may be a combination of any of a rare earth-doped fiber, an optical fiber for Raman amplification (for example, a silica Raman fiber or a tellurite Raman fiber), a semiconductor, a rare earth-doped waveguide, or a solid waveguide having a color center.

Specifically, for example, an EDF may be used as the first active fiber 13a. In this case, the second active fiber (EDF) 13b is pumped with a 1,480 nm pump light. Alternatively, a Raman fiber may be used in place of the TDF 13a though this configuration is partly the same as part of Example 2, described later. In this case the pump light wavelength of the pump light source 11 is set near 1,380 nm. In this case, the amplified spontaneous emission light a from the Raman fiber and the amplified spontaneous emission light from the EDF have spectra that are slightly different from but mostly similar to those obtained when the TDF is used. For example, the output light (amplified spontaneous emission light) b having a power density equal to or higher than a specified value has almost the same bandwidth.

Furthermore, in this example, the positions of the Tm-doped fiber 13a and the Er-doped fiber 13b may be interchanged. With a wavelength of about 1,520 nm or less, a gain corresponding to an incident light input to an Er-doped fiber generally decreases consistently as the wavelength is shorter. Accordingly, if the positions of the Tm-doped fiber 13a and Er-doped fiber 13b are interchanged, the output light has a higher power density in a short wavelength part than in the configuration of this example. This is an advantage of the present invention.

Further, this example has been described in conjunction with two active fibers, but more active fibers may be connected in series.

Example 2

Example 2-1

Figure 11A:
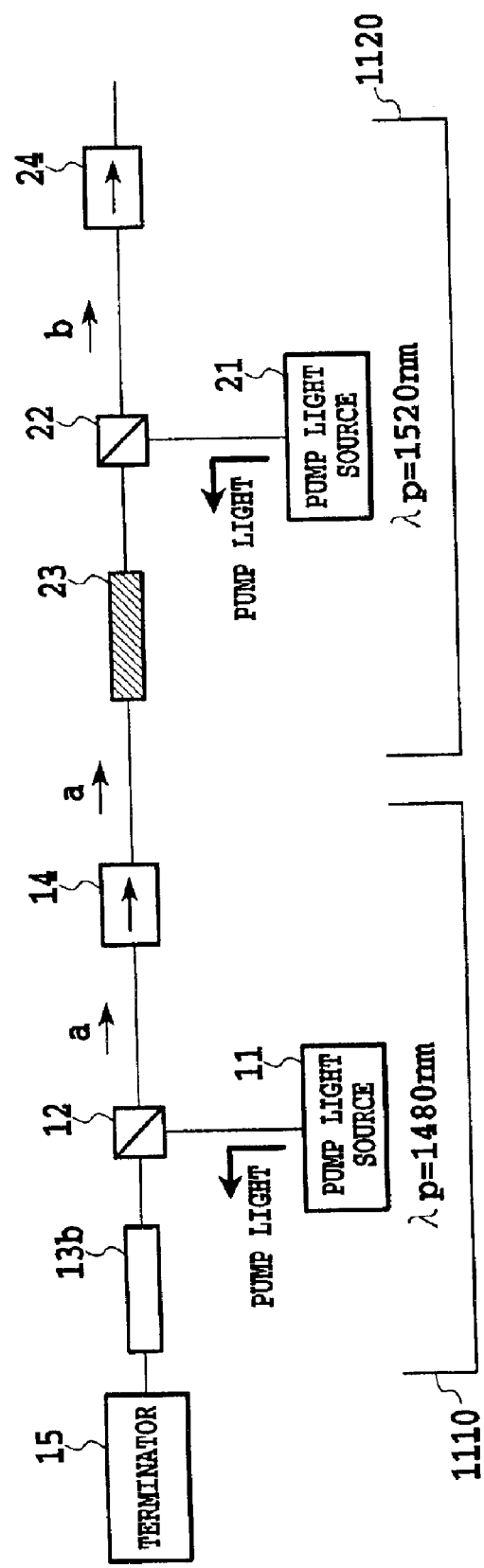

This example illustrates the above described second embodiment of the first aspect. FIG. 11A is a schematic diagram showing an example of a white light source of this example.

Figure 11B:
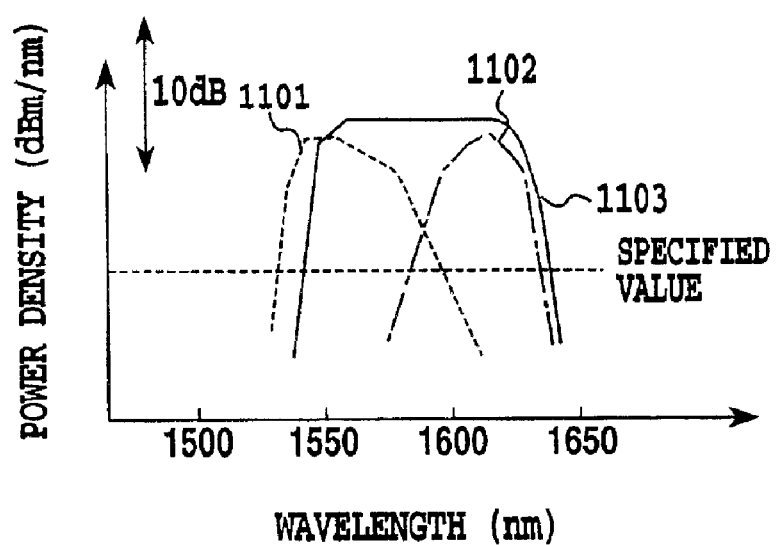

This example uses an Er-doped fiber (EDF; Er doping concentration: 1,000 wt.ppm, fiber length: 20 m) as the active fiber 13b as well as the Raman fiber (silica Raman fiber: fiber length: 5 km) 23. The Raman fiber 23 is an optical fiber that outputs an amplified spontaneous emission light utilizing Raman amplification. An amplified spontaneous emission light a emitted from the EDF 13b to the multiplexer 12 side is input to the Raman fiber 23 via the isolator 14. A spectrum of the amplified spontaneous emission light a is shown at 1101 in FIG. 11B. The amplified spontaneous emission light a has an intensity of a specified value or more in a wavelength part from about 1,530 nm to about 1,590 nm. This amplified spontaneous emission light a is obtained by exciting an EDF with a 1,480 nm pump light. The Raman fiber 23 is pumped at a wavelength of 1,520 nm, and solely emits an amplified spontaneous emission light having an intensity peak at about 1,620 nm (see 1102 in FIG. 11B).

The first amplified spontaneous emission light a is amplified in the Raman fiber 23 except for a short wavelength part, and is added to an amplified spontaneous emission light generated in the Raman fiber 23. As a result, an amplified spontaneous emission light emitted from the Raman fiber 23 has a band equal to a combination of the bands of the amplified spontaneous emission light a and the amplified spontaneous emission light generated in the Raman fiber 23 as well as an amplified output spectrum. A spectrum of the amplified spontaneous emission light b is illustrated at 1103 in FIG. 11B. According to this example, white light is obtained which has the output spectrum of a broadband wavelength between about 1,540 nm and about 1,640 nm.

Thus, the present invention is advantageous in that the amplified spontaneous emission light emitted from the Raman fiber 23 has a broader band than the amplified spontaneous emission light a and the amplified spontaneous emission light generated in the Raman fiber 23 alone.

Further, the present invention is advantageous in that the white light output has a broader band and higher power density than in the case where the EDF 13b and the Raman fiber 23 are placed at the positions of the Er-doped fibers 3a and 3b in FIG. 1B.

As is apparent from the operation of the above described white light source, an output white light with a broader band is achieved by a partial overlap of the wavelength ranges between the amplified spontaneous emission light a and the amplified spontaneous emission light generated in the rare earth-doped fiber 13b. Therefore, the active fibers are not limited to EDFs or Raman fibers as long as they meet the required condition (i.e. partial overlapping thereof). The two active fibers may be a combination of any of a rare earth-doped fiber, an optical fiber for Raman amplification (for example, a silica Raman fiber or a tellurite Raman fiber), a semiconductor, a rare earth-doped waveguide, or a solid waveguide having a color center.

Furthermore, in this example, the positions of the Er-doped fiber 13b and the Raman fiber 23 may be interchanged. Further, this example has been described in conjunction with two active fibers, but more active fibers may be connected in series.

Example 2-2

Figure 11C:
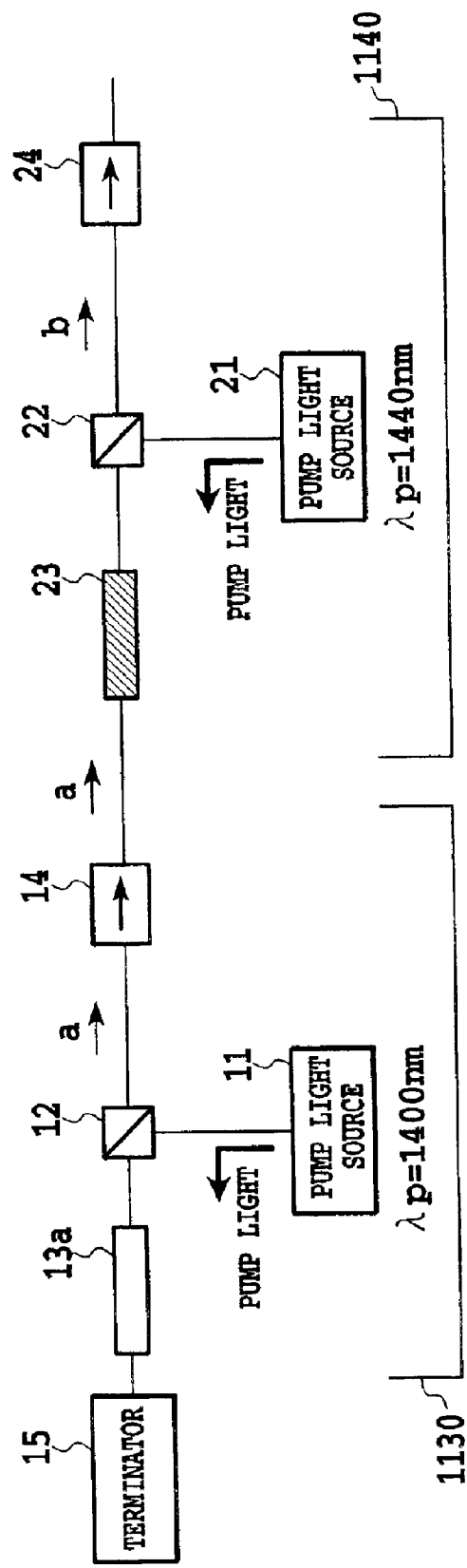

This example illustrates the above described second embodiment of the first aspect. FIG. 11C is a schematic diagram showing an example of a white light source of this example.

This example uses a Tm-doped fiber (TDF; Tm doping concentration: 6,000 wt.ppm, fiber length: 5 m) as the active fiber 13a as well as the Raman fiber (silica Raman fiber: fiber length: 5 km) 23. This example is similar to Example 2-1, described above, but differs therefrom mainly in the following points: in Example 2-1, an EDF and a Raman fiber are used as active fibers, whereas in this example, the thulium (Tm)-doped fiber (TDF) 13a and the Raman fiber 23 are used as active fibers. In FIG. 11C, the components which have the same functions as in Example 2-1 are denoted by the same reference numerals. Further, the operation of the white light source of this example is similar to that in Example 2-1.

Figure 11D:
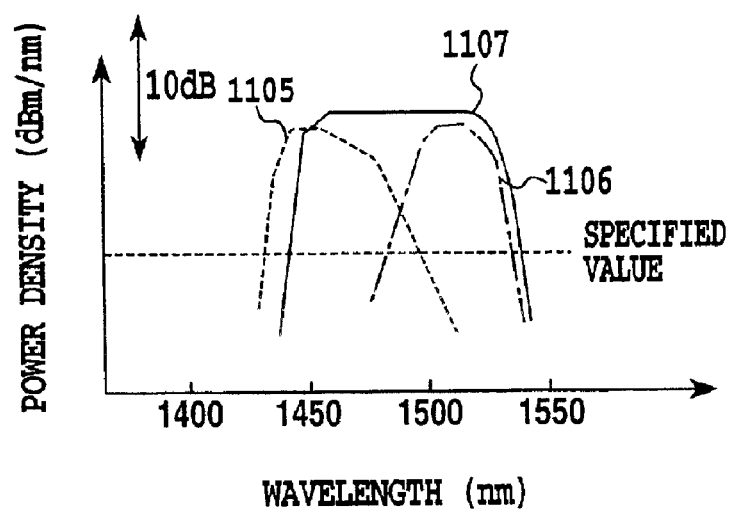

The TDF 13a is pumped with a 1,400 nm pump light, and the spectrum of an amplified spontaneous emission light a output from the TDF 13a is illustrated at 1105 in FIG. 11D. On the other hand, the Raman fiber 23 is pumped with a 1,440 nm pump light, and an amplified spontaneous emission light output from the Raman fiber 23 has an intensity peak near 1,530 nm (see 1106 in FIG. 1D).

The first amplified spontaneous emission light a is amplified in the Raman fiber 23 except for a short wavelength part, and is added to an amplified spontaneous emission light generated in the Raman fiber 23. As a result, an amplified spontaneous emission light b emitted from the Raman fiber 23 has a band equal to a combination of the bands of the amplified spontaneous emission light a and the amplified spontaneous emission light generated in the Raman fiber 23 as well as an amplified output spectrum. A spectrum of the amplified spontaneous emission light b is illustrated at 1107 in FIG. 11D. According to this example, a white light is obtained which has the output spectrum of a broadband between about 1,440 nm and about 1,540 nm.

Thus, the present invention is advantageous in that the amplified spontaneous emission light b emitted from the Raman fiber 23 has a broader band than the amplified spontaneous emission light a and the amplified spontaneous emission light generated in the Raman fiber 23 alone.

Further, the present invention is advantageous in that the white light output has a broader band and higher power density than in the case where the TDF 13a and the Raman fiber 23 are placed at the positions of the Er-doped fibers 3a and 3b in FIG. 1B.

As is apparent from the operation of the above described white light source, a broader band is achieved by a partial overlap of the wavelength ranges between the amplified spontaneous emission light a and the amplified spontaneous emission light generated in the rare earth-doped fiber 13a. Therefore, the active fibers are not limited to TDFs or Raman fibers as long as they meet the required condition (i.e. partial overlapping thereof). The two active fibers may be a combination of any of a rare earth-doped fiber, an optical fiber for Raman amplification (for example, a silica Raman fiber or a tellurite Raman fiber), a semiconductor, a rare earth-doped waveguide, or a solid waveguide having a color center.

Furthermore, in this example, the positions of the Tm-doped fiber 13a and the Raman fiber 23 may be interchanged. In this case, the pump light source is also changed. The configuration in which the positions of the Tm-doped fiber 13a and Raman fiber 23 are interchanged differs from the arrangement of active fibers in FIG. 11C in performance as follows: the Raman fiber generally has a small gain or a loss on a short wavelength side near the pump light wavelength. Accordingly, with the configuration in which the positions of the Tm-doped fiber 13a and Raman fiber 23 are interchanged, an output light from the white light source generally has a higher power density on a short wavelength side than an output light from a white light source having the arrangement of active fibers in FIG. 11C. This is an advantage of the present invention.

Further, this example has been described in conjunction with two active fibers, but more active fibers may be connected in series.

Example 3

Figure 12A:
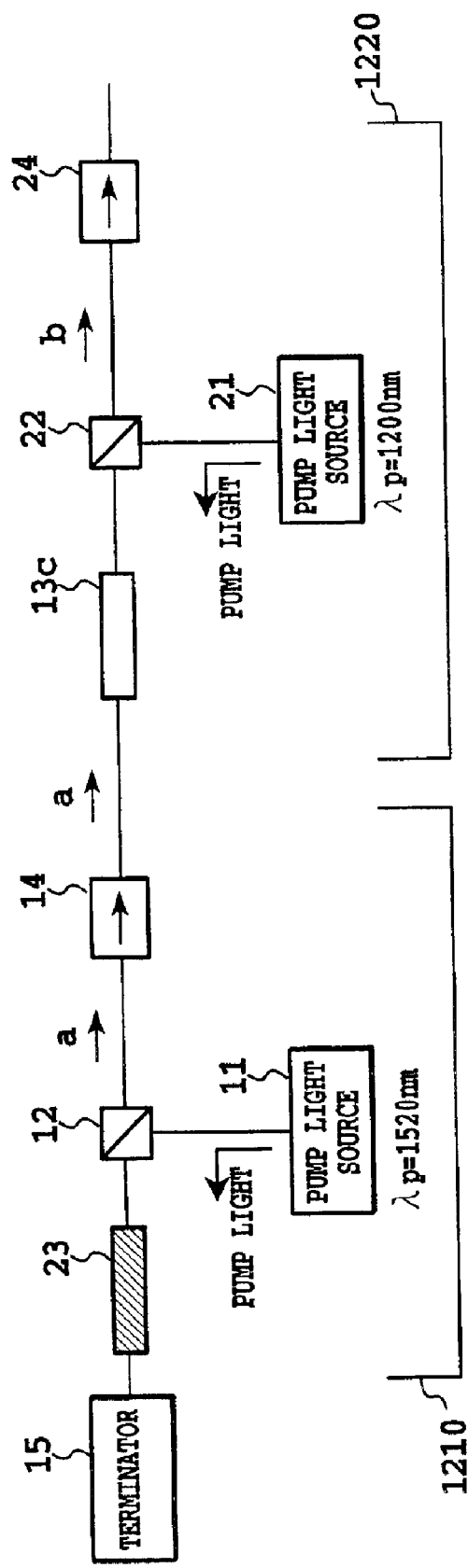

This example illustrates the above described second embodiment of the first aspect. FIG. 12A is a schematic diagram showing an example of a white light source of this example.

In this example, a fiber composed of a core doped with thulium (Tm) and a clad doped with terbium (Tb) (Tm-doped core and Tb-doped clad fiber; T. Sakamoto et al., Optical Amplifiers and Their Applications, ThC3, pp. 40–43, 1996) is used as the active fiber 13c, and a Raman fiber (silica Raman fiber: fiber length: 5 km) is used as the active fiber 23. This example is similar to Example 2-2, described above, but differs therefrom mainly in the following points: in Example 2-2, the thulium (Tm)-doped fiber (TDF) 13a and the Raman fiber 23 are used as active fibers. However, in this example, a Tm-doped core and Tb-doped clad fiber 13c is used as an active fiber instead of the Tm-doped fiber. Further, the Raman fiber is provided at a position corresponding to the Tm-doped fiber in FIG. 13C and the Tm-doped core and Tb-doped clad fiber 13c is provided at a position corresponding to the Raman fiber in FIG. 1C. Those components in FIG. 12A which have the same functions as in Example 2-2 are denoted by the same reference numerals.

The operation of the white light source of this example will be described below.

Figure 12B:
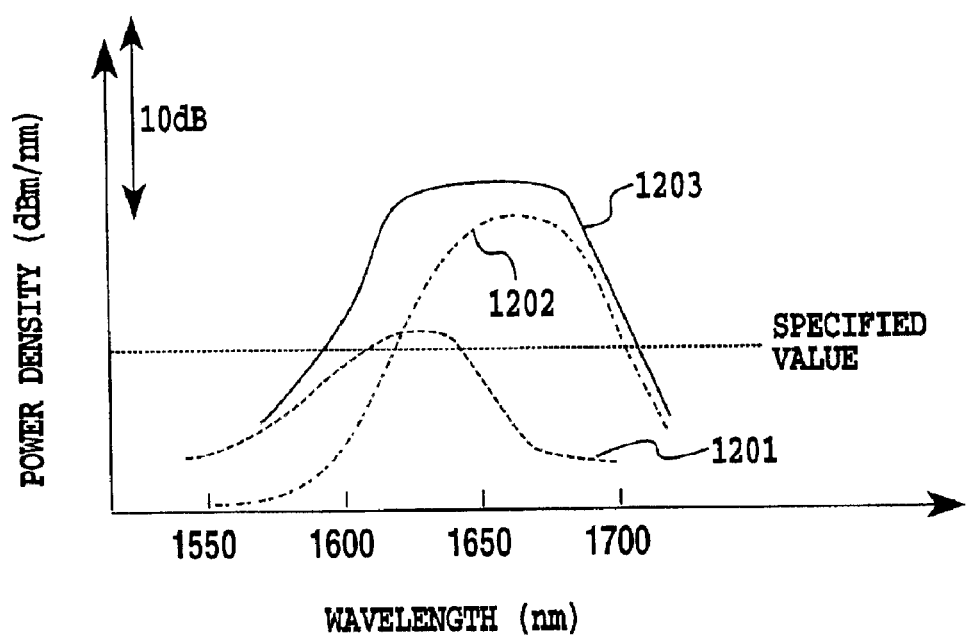

The Raman fiber 23 is pumped with a 1,520 nm pump light to generate an amplified spontaneous emission light a having a wavelength range from about 1,580 nm to about 1,650 nm and a high power density (see 1201 in FIG. 12B). The amplified spontaneous emission light a emitted from the Raman fiber 23 to the multiplexer 12 is input to the Tm-doped core and Tb-doped clad fiber 13c via the isolator 14. On the other hand, the Tm-doped core and Tb-doped clad fiber 13c is pumped at a wavelength of 1,200 nm, and solely emits an amplified spontaneous emission light having an intensity peak at about 1,680 nm (see 1202 in FIG. 12B). Further, the Tm-doped core and Tb-doped clad fiber 13c has a large gain on an input light near 1,680 nm. However, the wavelength of the pump light for the Tm-doped core and Tb-doped clad fiber 13c is not limited to 1,200 nm but the pump light is also effective when having a wavelength of 1,400 or 800 nm. The pump light can generally have a wavelength of 1,500 nm or less.

Accordingly, the first amplified spontaneous emission light a is amplified in the Tm-doped core and Tb-doped clad fiber 13c depending on the wavelength and is added to the amplified spontaneous emission light generated in the Tm-doped core and Tb-doped clad fiber 13c. As a result, the amplified spontaneous emission light b emitted from the Tm-doped core and Tb-doped clad fiber 13c has a band equal to a combination of the bands of the amplified spontaneous emission light a and the amplified spontaneous emission light generated in the Tm-doped core and Tb-doped clad fiber 13c as well as an amplified output spectrum. A spectrum of the amplified spontaneous emission light b is illustrated at 1203 in FIG. 12B. According to this example, white light is obtained which has the output spectrum of a broadband between about 1,590 nm and about 1,720 nm.

Thus, the present invention is advantageous in that the amplified spontaneous emission light b emitted from the Tm-doped core and Tb-doped clad fiber 13c has a broader band than the amplified spontaneous emission light a and the amplified spontaneous emission light generated in the Tm-doped core and Tb-doped clad fiber 13c alone.

Furthermore, in this example, the positions of the Raman fiber 23 and Tm-doped core and Tb-doped clad fiber 13c may be interchanged. In this case, the pump light source is also changed.

In general, the Raman fiber has a large gain on the short wavelength side. Accordingly, with the configuration in which the positions of the Raman fiber 23 and Tm-doped core and Tb-doped clad fiber 13c are interchanged, an output light from the white light source generally has a higher power density on the short wavelength side than an output light from a white light source having the arrangement of active fibers in FIG. 12A. This is an advantage of the present invention.

Furthermore, a configuration in which the terbium (Tb) used as dopant is replaced with europium (Eu) is also effective.

Further, this example has been described in conjunction with two active fibers, but more active fibers may be connected in series.

Example 4

Figure 13A:
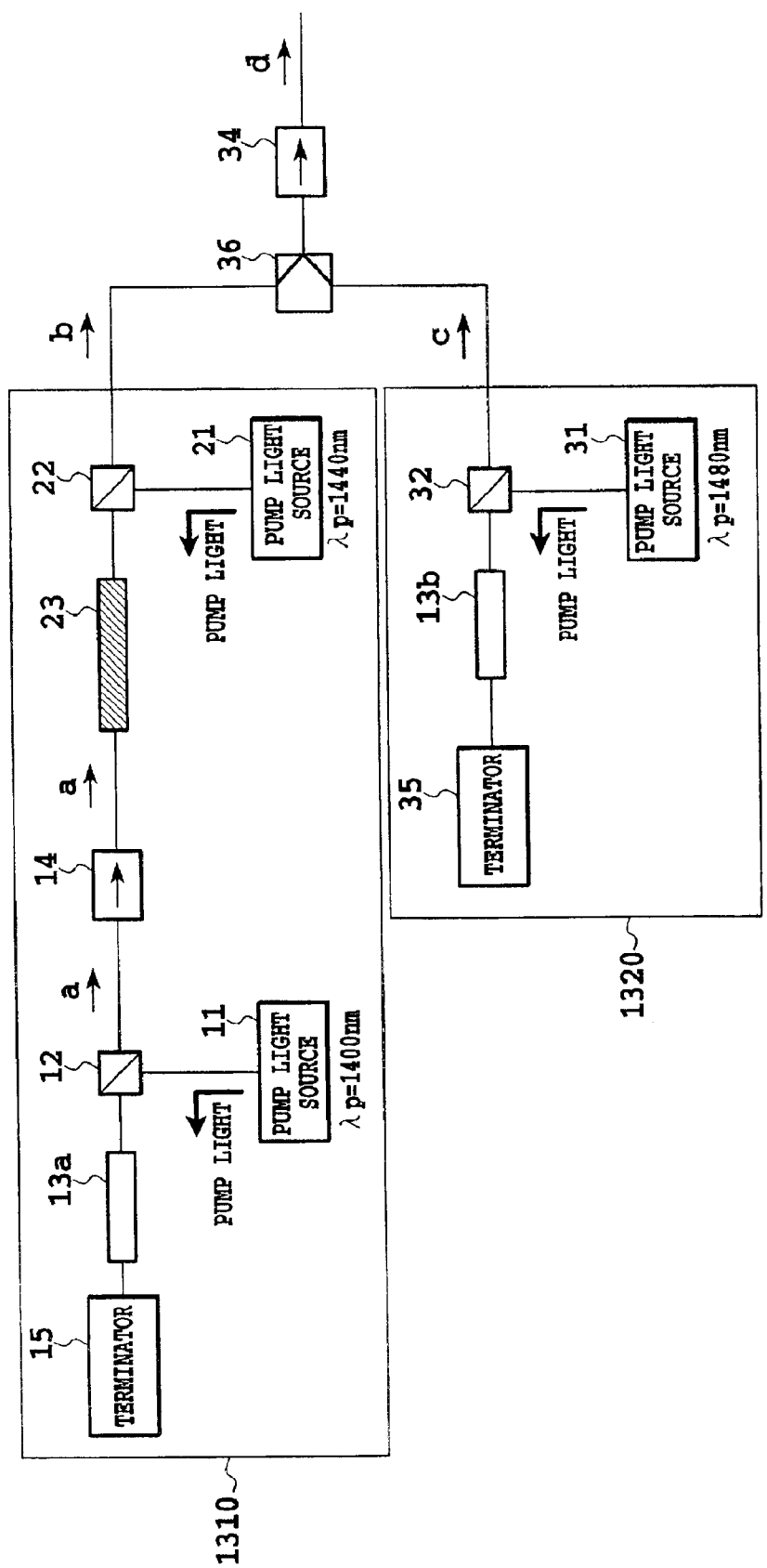

This example illustrates the above described third embodiment of the first aspect. FIG. 13A is a schematic diagram showing an example of a white light source of this example.

This example uses a Tm-doped fiber (TDF; Tm doping concentration: 6,000 wt.ppm, fiber length: 5 m) as the active fiber 13b, an Er-doped fiber (EDF; Er doping concentration: 1,000 wt.ppm, fiber length: 20 m) as the active fiber 13b, and the Raman fiber (silica Raman fiber: fiber length: 5 km) 23. This example is comparable to the above described conventional broader band configuration, but differs therefrom mainly in the following points: in the above described conventional broader band configuration, the Er-doped fiber 13a is used in the short-wavelength-side white light generating section, whereas the Er-doped fiber 13b is used in the long-wavelength-side white light generating section. On the other hand, in this example, the configuration of the white light source of Example 3 is used in the short-wavelength-side white light generating section 1310, while the 1,480 nm-pumped EDF 13b is used in the long-wavelength-side white light generating section 1320. In the figure, reference numeral 31 denotes a 1,480 nm pump light source, 32 is a multiplexer, 34 is an isolator, 35 is a terminator, and 36 is a multiplexer.

The first white light generating section (short-wavelength-side white light generating section) 1310 is composed of a first amplified spontaneous emission generating section, the isolator 14, a second amplified spontaneous emission generating section, and the terminator 15. The first amplified spontaneous emission generating section comprises the first active fiber 13a, the multiplexer 12 provided at one end of the fiber 13a, and the pump light source 11 connected to the first active fiber 13a via the multiplexer 12. Furthermore, in the first white light generating section, one end of the second active fiber 23 is connected to the multiplexer 12 of the first amplified spontaneous emission generating section via the isolator 14. The other end of the active fiber 23 is connected to the pump light source 21 via the multiplexer 22. Further, the terminator 15 is provided at an opposite side to the multiplexer 12 of the amplified spontaneous emission generating section. In the third embodiment, the second white light generating section 1320 is connected in parallel with the first white light generating section 1310 via the multiplexer 36, and the isolator 34 is further connected to the output of the multiplexer 36. The second white light generating section (long-wavelength-side white light generating section) 1320 comprises the third active fiber 13b, the multiplexer 32 provided at one end of the fiber 13b, the pump light source 31 connected to the third active fiber 13b via the multiplexer 32, and the terminator 35 provided at the other end of the third active fiber 13b.

Figure 13B:
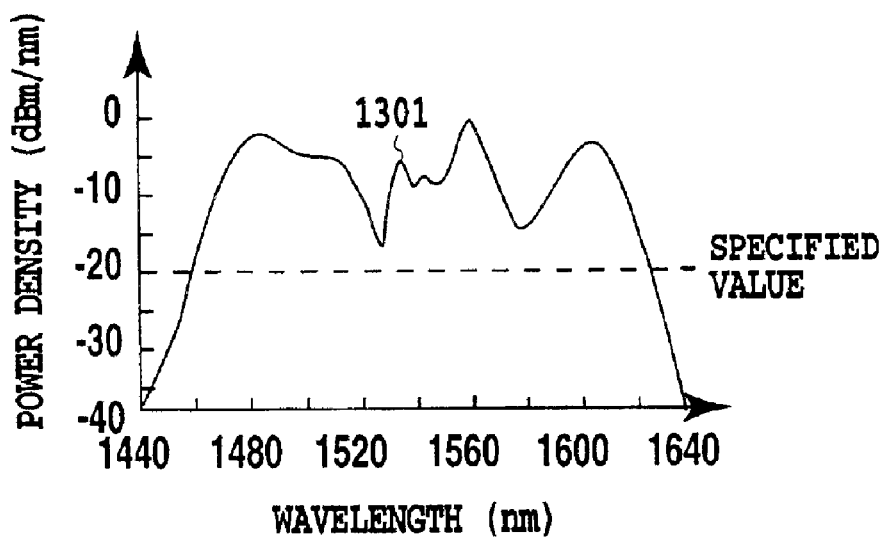

FIG. 13B shows the output spectrum of a white light output from the white light source of this example. This example provides a white light of a broadband wavelength between about 1,440 nm and about 1,640 nm.

Figure 13C:
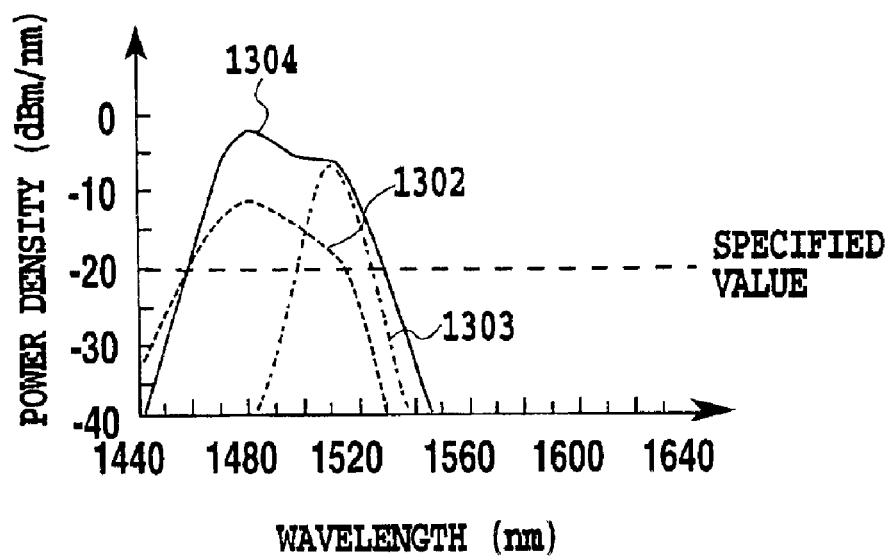
Figure 13D:
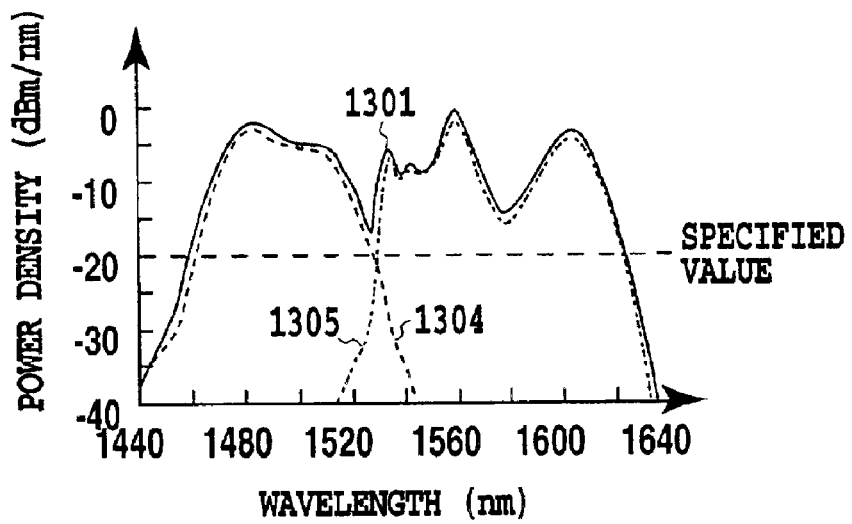

FIG. 13C shows the spectrum of the amplified spontaneous emission light from the short-wavelength-side white light generating section 1310 according to this example. Due to the operation shown in Example 3, described above, a light b output from the short-wavelength-side white light generating section 1310 has an output spectrum such as 1304 in FIG. 13D which equals a combination of output spectra such as 1302 and 1303 in FIG. 13C. On the other hand, an amplified spontaneous emission light c from the long-wavelength-side white light generating section has an output spectrum such as the one shown at 1305 in FIG. 13D. The amplified spontaneous emission light c has an intensity peak near 1,600 nm. As a result, the spectrum of an amplified spontaneous emission light d obtained by multiplexing the amplified spontaneous emission lights b and c together is as shown at 1301 in FIG. 13D (that is, same as FIG. 13B), and thus has a broadband as not provided by the conventional white light source. The present invention has the advantage of providing a white light source having an output spectrum with a broadband wavelength (between about 1,440 nm and about 1,640 nm) as not previously provided.

Figure 13E:
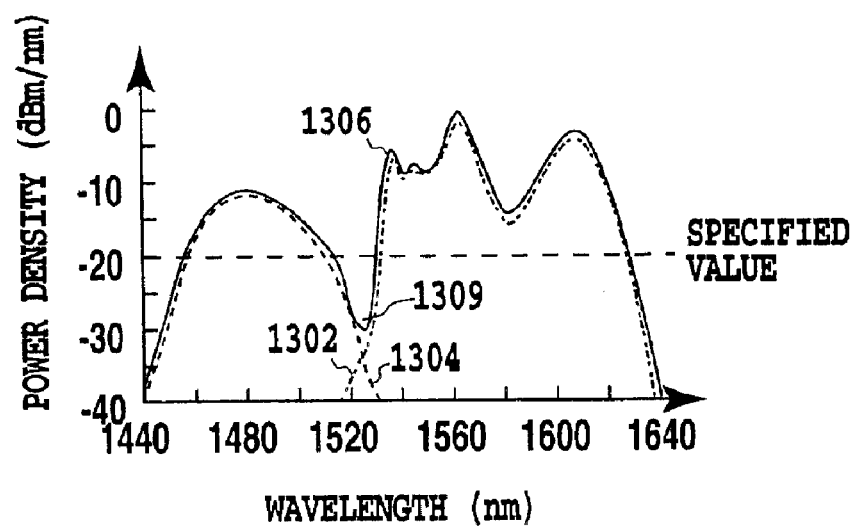

Further, conventional white light sources such as the one shown in FIG. 1B provide, for example, the band shown in FIG. 13E, but are insufficient to provide an output of a specified value or more over an all multiplexed wavelength range due to the presence of a valley portion 1309 as shown in FIG. 13E. However, the white light source according to this example provides a sufficient output of the specified value or more over the all multiplexed wavelength range.

Figure 13F:
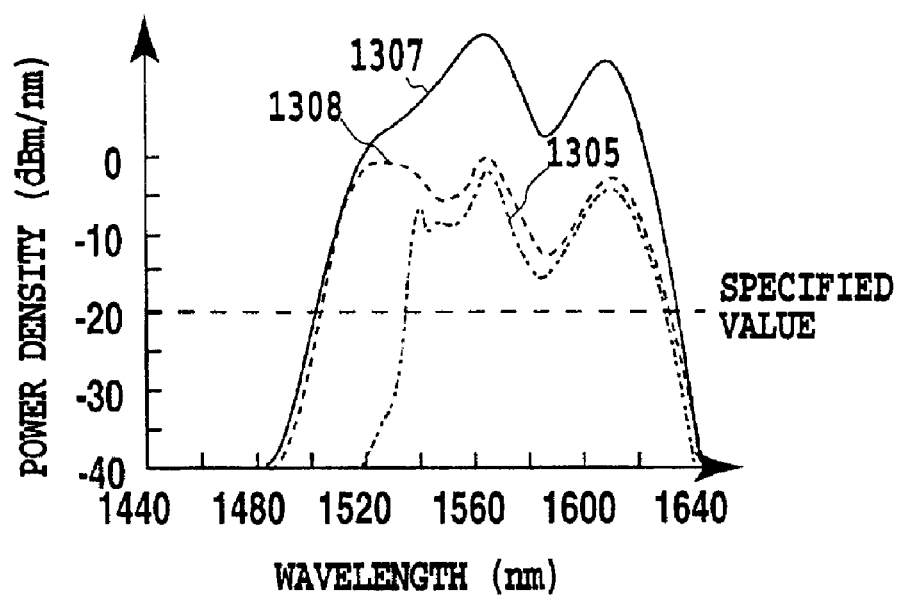

Furthermore, in this example, the TDF 13a is used as the first active fiber, and the EDF 13b is used as the third active fiber, but for example, an EDF may be used in place of the TDF 13a. In this case, if for example, a pump light source similar to the third one is used as the first pump light source, white light is obtained which has a broadband output spectrum such as the one shown at 1307 in FIG. 13F. This white light is obtained by multiplexing together an output light (having an output spectrum such as 1308 in FIG. 13F) from the first white light generating section 1310 using an EDF as the first active fiber and an output light (having an output spectrum such as 1305 in FIG. 13F) from the second white light generating section 1320.

Thus, according to this example, a plurality of amplified spontaneous emission lights partially overlap each other to provide an output white light with a broader band wavelength, thereby providing a broadband white light source. In this example, the active fibers are not limited to EDFs, TDFs, or silica Raman fibers as long as they meet the required conditions. The active fibers may be a combination of any of a rare earth-doped fiber, an optical fiber for Raman amplification (for example, a silica Raman fiber or a tellurite Raman fiber), a semiconductor, a rare earth-doped waveguide, or a solid waveguide having a color center.

Thus, the present invention provides a white light source having an output spectrum with a broadband and a high power density as not previously provided.

Example 5

Figure 14A:
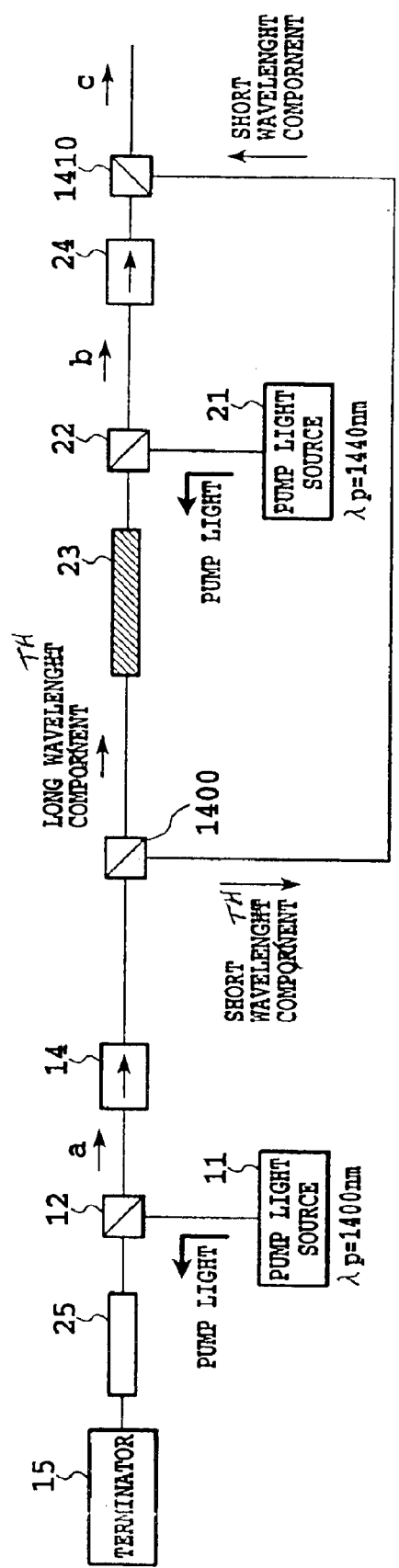

This example illustrates the above described second embodiment of the first aspect. FIG. 14A is a schematic diagram showing an example of a white light source of this example.

This example has a configuration similar to that of Example 2-2, described above, but differs therefrom mainly in the following points: in this example, a demultiplexer 1400 is placed at the isolator 14 side (the side from which an amplified spontaneous emission light a is input) of the Raman fiber 23, and a multiplexer 1410 is placed at the output side of the isolator 24. The other parts of the configuration and the other fiber conditions are similar to those in Example 2-2, described above.

In this example, long wavelength components of the amplified spontaneous emission light a incident on the demultiplexer 1400 are guided to the Raman fiber 23, while short wavelength components thereof are guided to the multiplexer 1410. This example is constructed in this manner because in the Raman fiber, the short wavelength components are also used as a pump light and are thus lost. That is, the Raman fiber 23 has a small Raman gain in a wavelength part near the pump light wavelength, so that the amplified spontaneous emission light a undergoes a loss corresponding to the fiber loss of the Raman fiber 23. Accordingly, by using the demultiplexer 1400 and the multiplexer 1410 for bypass as in this example, the output spectrum of the white light has a higher power density in a wavelength part near the pump light wavelength of the Raman fiber than it would without the bypass. Thus, it is advantageous to demultiplex the components of a wavelength part (short wavelength part) near the pump light wavelength.

The long wavelength components demultiplexed by the demultiplexer 1400 are amplified in the Raman fiber 23 and added to an amplified spontaneous emission light generated in the Raman fiber 23. The amplified spontaneous emission light b emitted from the Raman fiber 23 is input to the multiplexer 1410 and is then multiplexed with the short wavelength components to generate an output light c.

Figure 14B:
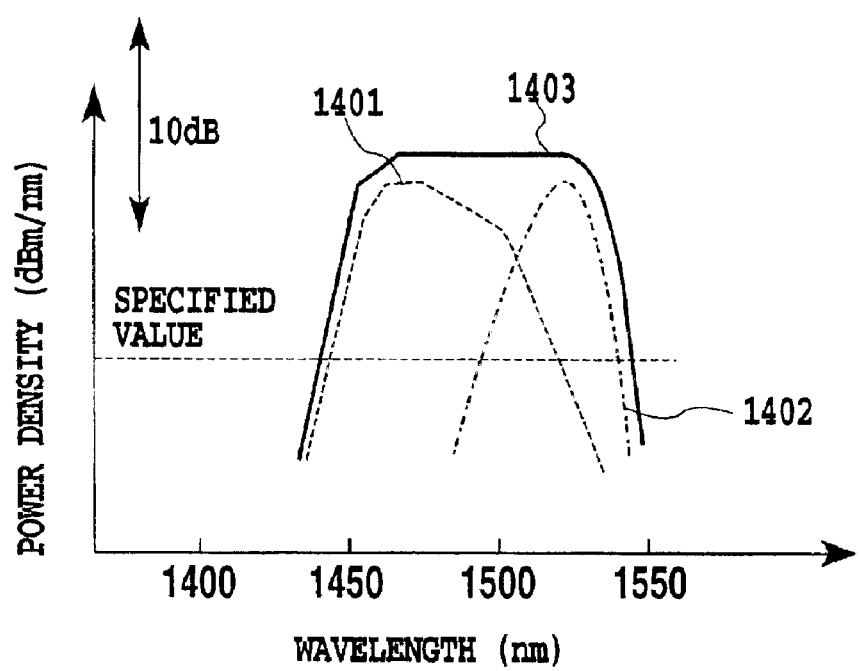

A spectrum of the output light c is illustrated at 1403 in FIG. 14B. This example provides a white light having an output spectrum with a broadband wavelength between about 1,430 nm and about 1,540 nm. Thus, this example provides an output light c having an output spectrum with a much broader band wavelength.

In the above described operation, the boundary between the short wavelength components and the long wavelength components is determined in the following manner. That is, the amplified spontaneous emission light a that has passed through the Raman fiber 23 undergoes a loss corresponding to the fiber loss of the Raman fiber 23, as described above.

Accordingly, the boundary wavelength for the demultiplexer 1400 may be set at such a value that the Raman fiber 23 has a net Raman gain of zero dB. For example, in this example, the boundary wavelength is 1,470 nm.

This example also allows the active fibers and the arrangement thereof to be changed as shown in Example 2-2, described above.

Example 6

Figure 15:
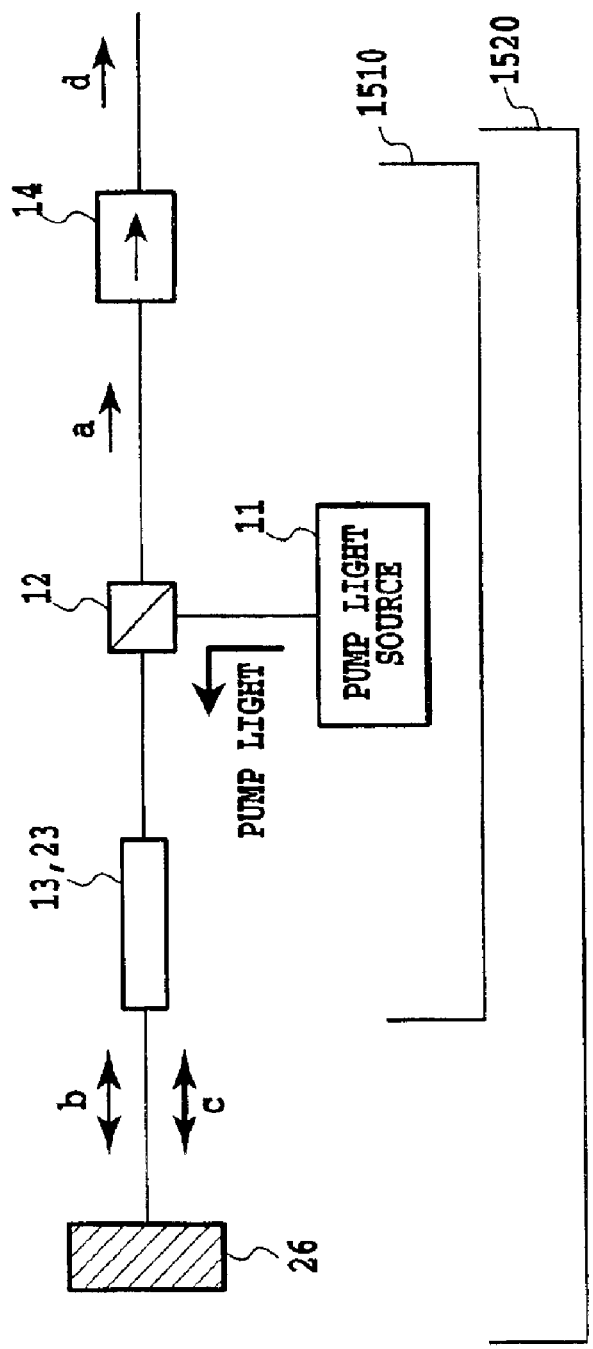
FIG. 15 is a diagram showing a specific example (Example 6) of a white light source according to the second aspect of the present invention.

This example illustrates the above described first embodiment of the second aspect. FIG. 15 is a schematic diagram showing an example of a white light source of this example.

The white light source in FIG. 15 uses an optical fiber as an active fiber that outputs a white light. The rare earth-doped fiber 13 such as an Er- or Tm-doped fiber or the Raman fiber for Raman amplification can be suitably used as this optical fiber.

In this example, the active fiber in an amplified spontaneous emission light generating section 1510 has a mirror provided at one end thereof. In this white light source, the active fiber in the amplified spontaneous emission light generating section 1510 has an isolator provided at the other end thereof.

In the amplified spontaneous emission light generating section 1510 in this example, the active fiber 13 or 23 has the pump light source 11 connected thereto via the multiplexer 12.

The operation of this example will be described taking for instance an Er-doped fiber (EDF: Er doping concentration: 1,000 wt.ppm, fiber length: 20 m, pump light source wavelength: 1,480 nm) as an active fiber.

In the white light generating section 1520 in this example, the Er-doped fiber 13 is pumped with pump light from the pump light source 11 to generate an amplified spontaneous emission light. Of this amplified spontaneous emission light, light a emitted from the Er-doped fiber 13 to the multiplexer 12 is output through the multiplexer 12 and isolator 14. Further, an amplified spontaneous emission light b emitted from the active fiber 13 in a direction away from the multiplexer 12 is reflected by the mirror 26 and then is input to the Er-doped fiber 13 again for amplification. The amplified light is emitted from the Er-doped fiber 13 to the multiplexer 12. That is, the amplified light joins with the amplified spontaneous emission light a emitted from the Er-doped fiber 13. Consequently, all the amplified spontaneous emission light is output as a white light d without being discarded.

Thus, this example provides white light having a higher power density than a white light source such as the one shown in FIG. 1A.

Further, pump light c that has passed through the Er-doped fiber 13 without being absorbed thereby is reflected by the mirror 26 and then is input to and again pumps the Er-doped fiber 13.

In this example, the mirror 26 preferably has a high reflectance for both amplified spontaneous emission light and pump light. Further, the mirror may be a mirror face with a film deposited gold or the like on the fiber end and a combination of a fiber, a collimating lens, and a plate-shaped reflector (the plate-shaped reflector is similar to what is called a "regular mirror plated").

Thus, this example is efficient because all the amplified spontaneous emission light is output as white light without being discarded. Further, the pump light can also be used without being discarded, thereby improving the pumping efficiency of the white light source. Consequently, a white light of increased power (increased power density) can be output. Further, a less expensive low-output pump light source can be used.

Further, the active fibers available in the present invention are not limited to EDFs as long as they meet the conditions under which the white light source of this example can be constructed. The active fiber may be a rare earth-doped fiber (for example, a TDF), an optical fiber for Raman amplification (for example, a silica Raman fiber or a tellurite Raman fiber), a semiconductor, a rare earth-doped waveguide, or a solid waveguide having a color center.

Furthermore, the installation of the mirror that is a feature of this example is applicable to Examples 1 to 5, described above. That is, effects similar to those of this example are obtained by replacing the terminator in each of Examples 1 to 5 with the mirror.

Example 7

Figure 16:
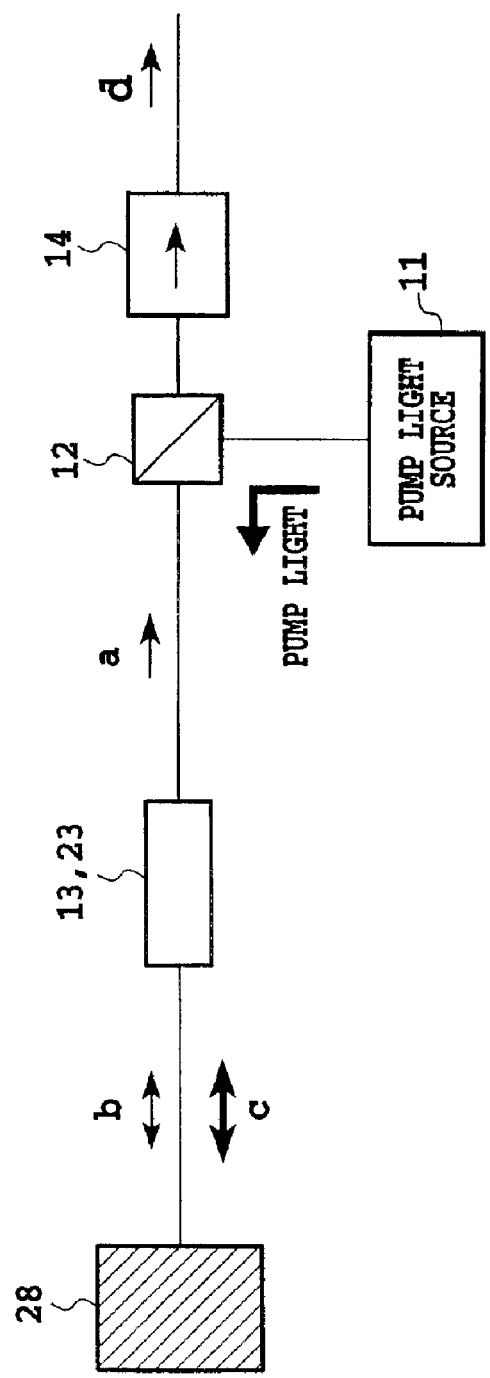
FIG. 16 is a diagram showing another specific example (Example 7) of the white light source according to the second aspect of the present invention.

This example illustrates the above described first embodiment of the second aspect. FIG. 16 is a schematic diagram showing an example of a white light source of this example.

As shown in FIG. 16, this example is similar to Example 6, described above, but differs therefrom in the following points: in Example 7, the Faraday rotator mirror 28 is used in place of the normal mirror 26 in Example 6. FIG. 16 shows an example of this configuration. A white light source of this configuration operates similarly to Example 6, described above, except for the mirror. The configuration of this example and the conditions for the active fibers and others are similar to those in Example 6 except for the above difference.

In this example, by the Faraday rotator mirror 28, a linearly polarized part of an amplified spontaneous emission light returning from the Faraday rotator mirror 28 to the active fiber 13 or 23 is rotated through 90° relative to an amplified spontaneous emission light emitted from the active fiber 13.

In this example, the use of the Faraday rotator mirror improves the stability of output power obtained when the white light output is set high, thus increasing the maximum value of the output power.

Figure 17:
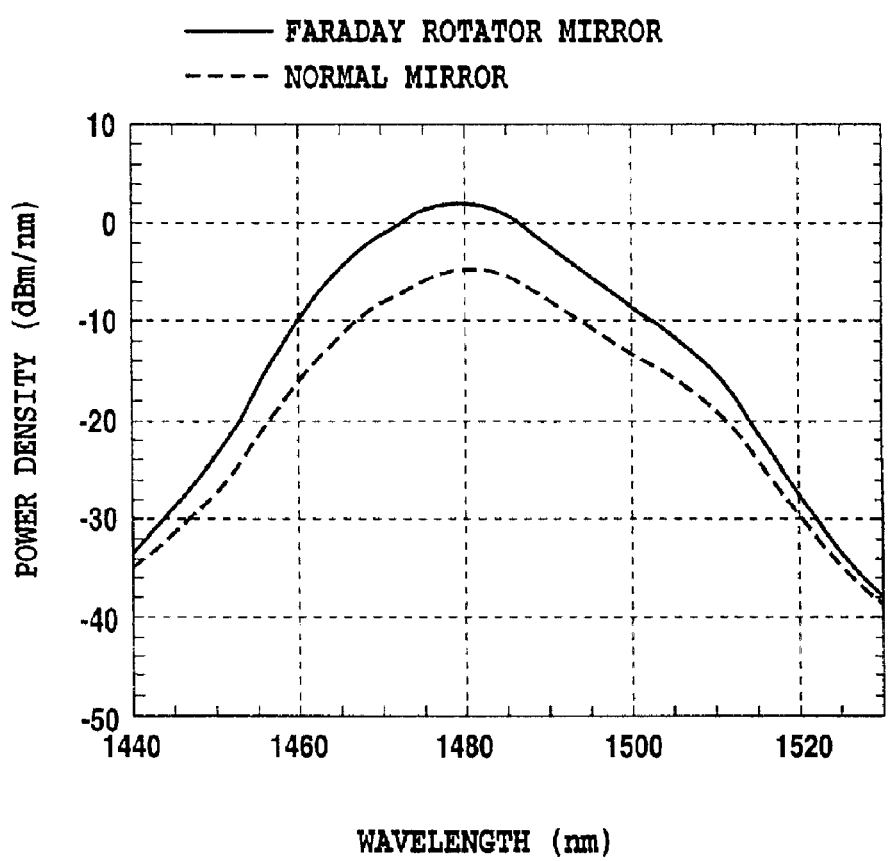
FIG. 17 is a chart showing the output spectrum of output light from the white light source shown in FIG. 16.

FIG. 17 shows an example of an output spectrum in this example (obtained if a thulium-doped fiber is used as an active fiber). As shown in this figure, the output power has an increased maximum value compared to the use of a normal mirror. That is, when the output power of a white light maintains a temporal stability of about 0.1 dB or less, the maximum value of the output power increases by about 7 dB compared to the use of a normal mirror.

Obviously, the above description is applicable not only to this example and Example 6 but also to Examples 1 to 5, in which a mirror is used in place of the terminator. That is, effects similar to those described above are obtained by replacing the mirror in each of Examples 1 to 5 with a Faraday rotator mirror.

Example 8

Figure 18:
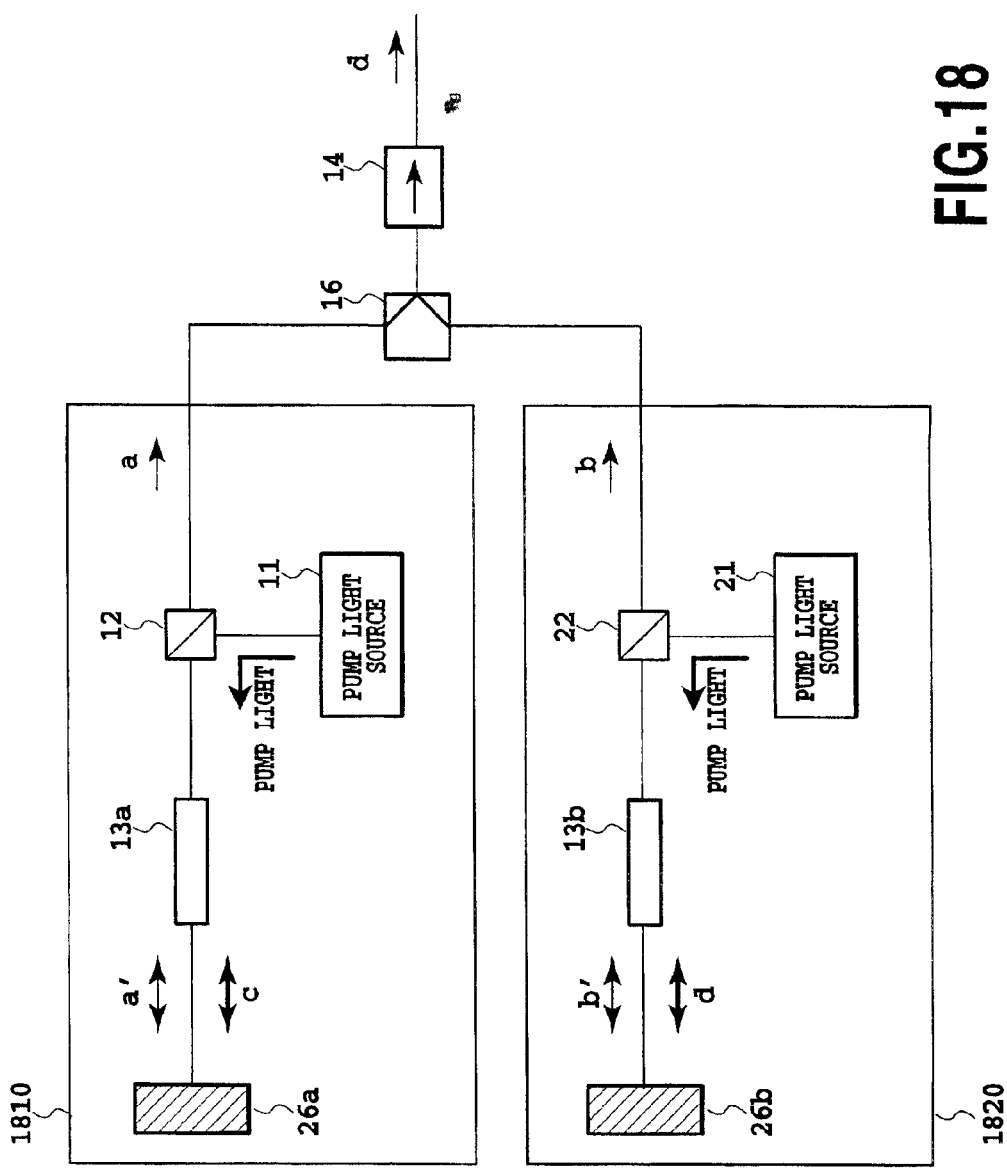
FIG. 18 is a diagram showing yet another specific example (Example 8) of the white light source according to the second aspect of the present invention.

This example illustrates the second aspect of the present invention. FIG. 18 is a schematic diagram showing an example of a white light source of this example.

The white light source shown in FIG. 18 is composed of two white light sources connected together in parallel, the white light sources each being the same as that of Example 6, shown in FIG. 15. Accordingly, white light generating sections 1810 and 1820 operate as described in Example 6. Further, amplified spontaneous emission light a and b obtained from these white light generating sections have characteristics such as those described in Example 6. Furthermore, many modifications of the condition such as the selection of the active fibers can be made as described in Example 6.

In this example, the first active fiber 13a and second active fiber 13b shown in FIG. 18 emit amplified spontaneous emission light a and b with different wavelength bands, respectively. To obtain different wavelength bands, different length of the active fibers 13a and 13b (for example, 10 m and 50 m) may be used. The wavelengths (λ1 and λ2) of the pump light sources for the optical fibers 13a and 13b may be the same or different. Amplified spontaneous emission light emitted from the active fibers 13a and 13b is multiplexed by the output-side multiplexer 16 to become an output light d. In the figure, reference numerals 11 and 21 denote the pump light sources, 12 and 22 denote multiplexers, and 26a and 26b denote mirrors.

For example, the amplified spontaneous emission light a and b provided by this example have wavelength ranges from 1,525 to 1,560 nm and from 1,565 to 1,610 nm when the optical fibers 13a and 13b are doped with Er (and have Er doping densities of 1,000 wt.ppm and 2,000 wt.ppm, respectively, and fiber lengths of 10 m and 20 m, respectively) and when the pump light wavelengths λ1 and λ2 are both 1.48 μm. The wavelength part between 1,560 nm and 1,565 nm is unavailable (a dead band), which is determined by the wavelength separation characteristic of the output-side multiplexer 16. Further, white light d has wavelength ranges from 1,515 to 1,560 nm and from 1,565 to 1,610 nm when the pump light wavelength λ1 and λ2 are 0.98 and 1.48 μm, respectively. However, the wavelength range of the amplified spontaneous emission light a obtained when the active fiber 13a is pumped at 0.98 μm is about 10 nm broader on the short wavelength side than the wavelength range of the amplified spontaneous emission light b obtained when it is pumped at 1.48 μm. Accordingly, the use of such a pump wavelength provides the advantage of obtaining a broader band wavelength.

In the above example, the active fibers 13a and 13b are doped with Er, but if silica Raman fibers (fiber length: 5 km) are used as the active fibers 13a and 13b, the white light source has the following characteristic: the output light d has wavelength ranges from 1,420 to 1,500 nm and from 1,520 to 1,600 nm when the pump light wavelengths λ1 and λ2 are 1,500 and 1,400 nm, respectively. Thus, this example provides an efficient broadband white light source.

Since the white light generating sections 1810 and 1820 in this example are constructed similarly to Example 6, described above, this example provides a white light source having characteristics similar to those of the white light source of Example 6. That is, the white light source of this example can output a white light with increased power (an increased power density). Therefore, a less expensive low-output pump light source can be used.

Further, the above described example uses two wavelength bands of amplified spontaneous emission lights, but it is noted that the above description is equally applicable to the use of three wavelength bands. That is, with three wavelength bands, a unit for the third wavelength band may be added to the white light source in FIG. 18, and the output-side multiplexer for multiplexing two wavelength bands together may be changed to one for multiplexing three wavelength bands together.

Example 9

Figure 19A:
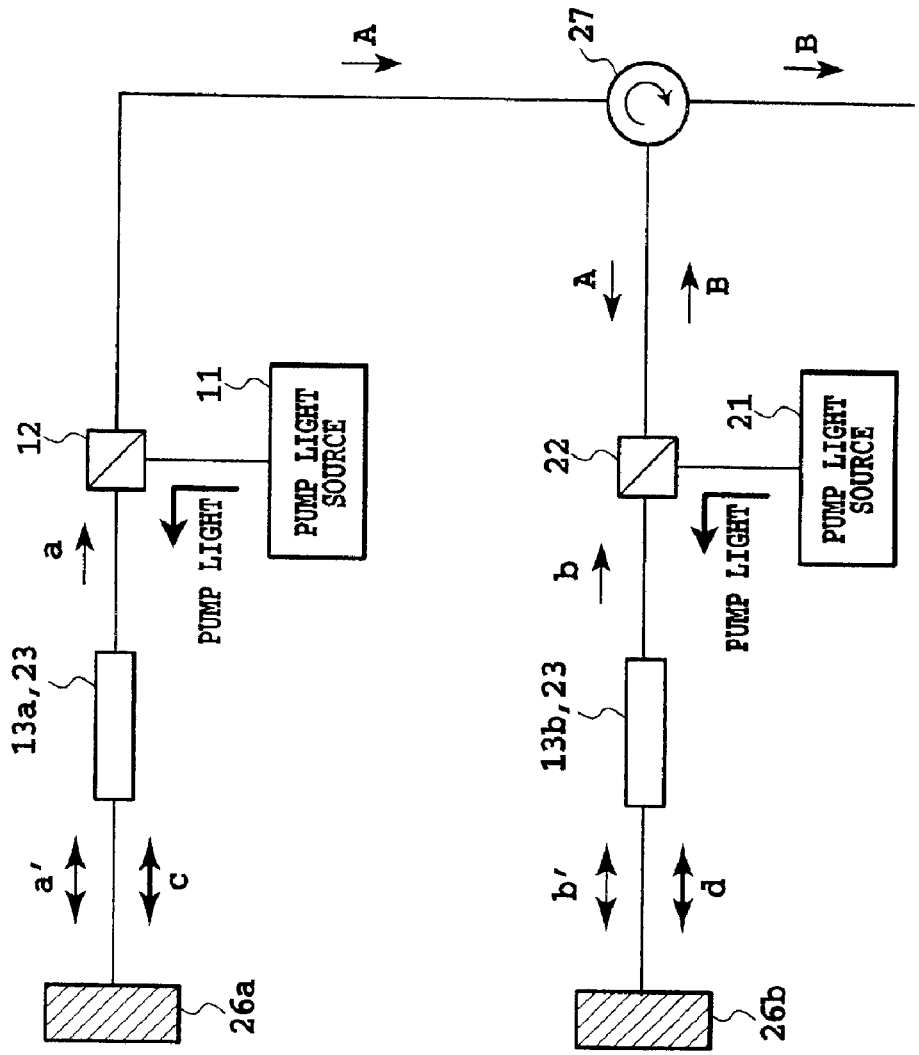
Figure 19B:
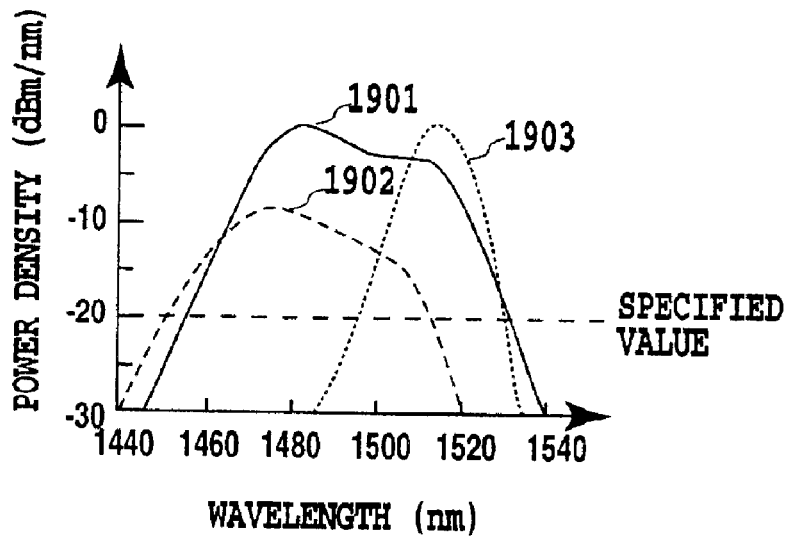
Figure 19C:
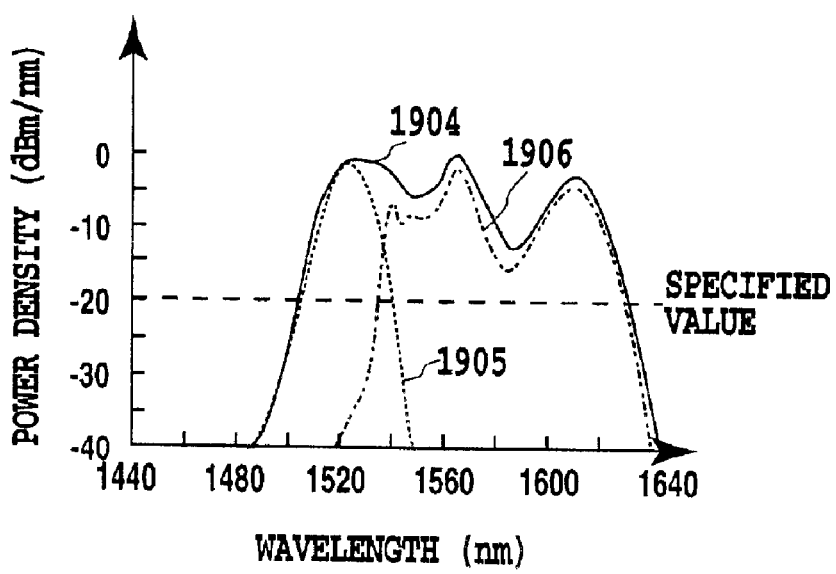
Figure 19D:
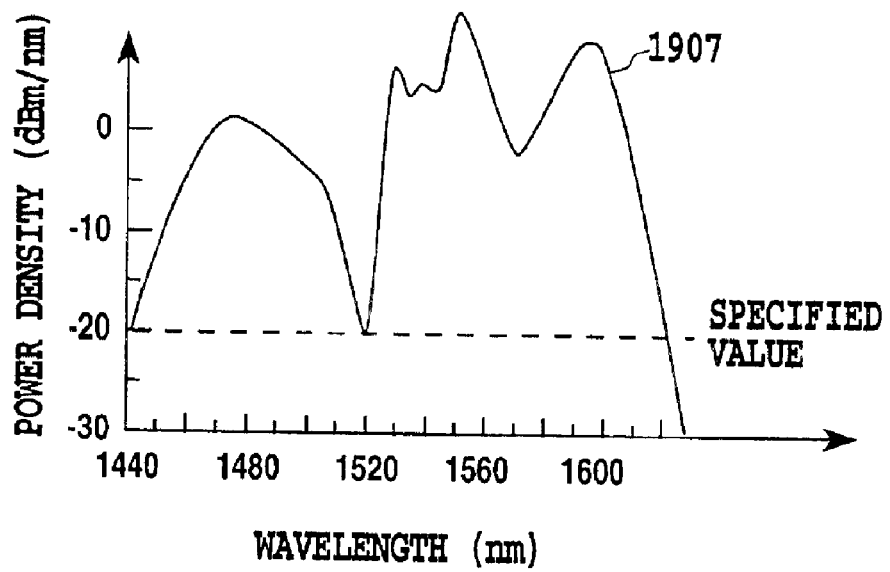
Figure 19E:
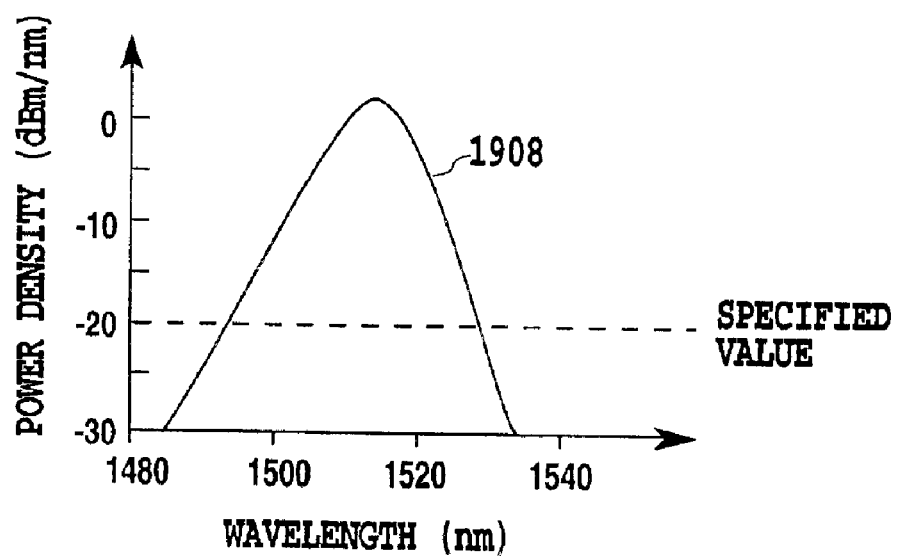

This example illustrates the second embodiment of the second aspect of the present invention. FIG. 19A is a schematic diagram showing an example of a white light source of this example.

As shown in FIG. 19A, this example is composed of two white light sources connected in series, the white light sources each being the same as that of Example 6. That is, a first amplified spontaneous emission light generating section composed of the active fiber 13a, the multiplexer 12 and the pump light source 11, and a second amplified spontaneous emission light generating section composed of the active fiber 13b, the multiplexer 22 and the pump light source 21 have the mirror 26a or 26b, respectively, provided at one end thereof. Further, the circulator 27 is provided between the first and second amplified spontaneous emission light generating sections.

In this example, an amplified spontaneous emission light A emitted from the first active fiber 13a is input to the second active fiber 13b via the circulator 27. Subsequently, light A is amplified in the active fiber 13b and then reflected by the mirror 26b together with an amplified spontaneous emission light b' generated in the active fiber 13b and emitted toward the mirror 26b. The amplified spontaneous emission light b' reflected by the mirror 26b is input to the active fiber 13b again, where it is amplified. The amplified light is then output together with an amplified spontaneous emission light b generated in the active fiber 13b and emitted toward the multiplexer 22. Then, the multiplexed light is output from the white light source via the circulator 27 as an output light B.

In this example, the first white light generating section, comprising the active fiber 13a, and the second white light generating section, comprising the active fiber 13b, operate as described in Example 6, described above, and have characteristics such as those described in Example 6.

With this configuration, the amplified spontaneous emission light A from the active fiber 13a is input to the active fiber 13b, thereby making the conversion in the active fiber 13b more efficient. That is, in the active fiber 13b, the power of a pump light from the pump light source 22 is converted into the power of the amplified spontaneous emission light b and b' effectively, thereby obtaining increased power. Consequently, the pump light power of the optical fiber 13b is increased above that of the optical fiber 13a, so that the entire white light source can more efficiently convert the power of the pump light into the power of the amplified spontaneous emission light than the conventional white light source. This eliminates the disadvantage of the conventional white light source, that is, a low conversion efficiency.

In this example, as a typical example (1), a TDF can be used as the active fiber 13a and the Raman fiber 23, as the active fiber 13b. As another typical example (2), an EDF can be used as the active fiber 13a and the Raman fiber 23, as the active fiber 13b. As yet another typical example (3), an EDF can be used as the active fiber 13a and a TDF, as the active fiber 13b. As still another typical example (4), Raman fibers can be used as the active fibers 13a and 13b.

In these cases, the amplified spontaneous emission light b' is reflected by the mirror 26b, and the reflected light is emitted from an emission port of the circulator 27 to increase the intensity of the output B. Further, if the Raman fiber 23 is used as the second active fiber, the pump light efficiency can be improved.

FIGS. 19B to 19E show output spectra obtained from the typical examples (1) to (4). FIGS. 19B to 19E correspond to the typical examples (1) to (4), respectively. Specifically, in FIG. 19B, a white light is obtained which has a spectrum 1901 obtained by multiplexing output spectra 1902 and 1903 from the TDF and Raman fiber together. Likewise, in FIG. 19C, a white light is obtained which has a spectrum 1904 obtained by multiplexing output spectra 1906 and 1905 from the EDF and Raman fiber together. Similarly, a white light is obtained which has the spectrum shown at 1907 in FIG. 19D and the spectrum shown at 1908 in FIG. 19E. In particular, the configuration of this example provides a white light having a power density of a specified value or more over the all broadband wavelengths even with a combination of rare earth-doped fibers as shown at 1907 in FIG. 19D.

In this example, various conditions including the selection of active fibers may be similar to those in Example 6, described above.

Example 10

Figure 20:
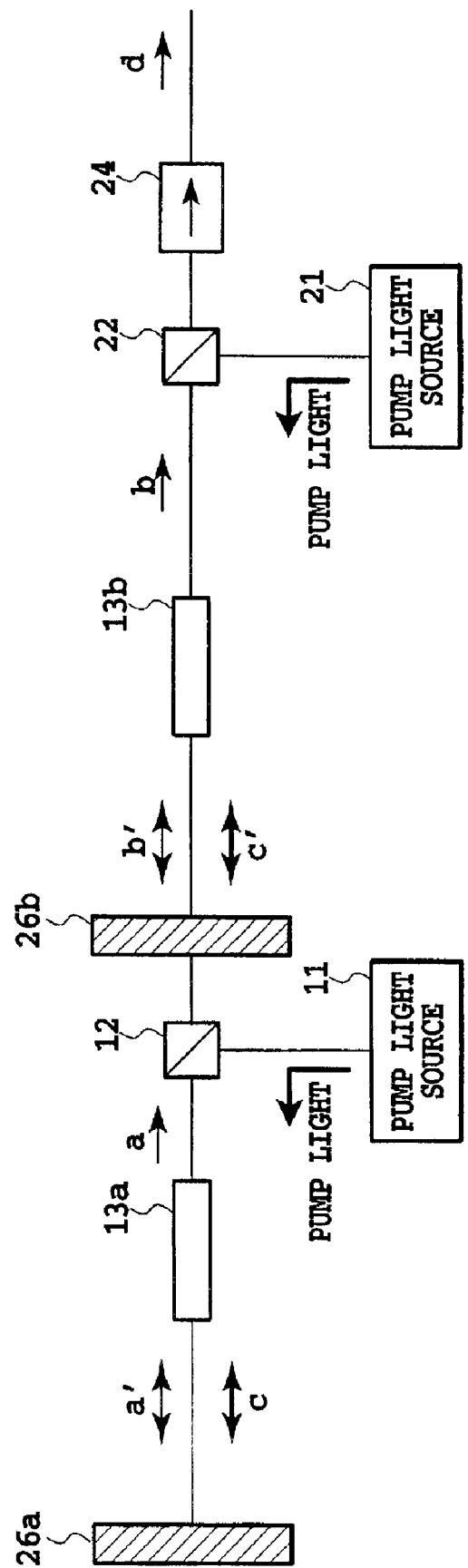
FIG. 20 is a diagram showing still another specific example (Example 10) of the white light source according to the second aspect of the present invention.

This example illustrates the second aspect of the present invention. FIG. 20 is a schematic diagram showing an example of a white light source of this example.

As shown in FIG. 20, this example is similar to Example 1, described above, but differs therefrom in the following points: this example is structured so that the terminator of the white light source of Example 1 is replaced with the mirror 26a and so that the mirror 26b is provided between the first and second amplified spontaneous emission light generating sections.

In this example, illustrated in FIG. 20, the wavelength range (wavelength part x) of an amplified spontaneous emission light a emitted from the active fiber 13a is not the same as the wavelength range (wavelength part y) of an amplified spontaneous emission light b emitted from the active fiber 13b, but these wavelength ranges have an overlapping area (wavelength part z). Further, the power spectra of the amplified spontaneous emission light a and b are not flat in the wavelength parts x and y.

Of the amplified spontaneous emission light from the active fiber 13b, the mirror 26b allows a certain wavelength range including the wavelength part x to be totally or partially transmitted therethrough, while totally or partially reflecting the entire wavelength range other than the wavelength range including the wavelength part z. An example of such a mirror is a normal-incidence dielectric multilayer filter or a chirped fiber Bragg grating.

An amplified spontaneous emission light from the active fiber 13b is input to the active fiber 13a and is amplified therein. Then, the amplified light is reflected by the mirror 26a and then transmits toward the active fiber 13a. An amplified spontaneous emission light emitted from the mirror 26b to the mirror 26a is reflected by the mirror 26b and then transmits toward the active fiber 13b. As a result, white light is obtained which has a flattened broadband wavelength with the wavelength parts x and y.

The active fibers available in this example are similar to those described in Example 6. Further, various conditions including the selection of active fibers may be similar to those in Example 6, described above.

For example, if an erbium-doped fiber having a density of 1,000 wt.ppm and a length of 25 m is used as the active fiber 13a and an erbium-doped fiber having a density of 1,000 wt.ppm and a length of 10 m is used as the active fiber 13b, then the wavelength part x=1,550 to 1,610 nm, the wavelength part y=1,530 to 1,580 nm, and the wavelength part z=1,550 to 1,580 nm.

Example 11

Figure 21:
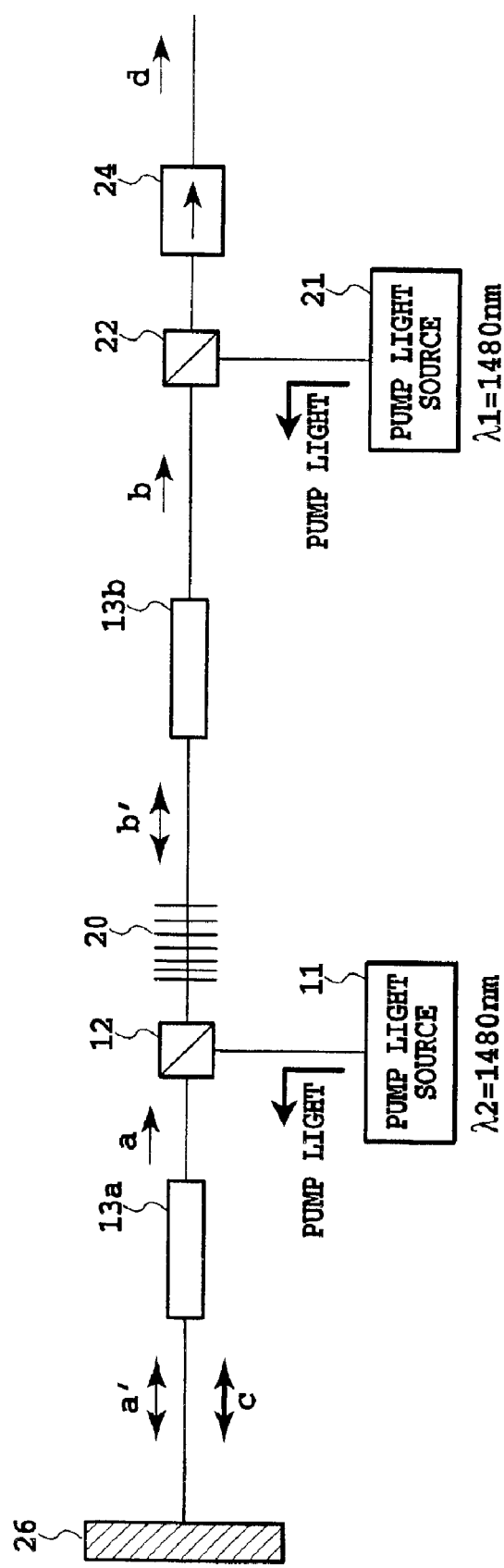
FIG. 21 is a diagram showing yet another specific example (Example 11) of the white light source according to the second aspect of the present invention.

This example illustrates the second aspect of the present invention. This is a more specific example of Example 10. FIG. 21 is a schematic diagram showing an example of a white light source of this example.

In this example, shown in FIG. 21, the optical fiber 13b in Example 10 is doped with Er (for C band amplification), and the optical fiber 13a is doped with Er (for L band amplification). The pump light wavelengths $\lambda 1$ and $\lambda 2$ of the Er-doped fibers 13b and 13a, respectively, are both 1.48 $\mu$m. Further, the mirror 26b in Example 10 is composed of a chirp type fiber grating (FG) 20. The chirp type FG 20 reflects an amplified spontaneous emission light within the C band and transmits an amplified spontaneous emission light within the L band.

Accordingly, C band components of an amplified spontaneous emission light b' generated in the Er-doped fiber 13b and emitted to the chirp type FG 20 are reflected by the chirp type FG 20, while L band components thereof pass through the chirp type FG 20. In this example, a spectrum of the C band components has a higher power density than the spectrum of the L band components. The L band components that have passed through the chirp type FG 20 are amplified in the Er-doped fiber 13a and then reflected to the Er-doped fiber 13a by the mirror 26. During the passage to the Er-doped fiber 13a and then the Er-doped fiber 13b, the reflected light is amplified and then emitted from the white light source as an output light d.

As described above, this example efficiently uses amplified spontaneous emission light within the L band generated in the Er-doped fibers 13a and 13b, thereby efficiently generating white light with an output spectrum flattened in the C band to L band.

The active fibers available in this example include those described in Example 6 in addition to those described above as long as they meet the above described conditions.

Example 12

Figure 22:
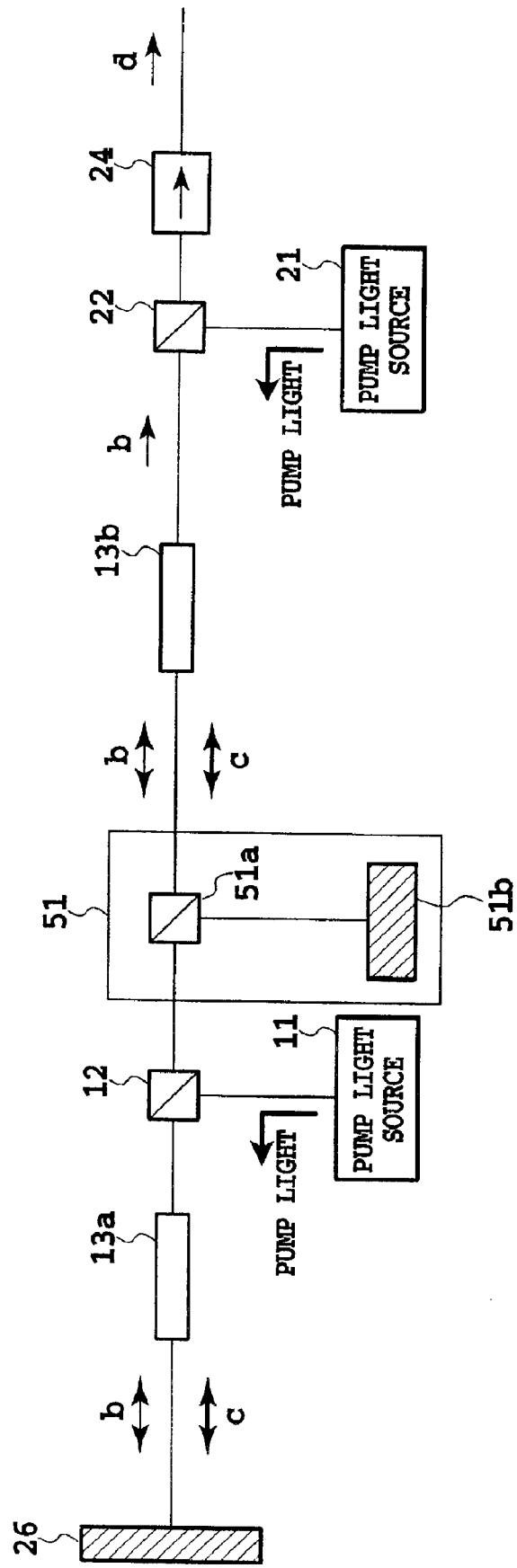
FIG. 22 is a diagram showing still another specific example (Example 12) of the white light source according to the second aspect of the present invention.

This example illustrates the second aspect of the present invention. This is another more specific example of Example 10. FIG. 22 is a schematic diagram showing an example of a white light source of this example.

This example, shown in FIG. 22, uses a configuration similar to that in Example 11, but differs therefrom in the configuration of the chirp type FG 20. This example uses a mirror 51. The mirror 51 is composed of a multiplexer and demultiplexer 51a which relate to the C and L bands and a mirror 51b. The multiplexer and demultiplexer 51a is a dielectric multilayer film or a fiber coupler. Further, in general, the mirror 51 has more elements than the mirror 26b in Example 10, but different parts are used for light wavelength separation and for reflection, and can be easily manufactured, thereby providing required characteristics more easily and more inexpensively. The operations and effects of and the conditions for this white light source are similar to those in Example 11.

Example 13

Figure 23:
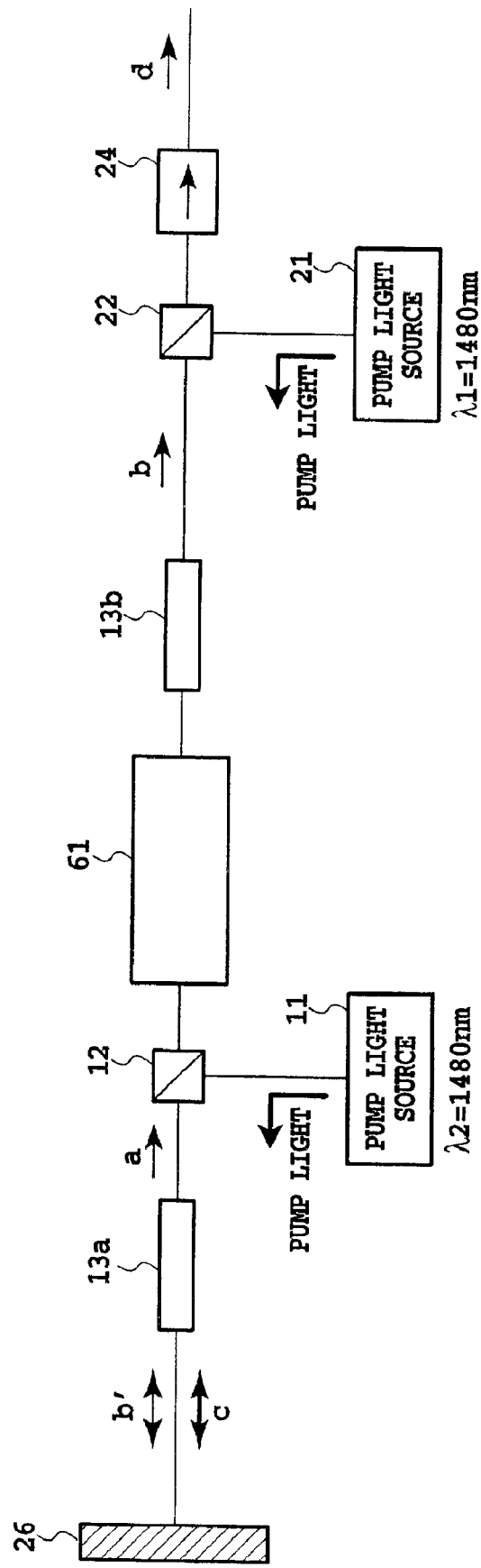
FIG. 23 is a diagram showing yet another specific example (Example 13) of the white light source according to the second aspect of the present invention.

This example illustrates the second aspect of the present invention. This is another example of Example 10. FIG. 23 is a schematic diagram showing an example of a white light source of this example.

This example, shown in FIG. 23, has a configuration similar to that in Example 10, but differs therefrom mainly in the following points: in Example 13, Raman fibers are used as the active fibers 13a and 13b. The Raman fiber includes silica Raman fiber and tellurite Raman fiber. Conditions such as the fiber length of the Raman fibers may be appropriately selected. For example, 5-km silica Raman fibers can be used. The pump light wavelengths λ1 and λ2 of the Raman fibers 13b and 13a, respectively, are both 1.48 μm. Further, a spectrum equalizer 61 is provided between a second amplified spontaneous emission light generating section comprising the active fiber 13b and a first amplified spontaneous emission light generating section comprising the active fiber 13a. Furthermore, in this case, the mirror 26 reflects an amplified spontaneous emission light b' emitted from the active fiber 13a.

Figure 24A:
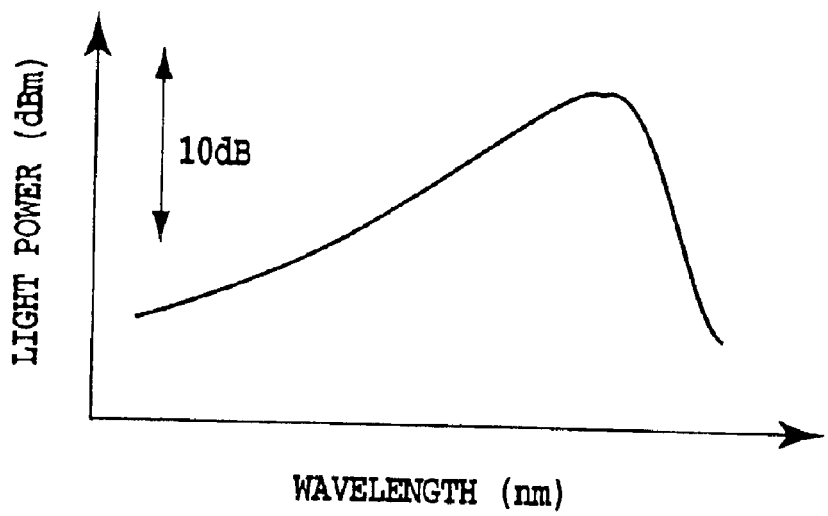
Figure 24B:
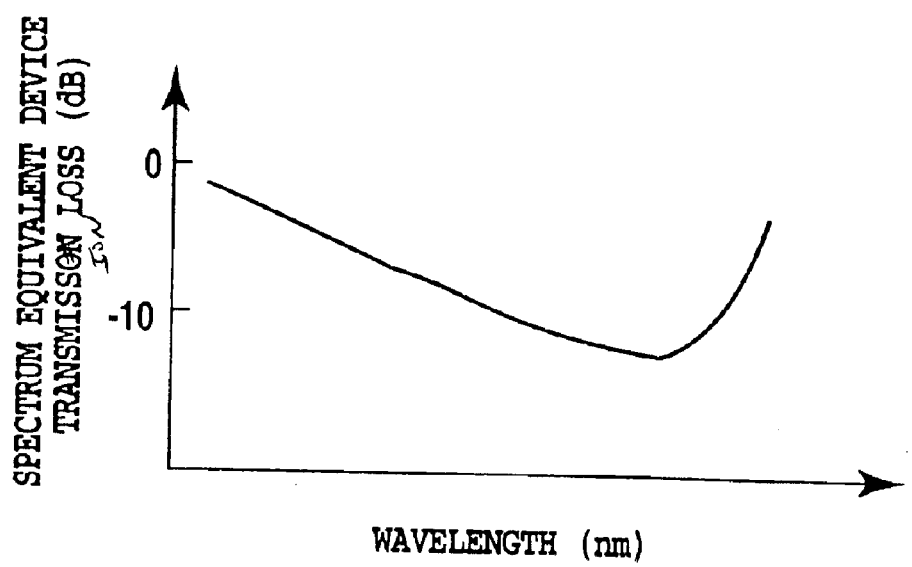

In general, the spectra of amplified spontaneous emission light generated in the Raman fibers 13a and 13b have a higher intensity on the long wavelength side, that is, the right side of the spectrum curves upward as shown in FIG. 24A. Thus, to flatten the spectrum of an output white light (broadening of the wavelength band) and increase output, the spectrum equalizer is used between the first and the second amplified spontaneous emission light generating sections. FIG. 24B shows an example of a transmission loss spectrum from the spectrum equalizer. The amplified spontaneous emission light spectrum in FIG. 24A and the spectrum from the spectrum equalizer in FIG. 24B exhibit opposite characteristics so that the spectrum of white light that has passed through the spectrum equalizer can be flattened.

Thus, according to this example, the spectrum of an output light from the white light source can be flattened.

In this example, two amplified spontaneous emission light generating sections have been taken for instance, but more amplified spontaneous emission light generating sections may be used. In this case, a spectrum equalizer may be provided between any pair of amplified spontaneous emission light generating sections, but is preferably provided between each of all the pairs of amplified spontaneous emission light generating sections.

Example 14

Figure 25:
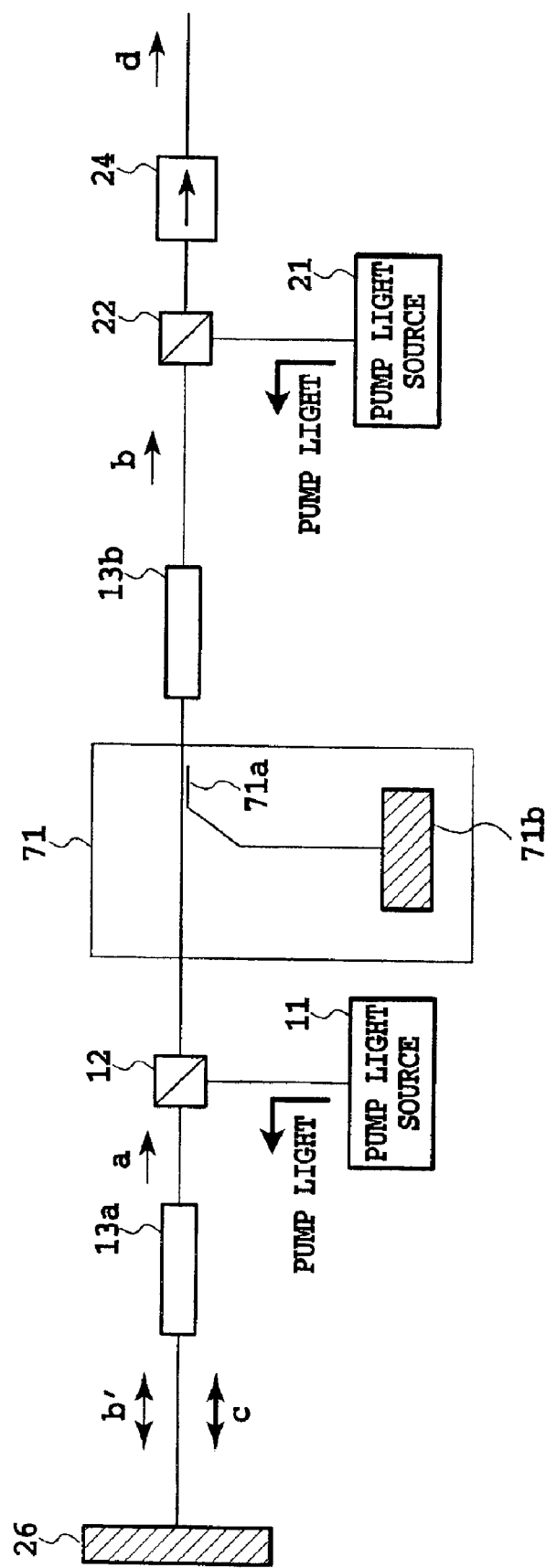
FIG. 25 is diagram showing still another specific example (Example 14) of the white light source according to the second aspect of the present invention.

This example illustrates the second aspect of the present invention. This is another example of Example 13. FIG. 25 is a schematic diagram showing an example of a white light source of this example.

This example, shown in FIG. 25, has a configuration similar to that in Example 13, but differs therefrom mainly in the following points: in Example 14, a mirror 71 (composed of a fiber coupler 71a and a mirror 71b) is used in place of the spectrum equalizer in Example 13. Accordingly, this example is also similar to Example 12.

This example basically operates similarly to Example 13, described above. However, an amplified spontaneous emission light emitted from the Raman fiber 13b toward the multiplexer 12 side is input to the mirror 71, and those components of the amplified spontaneous emission light which are not incident on the Raman fiber 13a are reflected by the mirror 71b, connected to the fiber coupler 71a, and return to the Raman fiber 13b where it is amplified. Consequently, this example simultaneously achieves equalization of the spectrum of the amplified spontaneous emission light and an increase in white light generation efficiency.

Figure 26A:
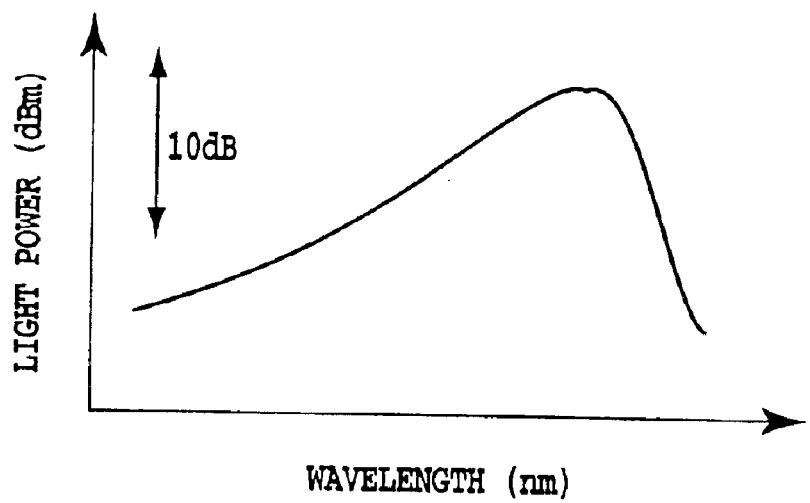
Figure 26B:
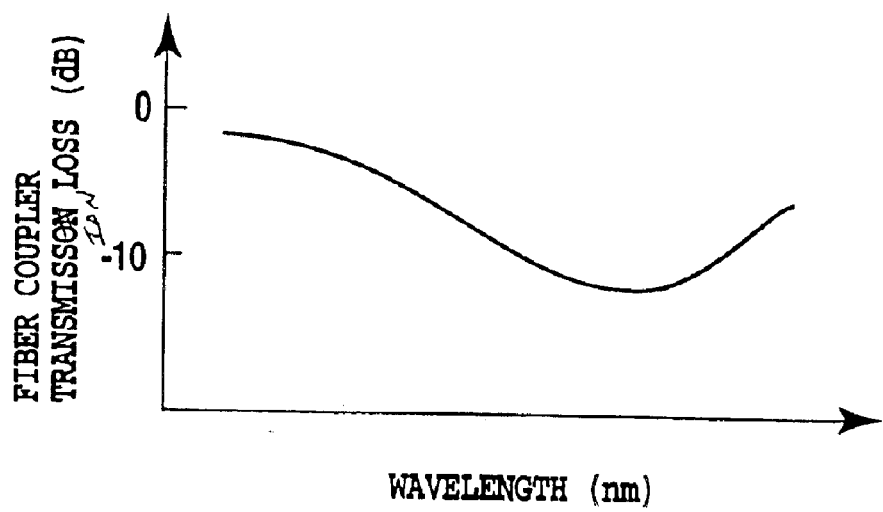

FIG. 26B shows an example of a transmission loss spectrum from the fiber coupler 71a. The amplified spontaneous emission light spectrum in FIG. 26A and the transmission loss spectrum from the fiber coupler in FIG. 26B exhibit opposite characteristics so that the spectrum of a white light that has passed through the mirror 71 can be flattened.

In this example, two amplified spontaneous emission light generating sections have been taken for instance, but more amplified spontaneous emission light generating sections may be used. In this case, a mirror 71 may be provided between any pair of amplified spontaneous emission light generating sections, but is preferably provided between each of all the pairs of amplified spontaneous emission light generating sections.

Example 15

Figure 27:
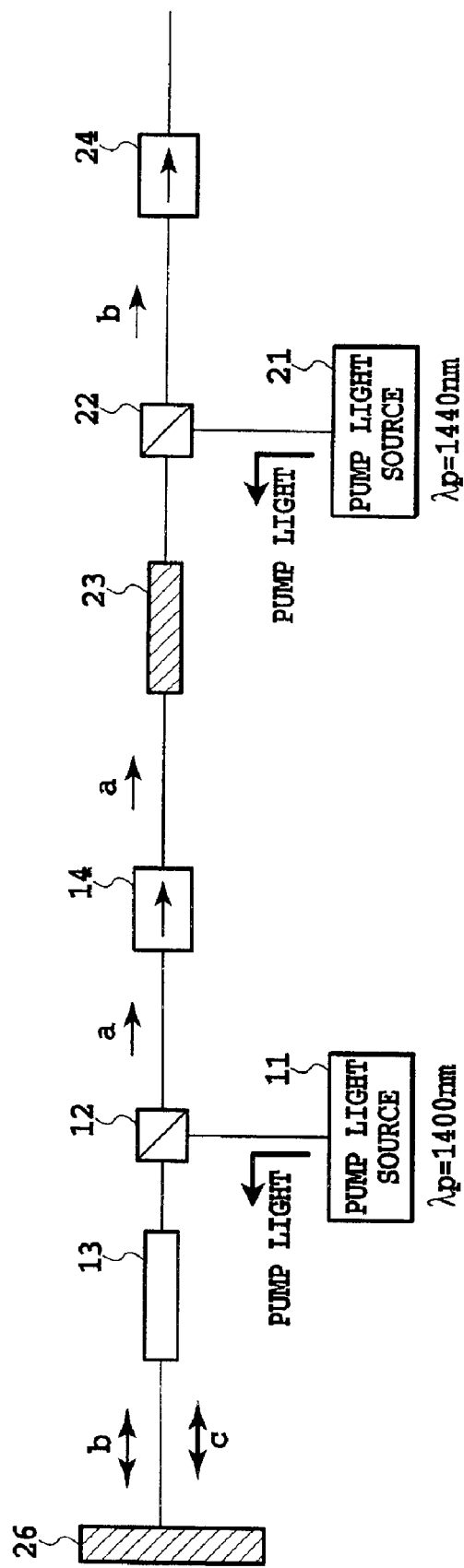
FIG. 27 is diagram showing yet another specific example (Example 15) of the white light source according to the second aspect of the present invention.

This example illustrates the second aspect of the present invention. This is another example of Example 13. FIG. 27 is a schematic diagram showing an example of a white light source of this example.

The example in FIG. 27 has a configuration similar to that in Example 2, described above, but differs therefrom in the following points: in Example 2, the terminator 15 is provided at the side of the active fiber 13 opposite to the multiplexer 12 side for termination without reflection, while an amplified spontaneous emission light emitted to terminator side is discarded. On the other hand, in this example, the mirror 26 is provided in place of the terminator 15 to reflect and return the amplified spontaneous emission light emitted to the mirror, to the active fiber 13. As a result, in this example, an amplified spontaneous emission light emitted toward the multiplexer 12 side of the active fiber 13 is increased as compared to that of Example 2. This is an advantage of this example. Further, when part of the pump light from the pump light source 11 transmits to the mirror through the active fiber 13, in Example 2, the transmitted part is discarded. However, in this example, this part is reflected so as to be incident on the active fiber 13 for recycling, thereby increasing the pumping efficiency of the active fiber 13.

Various conditions for this example such as the other operations thereof and the selection of active fibers are as described above in Example 2.

For example, in the configuration shown in FIG. 27, a rare earth-doped fiber such as an Er- or Tm-doped fiber is used as the first active fiber 13, and a Raman fiber such as a silica Raman fiber is used as the second active fiber 23. However, in this example, rare earth-doped fibers can be used as the first and second active fibers. In this case, the configuration is similar to that of Example 1 except that the terminator 15 is replaced with the mirror 26. Accordingly, as conditions for a pump light and others, those described in Example 1 are applicable to this example.

Example 16

Figure 28:
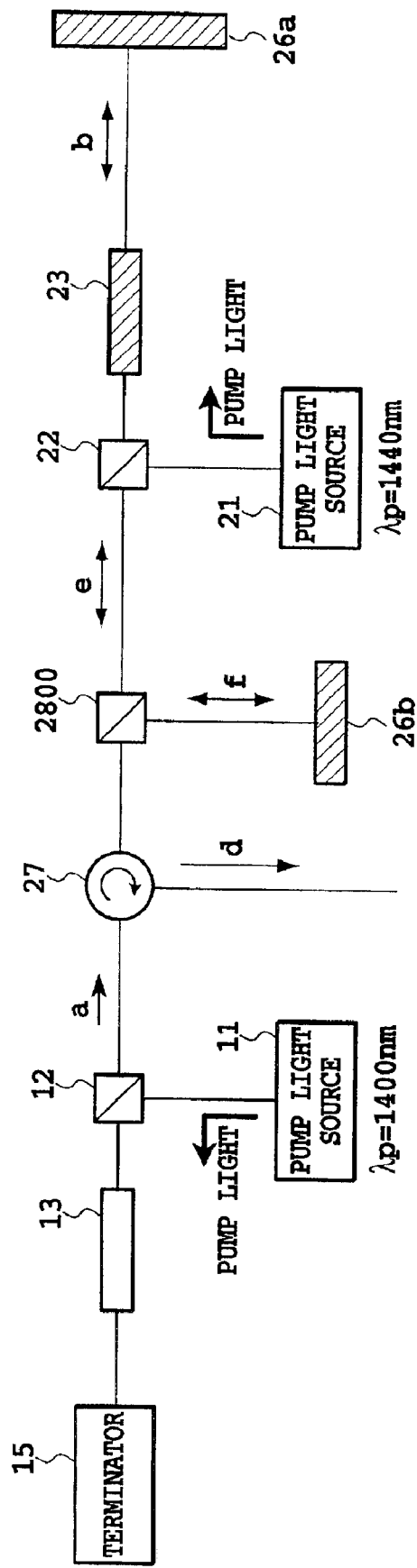
FIG. 28 is diagram showing still another specific example (Example 16) of the white light source according to the second aspect of the present invention.

This example illustrates the second aspect of the present invention. FIG. 28 is a schematic diagram showing an example of a white light source of this example.

FIG. 28 shows a variation of Example 5, described above. Accordingly, this has a configuration similar to that of Example 5, but differs therefrom in the following points: in Example 5, the demultiplexer 1400 and the multiplexer 1410 are used to demultiplex and multiplex short and long wavelength components. However, in this example, a single wavelength separator, which has both functions of a demultiplexer and multiplexer (specifically, this is the same as either a demultiplexer or a multiplexer) 2800 (in this example, it denotes "device 2800"), the circulator 27, and the two mirrors 26a and 26b are used.

In this example, with the device 2800 having the functions of both demultiplexer and multiplexer, long wavelength components of an amplified spontaneous emission light reflected by the mirror 26a are multiplexed with short wavelength components of an amplified spontaneous emission light reflected by the mirror 26b which accompanies the device 2800, and then the multiplexed light is output from an output port of the device 2800 via the circulator 27. In this case, since the long wavelength components of the amplified spontaneous emission light are amplified twice in the Raman fiber 23, this example has the advantage of increasing the power density of an output light d from the white light source. Further, the power density of the output light from the amplified spontaneous emission light a can be increased by replacing the terminator 15 of the active fiber 13 (Tm-doped fiber) with a mirror.

Example 17

Figure 29:
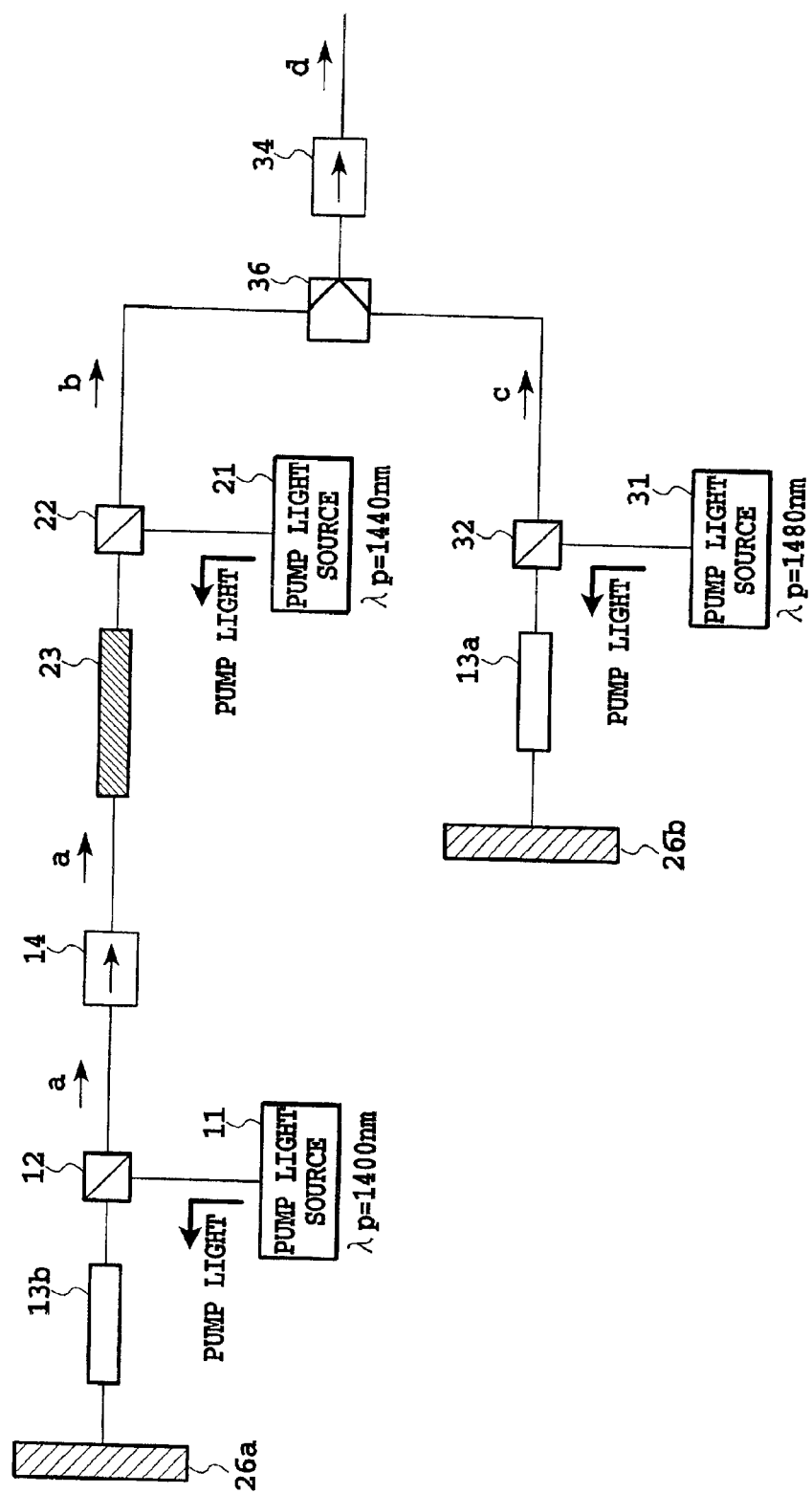
FIG. 29 is diagram showing yet another specific example (Example 17) of the white light source according to the second aspect of the present invention.

This example illustrates the second aspect of the present invention. FIG. 29 is a schematic diagram showing an example of a white light source of this example.

FIG. 29 shows a variation of Example 4, described above. Accordingly, this has a configuration similar to that of Example 4, but differs therefrom in the following points: in Example 4, the first and second white light generating sections 1310 and 1320 have the terminators 15 and 35, respectively. However, in this example, the terminators 15 and 35 are replaced with the mirrors 26a and 26b, respectively.

Accordingly, this example not only performs operations similar to those of Example 4 but also produces the effects described in Examples 16 and 6, described above, due to the installation of the mirrors. That is, white light d has a broadband wavelength range and an increased power density.

It will be understood to those skilled in the art that in the above example of the present invention, the mirror can be appropriately replaced with a Faraday rotator mirror. Further, in the above example of the present invention, the mirror may be a mirror face with a film deposited gold or the like on the fiber end and a combination of a fiber, a collimating lens, and a plate-shaped reflector (the plate-shaped reflector is similar to what is called a "regular mirror plate"). Furthermore, the mirror that totally or partially reflects an amplified spontaneous emission light may be a normal-incidence dielectric multilayer filter or a chirped fiber Bragg grating.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A white light source comprising a first amplified spontaneous emission light generating section comprising at least an active fiber and a pump light source, and a second amplified spontaneous emission light generating section comprising at least an active fiber and a pump light source, wherein said first and second amplified spontaneous emission light generating sections each have a first end and a second end, and the second end of said first amplified spontaneous emission light generating section is connected in series with the first end of said second amplified spontaneous emission light generating section, wherein at least one of said active fiber in said first amplified spontaneous emission light generating section and said active fiber in said second amplified spontaneous emission light generating section is a Raman fiber, which generates amplified spontaneous scattering light, wherein the wavelength ranges of a first amplified spontaneous emission light and a second amplified spontaneous emission light generated by said first and second amplified spontaneous emission light generating sections, respectively, at least partially overlap each other, wherein the first amplified spontaneous emission light generated by said first amplified spontaneous emission light generating section is input to said second amplified spontaneous emission light generating section, and the input emission light is then combined with the second amplified spontaneous emission light generated by said second amplified spontaneous emission light generating section, while being amplified by a second active fiber in said second amplified spontaneous emission light generating section, thereby allowing an amplified output light to be output from said second amplified spontaneous emission light generating section, the amplified output light having both wavelength ranges of said first and second amplified spontaneous emission lights.

2. The white light source according to claim 1, further comprising a third amplified spontaneous emission light generating section for generating a third amplified spontaneous emission light which comprises at least an active fiber and a pump light source, wherein the third amplified spontaneous emission light generating section is connected in parallel to the second end of said second amplified spontaneous emission light generating section, and wherein the amplified output light output from said second amplified spontaneous emission light generating section are combined with the third amplified spontaneous emission light to output an amplified output light having all wavelength ranges of said first, second and third amplified spontaneous emission lights.

3. The white light source according to claim 2, wherein the active fiber included in said first amplified spontaneous emission light generating section is said thulium-doped fiber and is pumped with a 1400 nm pump light, the active fiber included in said second amplified spontaneous emission light generating section is said silica Raman fiber and is pumped with a 1440 nm pump light, and the active fiber included in said third amplified spontaneous emission light generating section is said erbium-doped fiber and is pumped with a 1480 nm pump light, and wherein a white light is generated having an output spectrum with a broader band which is expanded toward a long-wavelength side.

4. The white light source according to claim 2, wherein the active fiber included in said first amplified spontaneous emission light generating section is said silica Raman fiber and is pumped with a 1440 nm pump light, the active fiber included in said second amplified spontaneous emission light generating section is said thulium-doped fiber and is pumped with a 1400 nm pump light, and the active fiber included in said third amplified spontaneous emission light generating section is said erbium-doped fiber and is pumped with a 1480 nm pump light, and wherein a white light is generated having an output spectrum with a broader band which is expanded toward a long-wavelength side.

5. A white light source comprising a first amplified spontaneous emission light generating section comprising an active fiber and a pump light source, and a second amplified spontaneous emission light generating section comprising an active fiber and a pump light source,
wherein the first amplified spontaneous emission light generating section comprises a Faraday rotator mirror for increasing the maximum power of the output light,
wherein said first and second amplified spontaneous emission light generating sections each have a first end and a second end, and the second end of said first amplified spontaneous emission light generating section is connected in series with the first end of said second amplified spontaneous emission light generating section,
wherein at least one of said active fiber in said fist amplified spontaneous emission light generating section and said active fiber in said second amplified spontaneous emission light generating section is a Raman fiber, which generates amplified spontaneous scattering light,
wherein amplified spontaneous emission light generated by the first and second amplified spontaneous emission light generating sections are all used by said Faraday rotator mirror as output,
wherein the wavelength ranges of the first and second amplified spontaneous emission lights generated by said first and second amplified spontaneous emission light generating sections, respectively, at least partially overlap each other, and
wherein the first amplified spontaneous emission light is input to said second amplified spontaneous emission light generating section, and the input emission light is then combined with the second amplified spontaneous emission light, while being amplified by a second active fiber included in said second amplified spontaneous emission light generating section, thereby allowing an amplified emission output light to be output, the output light having both wavelength ranges of said first and second amplified spontaneous emission lights.

6. The white light source according to claim 5, further comprising a third amplified spontaneous emission light generating section for generating a third amplified spontaneous emission light, which comprises at least an active fiber, a pump light source and a Faraday rotator mirror for increasing the maximum power of the output light at the terminal end of the third amplified spontaneous emission light generating section,
wherein the third amplified spontaneous emission light generating section is connected in parallel to the second end of said second amplified spontaneous emission light generating section, and
wherein the amplified output light output from said second amplified spontaneous emission light generating section are combined with the third amplified spontaneous emission light to output an amplified output light having all wavelength ranges of said first, second and third amplified spontaneous emission lights.

7. The white light source according to claim 5, further comprising a second mirror connected between said first amplified spontaneous emission light generating section and said second amplified spontaneous emission light generating section, the second mirror partially reflecting said amplified spontaneous emission light from said second amplified spontaneous emission light generating section.

8. The white light source according to claim 1, further comprising:
a demultiplexer provided between the second end of said first amplified spontaneous emission light generating section and the first end of said second amplified spontaneous emission light generating section;
a multiplexer provided at the second end of said second amplified spontaneous emission light generating section; and
a bypass path through which either short or long wavelength component of a first amplified spontaneous emission light generated by said first amplified spontaneous emission light generating section is guided from said demultiplexer to said multiplexer, and
wherein either short or long wavelength component of said first amplified spontaneous emission light is separated by said demultiplexer and then guided to said multiplexer via said bypass, and the remaining part of said first amplified spontaneous emission light is guided to said multiplexer via said second amplified spontaneous emission light generating section.

9. The white light source according to claim 5, further comprising:
a three-port demultiplexer connected between the second end of said first amplified spontaneous emission light generating section and the first end of said second amplified spontaneous emission light generating section via a first port and a second port of the three-port demultiplexer;
a second Faraday rotator mirror connected to a third port of the three-port demultiplexer; and
a circulator provided between the three-port demultiplexer and the second end of said first amplified spontaneous emission light generating section.

10. The white light source according to claim 5, further comprising a first Faraday rotator mirror connected to the first end of said first amplified spontaneous emission light generating section, a second Faraday rotator mirror connected to the first end of said second amplified spontaneous emission light generating section, and a circulator connected between the second end of said first amplified spontaneous emission light generating section and the second end of said second amplified spontaneous emission light generating section.

11. The white light source according to claim 1 or 5, wherein said Raman fiber is a silica Raman fiber or a tellurite Raman fiber.

12. The white light source according to claim 11, wherein said Raman fiber is a silica Raman fiber.

13. The white light source according to claim 1 or 5 wherein said active fibers are different from each other, and one of the active fibers is rare earth-doped fiber, while one of the other active fibers is a Raman fiber.

14. The white light source according to claim 13, wherein said rare earth-doped fiber is a thulium-doped fiber, an erbium-doped fiber, a thulium-doped core and terbium-doped clad fiber, or a thulium-doped core and europium-doped clad fiber.

15. The white light source according to claim 14, wherein said rare earth-doped fiber is a thulium-doped fiber, and said Raman fiber is a silica Raman fiber.

16. The white light source according to claim 15, wherein the active fiber included in said first amplified spontaneous emission light generating section is said thulium-doped fiber and is pumped with a 1400 nm pump light, and the active fiber included in said second amplified spontaneous emission light generating section is said silica Raman fiber and is pumped with a 1440 nm pump light, and wherein a white light is generated having an output spectrum with a broader band which is expanded toward a long-wavelength side.

17. The white light source according to claim 15, wherein the active fiber included in said first amplified spontaneous emission light generating section is said silica Raman fiber and is pumped with a 1440 nm pump light, and the active fiber included in said second amplified spontaneous emission light generating section is said thulium-doped fiber and is pumped with a 1400 nm pump light, and wherein a white light is generated having an output spectrum with a broader band which is expanded toward a short-wavelength side.

18. The white light source according to claim 14, wherein said rare earth-doped fiber is an erbium-doped fiber, and said Raman fiber is a silica Raman fiber.

19. The white light source according to claim 18, wherein the active fiber included in said first amplified spontaneous emission light generating section is said erbium-doped fiber and is pumped with a 1480 nm pump light, and the active fiber included in said second amplified spontaneous emission light generating section is a silica Raman fiber and is pumped with a 1520 mm pump light, and wherein a white light is generated having an output spectrum with a broader band which is expanded toward a long-wavelength side.

20. The white light source according to claim 18, wherein the active fiber included in said first amplified spontaneous emission light generating section is said silica Raman fiber and is pumped with a 1520 nm pump light, and the active fiber included in said second amplified spontaneous emission light generating section is said erbium-doped fiber and is pumped with a 1480 nm pump light, and wherein a white light is generated having an output spectrum with a broader band which is expanded toward a short-wavelength side.

21. The white light source according to claim 14, wherein said rare earth-doped fiber is a thulium-doped core and a terbium-doped clad fiber or a thulium-doped core and an europium-doped clad fiber.

22. The white light source according to claim 13, wherein the active fiber included in said first amplified spontaneous emission light generating section is a thulium-doped fiber, and the active fiber included in said second amplified spontaneous emission light generating section is a Raman fiber.

23. The white light source according to claim 13, wherein the active fiber included in said first amplified spontaneous emission light generating section is an erbium-doped fiber, and the active fiber included in said second amplified spontaneous emission light generating section is a Raman fiber.

24. The white light source according to claim 13, wherein the active fiber included in said first amplified spontaneous emission light generating section is a Raman fiber, and the active fiber included in said second amplified spontaneous emission light generating section is a thulium-doped fiber.

25. The white light source according to claim 13, wherein the active fiber included in said first amplified spontaneous emission light generating section is a Raman fiber, and the active fiber included in said second amplified spontaneous emission light generating section is an erbium-doped fiber.

26. The white light source according to claim 13, wherein the active fiber included in said first amplified spontaneous emission light generating section is a Raman fiber, and the active fiber included in said second amplified spontaneous emission light generating section is a thulium-doped core and terbium-doped clad fiber or a thulium-doped core and europium-doped clad fiber.

27. The white light source according to claim 13, wherein the active fiber included in said first amplified spontaneous emission light generating section is a thulium-doped core and terbium-doped clad fiber, and the active fiber included in said second amplified spontaneous emission light generating section is a Raman fiber.

28. The white light source according to claim 27, having a pump light source pumps said Raman fiber, the pump light source having a pump light wavelength of 1,450 to 1,570 nm.

29. The white light source according to claim 1 or 14, wherein the active fiber included in said first amplified spontaneous emission light generating section is a Raman fiber, and the active fiber included in said second amplified spontaneous emission light generating section is a Raman fiber.

30. The white light source according to claim 1 or 14, comprising a Raman fiber as an active fiber and a pump light source which pumps the Raman fiber, the pump light source having a pump light wavelength of 1,450 to 1,580 nm.

31. The white light source according to claim 1 or 14, comprising at least one Raman fiber as an active fiber and a pump light source that pumps the Raman fiber, the pump light source having a pump light wavelength of 1,370 to 1,500 nm.

32. The white light source according to claim 1 or 14, comprising erbium-doped fiber as an active fiber and a pump light source that pumps the erbium-doped fiber, the pump light source having a pump light wavelength of 1,500 nm or less.

33. The white light source according to claim 1 or 14, comprising thulium-doped core and terbium-doped clad fiber as an active fiber and a pump light source that pumps the thulium-doped core and terbium-doped clad fiber, the pump light source having a pump light wavelength of 1,500 nm or less.

34. The white light source according to claim 1 or 14, comprising at least one thulium-doped core and terbium-doped clad fiber and at least one Raman fiber as active fibers, and a pump light source that pumps the thulium-doped core and terbium-doped clad fiber and a pump light source that pumps the Raman fiber, and wherein the pump light source that pumps the thulium-doped core and terbium-doped clad fiber has a pump light wavelength of 1,500 nm or less, and the pump light source that pumps the Raman fiber has a pump light wavelength of 1,450 to 1,570 nm.

35. The white light source according to claim 5, further comprising a second mirror connected between the second end of said first amplified spontaneous emission light generating section and the first end of said second amplified spontaneous emission light generating section wherein said second mirror is a fiber grating.

36. The white light source according to claim 5, further comprising a second mirror connected via a multiplexer and a demultiplexer between the second end of said first amplified spontaneous emission light generating section and the first end of said second amplified spontaneous emission light generating section, the second mirror totally or partially reflecting said amplified spontaneous emission light.

37. The white light source according to claim 5, comprising a spectrum equalizer connected between the second end of said first amplified spontaneous emission light generating section and the first end of said second amplified spontaneous emission light generating section.

38. A white light source comprising:
a first amplified spontaneous emission light generating section comprising at least an active fiber and a pump source;
a second amplified spontaneous emission light generating section comprising at least an active fiber and a pump source; and
a multiplexer for multiplexing amplified spontaneous emission lights emitted from the first and second amplified spontaneous emission light generating sections,
wherein the first and second amplified spontaneous emission light generating sections comprise a Faraday rotator mirror for increasing the maximum power of the output light at the terminal ends of the first and second amplified spontaneous emission light generating sections, respectively,
wherein the wavelength ranges of the first and second amplified spontaneous emission lights generated by said first and second amplified spontaneous emission light generating sections, respectively, at least partially overlap each other, and
wherein the output light has both wavelength ranges of said first and second spontaneous emission lights.

39. A white light source comprising a first amplified spontaneous emission light generating section comprising at least an active fiber and a pump light source, a second amplified spontaneous emission light generating section comprising at least an active fiber and a pump light source,
wherein said first and second amplified spontaneous emission light generating sections each have a first end and a second end, and the second end of said first amplified spontaneous emission light generating section is connected in series with the first end of said second amplified spontaneous emission light generating section,
wherein said active fibers are rare earth-doped fibers, the rare earth-doped fibers are different active fibers, and at least one of the rare earth-doped fibers is a thulium-doped fiber pumped with a 1400 nm pump light, while at least one of the other active fibers is an erbium-doped fiber pumped with a 980 nm pump light,
wherein the wavelength ranges of the first amplified spontaneous emission light and a second amplified spontaneous emission lights generated by said first and second amplified spontaneous emission light generating sections, respectively, at least partially overlap each other,
wherein the first amplified spontaneous emission light generated by said first amplified spontaneous emission light generating section is input to said second amplified spontaneous emission light generating section, an the input emission light is then combined with the second amplified spontaneous emission light generating section, while being amplified by a second active fiber in said second amplified spontaneous emission light generating section, the amplified out put light having both wavelength ranges of said first and second amplified spontaneous emission lights.

40. The white light source according to claim 39, wherein the active fiber included in said first amplified spontaneous emission light generating section is a thulium-doped fiber pumped with a 1400 nm pump light, and the active fiber included in said second amplified spontaneous emission light generating section is an erbium-doped fiber pumped with a 980 nm pump light, and wherein a white light is generated having an output spectrum with a broader band which is expanded toward a long wavelength side.

41. The white light source according to claim 39, wherein the active fiber included in said first amplified spontaneous emission light generating section is an erbium-doped fiber pumped with a 980 nm pump light, and the active fiber included in said second amplified spontaneous emission light generating section is a thulium-doped fiber pumped with a 1400 nm pump light, and wherein a white light is generated having an output spectrum with a broader band which is expanded toward a short wavelength side.

42. A white light source comprising:
a first amplified spontaneous emission light generating section comprising at least an active fiber and a pump light source and a second amplified spontaneous emission light generating section comprising at least an active fiber and a pump light source, wherein said first and second amplified spontaneous emission light generating sections each have a first end and a second end, and the second end of said first amplified spontaneous emission light generating section is connected in series with the first end of said second amplified spontaneous emission light generating section,
a circulator connected between the second end of said first amplified spontaneous emission light generating section and the second end of said second amplified spontaneous emission light generating section,
a terminator connected to the first end of said first amplified spontaneous emission light generating section,
a first Faraday rotator mirror connected to the first end of said second amplified spontaneous emission light generating section, and
a second Faraday rotator mirror connected between the circulator and the second end of said second amplified spontaneous emission light generating section via a three-port demultiplexer,
wherein at least one of said active fiber in said first amplified spontaneous emission light generating section and said active fiber in said second amplified spontaneous emission light generating section is a Raman fiber, which generates amplified spontaneous scattering light,
wherein the wavelength ranges of a first amplified spontaneous emission light and a second amplified spontaneous emission light generated by said first and second amplified spontaneous emission light generating sections, respectively, at least partially overlap each other,
wherein the first amplified spontaneous emission light generated by said first amplified spontaneous emission light generating section is input to said second amplified spontaneous emission light generating section, and the input emission light is then combined with the second amplified spontaneous emission light generated by said second amplified spontaneous emission light generating section, while being amplified by a second active fiber in said second amplified spontaneous emission light generating section, thereby allowing an amplified output light to be output from said second amplified spontaneous emission light generating section, the amplified output light having both wavelength ranges of said first and second amplified spontaneous emission lights.

* * * * *